(12) United States Patent
Fischman et al.

(10) Patent No.: US 7,647,329 B1
(45) Date of Patent: Jan. 12, 2010

(54) KEYMAP SERVICE ARCHITECTURE FOR A DISTRIBUTED STORAGE SYSTEM

(75) Inventors: Ami K. Fischman, Seattle, WA (US); Allan H. Vermeulen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 213 days.

(21) Appl. No.: 11/370,353

(22) Filed: Mar. 8, 2006

Related U.S. Application Data

(60) Provisional application No. 60/754,726, filed on Dec. 29, 2005.

(51) Int. Cl.
*G06F 17/30* (2006.01)

(52) U.S. Cl. .................. 707/100; 707/204; 707/202; 707/203

(58) Field of Classification Search ............... 707/104.1
See application file for complete search history.

(56) References Cited

U.S. PATENT DOCUMENTS

| | | | |
|---|---|---|---|
| 5,202,986 A | | 4/1993 | Nickel |
| 5,287,500 A | | 2/1994 | Stoppani, Jr. |
| 5,963,944 A | * | 10/1999 | Adams ..................... 707/10 |
| 6,047,283 A | * | 4/2000 | Braun ........................ 707/3 |
| 6,192,405 B1 | | 2/2001 | Bunnell |
| 6,226,743 B1 | * | 5/2001 | Naor et al. .......... 707/E17.012 |
| 6,279,007 B1 | | 8/2001 | Uppala |
| 6,463,454 B1 | * | 10/2002 | Lumelsky et al. .......... 709/223 |
| 6,505,205 B1 | * | 1/2003 | Kothuri et al. .............. 707/100 |
| 6,557,111 B1 | * | 4/2003 | Theimer et al. ............. 707/201 |
| 7,146,368 B2 | * | 12/2006 | Sonoda et al. ................ 707/10 |
| 7,240,064 B2 | * | 7/2007 | Risvik et al. ................ 707/100 |
| 7,317,907 B2 | | 1/2008 | Linkert et al. |

(Continued)

FOREIGN PATENT DOCUMENTS

EP 0226734 7/1987

(Continued)

OTHER PUBLICATIONS

Merriam-Webster Online Dictionary, "respective", www.merriam-webster.com, Retrieved Jul. 27, 2008.*

(Continued)

*Primary Examiner*—Cam Y T Truong
(74) *Attorney, Agent, or Firm*—Robert C. Kowert; Meyertons, Hood, Kivlin, Kowert & Goetzel, P.C.

(57) ABSTRACT

A keymap service architecture for a distributed storage system. A system may implement storage nodes configured to store replicas of data objects, where each of the replicas is accessible via a respective locator value, and keymap instances each configured to store keymap entries corresponding respectively to the data objects. A given keymap entry may indicate a mapping from a given key value corresponding to a given data object to each respective locator value of its replicas. Each of the keymap instances may store a replica of the given keymap entry and may index its respective stored keymap entries within a respective index data structure including hierarchically arranged index nodes corresponding to keymap entries. For a given keymap entry having a given corresponding index node, each tag value associated with each ancestor of the given corresponding index node may be a prefix of the given key value.

49 Claims, 23 Drawing Sheets

U.S. PATENT DOCUMENTS

| | | | |
|---|---|---|---|
| 7,403,987 | B1 | 7/2008 | Marinelli et al. |
| 2002/0138559 | A1 | 9/2002 | Ulrich et al. |
| 2002/0143755 | A1 | 10/2002 | Wynblatt et al. |
| 2002/0147929 | A1 | 10/2002 | Rose |
| 2002/0161781 | A1* | 10/2002 | Leong et al. ............ 707/103 R |
| 2003/0046270 | A1 | 3/2003 | Leung et al. |
| 2003/0088659 | A1 | 5/2003 | Susaria et al. |
| 2003/0204515 | A1* | 10/2003 | Shadmon et al. ............ 707/100 |
| 2004/0168084 | A1 | 8/2004 | Owen et al. |
| 2004/0193879 | A1 | 9/2004 | Sonoda et al. |
| 2004/0249803 | A1* | 12/2004 | Vankatachary et al. ......... 707/3 |
| 2005/0055322 | A1 | 3/2005 | Masters et al. |
| 2005/0108380 | A1 | 5/2005 | Odhner et al. |
| 2006/0149806 | A1 | 7/2006 | Scott et al. |
| 2006/0168154 | A1* | 7/2006 | Zhang et al. ................ 709/220 |
| 2006/0190556 | A1 | 8/2006 | Lane et al. |
| 2006/0206510 | A1 | 9/2006 | Moulhaud et al. |
| 2006/0235894 | A1* | 10/2006 | Rasmussen et al. ......... 707/200 |
| 2006/0253504 | A1* | 11/2006 | Lee et al. .................... 707/203 |
| 2007/0027907 | A1* | 2/2007 | Kulkarni et al. ......... 707/103 R |

FOREIGN PATENT DOCUMENTS

| | | |
|---|---|---|
| EP | 1160692 | 12/2001 |
| EP | 1197882 | 4/2002 |
| EP | 1647902 | 4/2006 |
| WO | 0026782 | 5/2000 |

OTHER PUBLICATIONS

Douglas Comer, "The Ubiquitous B-Tree", 1972, ACM Computing Surveys, vol. 11, No. 2, pp. 121-137.*

Demers, et al., "Epidemic algorithms for replicated database maintenance," Proceedings of the sixth annual ACM Symposium on Principles of distributed computing, 1987, 12 pages.

Bharambe, et al., "Analyzing and Improving BIT Torrent Performance," Microsoft Research Technical Report MSR-TR-2005-03, Feb. 2005, 16 pages.

Van Renesse, et al., "Astrolabe: A robust and scalable technology for distributed system monitoring, management, and data mining," ACM Transactions on Computer Systems, May 2003, 43 pages.

Peterson, et al., "Flexible update propagation for weakly consistent replication," Proceedings of the 16th ACM Symposium on Operating Systems Principles (SOSP-16), 1997, 14 pages.

Van Renesse, et al., "A gossip-style failure detection service," Proceedings of IFIP, 1996, 16 pages.

Rowstron, et al., "Pastry: Scalable, decentralized object location and routing for large-scale peer-to-peer systems," Proceedings of the 18th IFIP/ACM International Conference on Distributed Systems Platforms, 2001, 22 pages.

Van Renesse, "Efficient reliable internet storage," Workshop on Dependable Distributed Data Management, 2004, 6 pages.

Datta, et al., "Range queries in tri-structured overlays," Fifth IEEE International Conference on Peer-to-Peer Computing, 2005, 10 pages.

Gribble, et al., "Scalable, distributed data structures for Internet service construction," Symposium on Operating Systems Design and Implementation, Oct. 2000, 14 pages.

Rodrigues, et al., "When Multi-hop Peer-to-Peer Routing Matters," Proceedings of 3rd International Workshop on Peer-to-Peer Systems, Feb. 2004, 11 pages.

Stocia, et al., "Chord: A Scalable Peer-to-Peer Lookup Service for Internet Applications," ACM SIGCOMM, 2001, 12 pages.

Gray, et al., "The dangers of replication and a solution," ACM SIGMOD, 1996, 10 pages.

Ramabhadran, et al., "Prefix hash tree: an indexing data structure over distributed hash tables," http://www.citeseer.ist.psu.edu/ramabhadran04prefix.html, 2004, 10 pages.

Wood, "Utility Computing Pioneers, Part 2," http://www.enterprisestoragforum.com/manemant/features/article.php/34025. Sep. 1, 2004.

Golding, et al., "Group member in the epidemic style," Technical Report UCSC-CRL-92-13; 1992, May 4, 1992, 12 pages.

Aberer, et al., "Multifaceted Simultaneous Load Balancing in DHT-Based P2P Systems: A New Game with Old Balls and Bins," SELF-STAR, 2004, 19 pages.

Kephart, et al., "The vision of autonomic computing," IEEE Computer, 2003, 10 pages.

Joseph, et al., "Delay aware dynamic load balancing in i3," http://www.cs.berkeley.edu/~dilip/projects/grad/cs262a-i3loadbalancing.pdf, 2004, 10 pages.

Plaxton, et al., "Accessing Nearby Copies of Replicated Objects in a Distributed Environment," Proceedings of the 9th Annual ACM Symposium on Parallel Algorithms and Architectures, 1997, 23 pages.

Morrison, "PATRICIA-Practical algorithm to retrieve information coded in alphanumeric," Journal of the ACM, v. 15, No. 4, 1968, 21 pages.

Merkle, "A digital signature based on a conventional encryption function," Conference on the Theory and Applications of Cryptographic Techniques on Advances in Cryptology, 1987, 10 pages.

Merkle, "Secrecy, authentication, and public key systems," Stanford University doctoral thesis, 1979, 192 pages.

Bhagwan, et al., "Total Recall: System Support for Automated Availability Management," ACM/USENIX Symposium on Networked Systems Design and Implementation, Mar. 2004, 14 pages.

Bhagwan, et al., "Understanding availability," Proceedings of the 2nd International Workshop on Peer-to-Peer Systems, 2003, 6 pages.

Bhagwan, et al., "Replication Strategies for Highly Available Peer-to-Peer Storage," Future Directions in Distributed Computing, May 2002, 5 pages.

Bhagwan, et al., "Replication Strategies for Highly Available Peer-to-Peer Storage Systems," UCSD Technical Report No. CS2002-0726, Nov. 2002, 14 pages.

IDrive User's Manual, Jul. 2004, 8 pages.

XDrive, "How it works," http://web.archive.org/web/20041231020138/http://www.xdrive.com/howitworks/, 2004, 2 pages.

Tedeschi, "A tidy option for data pack rats," New York Times, Jun. 2, 2005, 3 pages.

Byers, et al., "Informed content delivery across adaptive overlay networks," IEEE/ACM Transactions on Networking, v. 12, No. 5, Oct. 2004, 14 pages.

Byers, et al., "Fast approximate reconciliation of set differences," Boston University Computer Science Technical Report 2002-019, 2002, 16 pages.

Kaplan, et al., "Regular Models of Phonological Rule Systems," Computational Linguistics, 1994, 48 pages.

Kaplan, "Finite State Technology," http://cslu.cse.ogi.edu/HLTsurvey/ch11node8.html, 1996, 3 pages.

Pultz, "Network service providers: The race to new services," Gartner Symposium ITEXPO, 2002, 19 pages.

Gmail Filesystem Overview, http://richard.jones.name/google-hacks/gmail-filesystem/gmail-filesystem.html, 2005, 4 pages.

Gmail Filesystem Old News, http://richard.jones.name/google-hacks/gmail-filesystem/gmail-filesystem-news.html, 2004, 3 pages.

XWEBFAQS overview, http://web.archive.org/web/20041207035142/http://www.xwebservices.com/Web_Services/XWebFAQs/, 2004, 2 pages.

XSpace Version 1.1 overview, http://web.archive.org/web/20041206230129/http://www.xmethods.com/ve2/XSpace.po, 2004, 1 page.

XSpace Doc/Literal Specification, http://web.archive.org/web/20041216105959/www.xmethods.net/xspace/xspace_v1_doclit.html, 2004, 11 pages.

XSPace Version 1 Specification, http://web.archive.org/web/20041216105009/www.xmethods.net/xspace/xspace_v1.html, 2004, 11 pages.

XSpace Example: Accessing XSpace via HTTP, http://web.archive.org/web/20041216105738/www.xmethods.net/xspace/tutorial/TutorialHTTP.html, 2004, 7 pages.

U.S. Appl. No. 11/371,304, filed Mar. 8, 2006.
U.S. Appl. No. 11/370,562, filed Mar. 8, 2006.
U.S. Appl. No. 11/371,263, filed Mar. 8, 2006.
U.S. Appl. No. 11/511,075, filed Aug. 28, 2006.

Van Renesse, "Epidemic Protocols (Or, Gossip is Good)," http://www.cs.cornell.edu/home/rvr/presentations/gossip/ppframe.htm, Oct. 7, 1999, 66 pages.

U.S. Appl. No. 11/370,664, filed Mar. 8, 2006.

Roy Thomas Fielding, "Architectural Styles and the Design of Network-Based Software Architectures," 2000.

Don Box, "A Brief History of SOAP," 2001.

Khare R., et al.: "Extending the Representational State Transfer (REST) Architectural Style for Decentralized Systems," Software Engineering, 2004. ICSE 2004 Proceedings, 26th International Conference in Edinburgh, Scotland, UK, May 23-28, 2004, Piscataway, MJ, USA IEEE, May 23, 2004, pp. 428-437, XP010710991 ISBN: 0-7695-2163-0.

Hoffma, P.E., et al., "URN Resolution Overview," Internet Citation, Oct. 21, 1995, SP002287468 Retrieved from the Internet; URL: http://ftp.ics.uci.edu/pub/ietf/uri/draft-ietf-uri-urn-respdescript-00, retrieved on Jul. 7, 2004 the whole document.

* cited by examiner

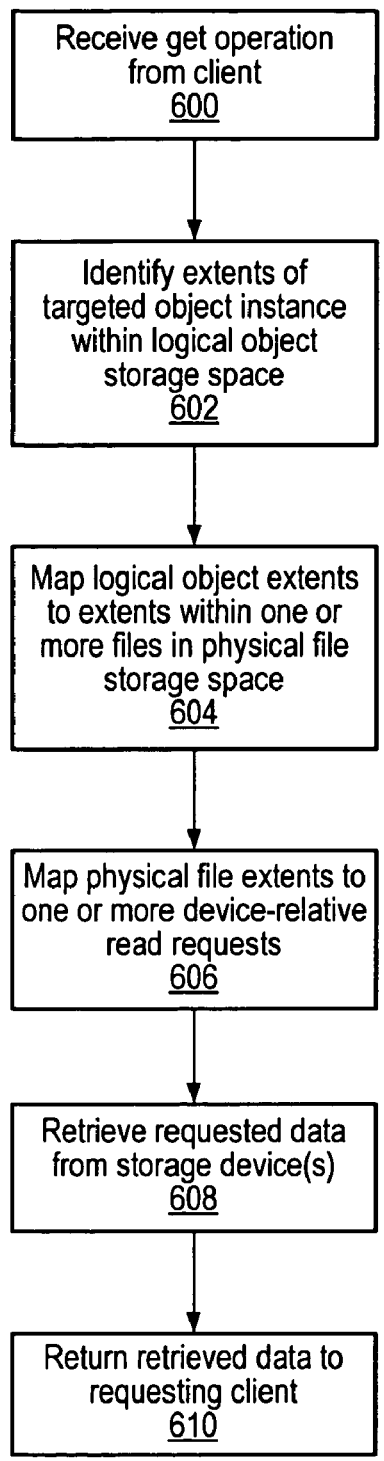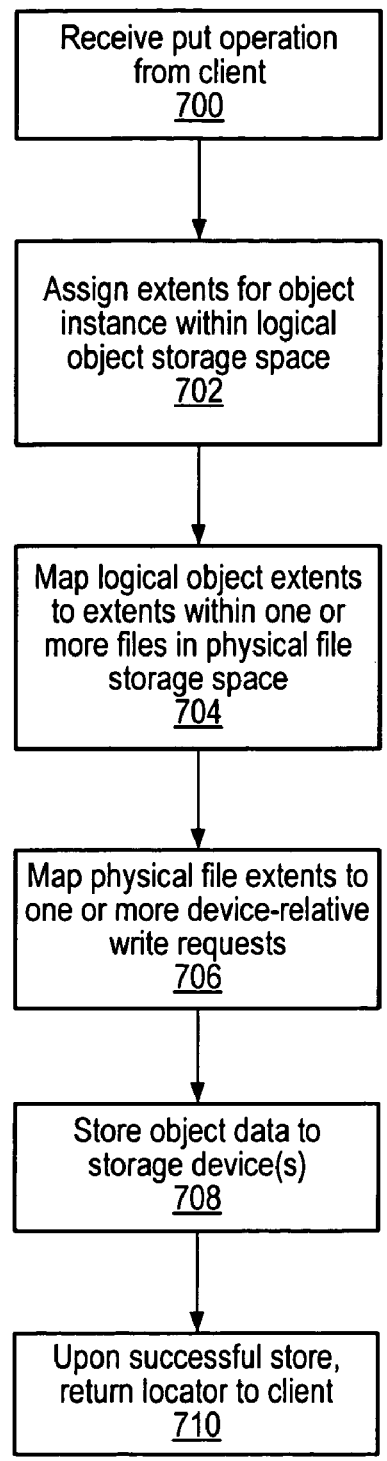
FIG. 6
FIG. 7

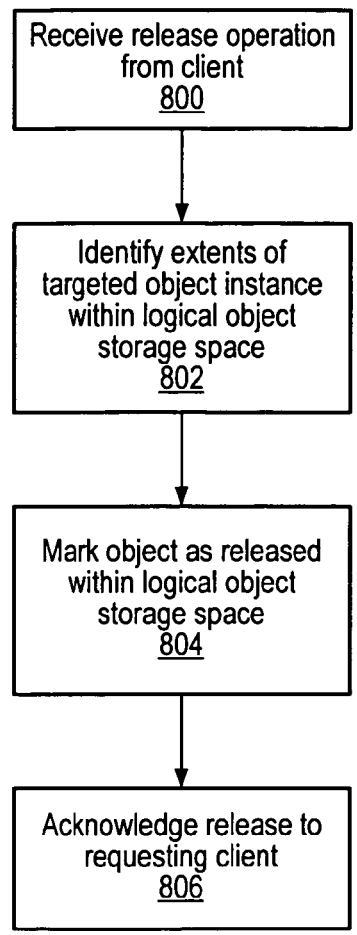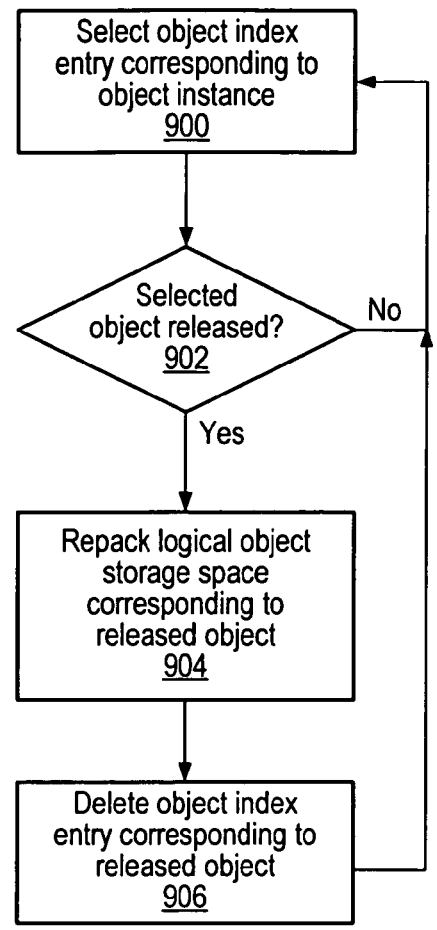
FIG. 8
FIG. 9

KEYMAP SERVICE ARCHITECTURE FOR A DISTRIBUTED STORAGE SYSTEM

PRIORITY DATA

This application claims priority to U.S. Provisional Patent Application Ser. No. 60/754,726 filed Dec. 29, 2005, and which is herein incorporated by reference in its entirety.

BACKGROUND OF THE INVENTION

1. Field of the Invention

This invention relates to data storage systems and, more particularly, to keymap systems configured to manage data object key information within a data storage system.

2. Description of the Related Art

Many different computing applications rely on some type of storage medium for the persistent storage of various kinds of application data. For example, common office applications and multimedia applications generate and use application data of various types and formats, such as documents, spreadsheets, still images, audio and video data, among others. Frequently, such data is stored for repeated access or use on behalf of a user. For example, a user may wish to store and work with a number of documents or other data over a period of time, and may expect that the data will be readily available in a predictable state when needed.

In conventional computing systems, the storage medium used by applications for persistent application data storage is most commonly a magnetic fixed drive or "hard drive," although optical and solid-state storage devices are also used. Such devices are either integrated within a computer system that executes the applications or accessible to that system via a local peripheral interface or a network. Typically, devices that serve as application storage are managed by an operating system that manages device-level behavior to present a consistent storage interface, such as a file system interface, to various applications needing storage access.

This conventional model of application storage presents several limitations. First, it generally limits the accessibility of application data. For example, if application data is stored on the local hard drive of a particular computer system, it may be inaccessible to applications executing on other systems. Even if the data is stored on a network-accessible device, applications that execute on systems outside the immediate network may not be able to access that device. For example, for security reasons, enterprises commonly restrict access to their local area networks (LANs) such that systems external to the enterprise cannot access systems or resources within the enterprise. Thus, applications that execute on portable devices (e.g., notebook or handheld computers, personal digital assistants, mobile telephony devices, etc.) may experience difficulty accessing data that is persistently associated with fixed systems or networks.

The conventional application storage model also may fail to adequately ensure the reliability of stored data. For example, conventional operating systems typically store one copy of application data on one storage device by default, requiring a user or application to generate and manage its own copies of application data if data redundancy is desired. While individual storage devices or third-party software may provide some degree of redundancy, these features may not be consistently available to applications, as the storage resources available to applications may vary widely across application installations. The operating-system-mediated conventional storage model may also limit the cross-platform accessibility of data. For example, different operating systems may store data for the same application in different, incompatible formats, which may make it difficult for users of applications executing on one platform (e.g., operating system and underlying computer system hardware) to access data stored by applications executing on different platforms.

SUMMARY

Various embodiments of a keymap service architecture for a distributed storage system are disclosed. According to one embodiment, a system may include a number of computing nodes configured to implement a number of storage nodes configured to store one or more replicas of each of a number of data objects, where each of the one or more replicas is accessible via a unique respective locator value, and a number of keymap instances, each configured to store keymap entries corresponding respectively to the data objects. A given one of the keymap entries corresponding to a given one of the number of data objects may indicate a mapping from a given key value corresponding to the given data object to each the respective locator value of the one or more replicas of the given data object. For the given data object, each of the number of keymap instances may be configured to store a replica of the given keymap entry. Each of the keymap instances may be further configured to index its respective stored keymap entries within a respective index data structure. Further, each of the index data structures may include a respective number of index nodes arranged hierarchically and each having an associated tag value, where each of the stored keymap entries corresponds to a respective one of the index nodes, and where for the given keymap entry having a given corresponding index node, each tag value associated with each ancestor of the given corresponding index node is a prefix of the given key value.

According to one embodiment, a keymap instance may include a number of host systems configured to store keymap entries corresponding respectively to a number of data objects, where each of the number of data objects corresponds to one or more replicas, where each of the one or more replicas is accessible via a unique respective locator value, and where a given one of the keymap entries corresponding to a given one of the number of data objects indicates a mapping from a given key value corresponding to the given data object to each the respective locator value of the one or more replicas of the given data object. The keymap instance may also include a keymap coordinator configured to index stored keymap entries of the host systems within an index data structure, where the index data structure includes a number of index nodes arranged hierarchically and each having an associated tag value, where each of the stored keymap entries corresponds to a respective one of the index nodes, and where for the given keymap entry having a given corresponding index node, each tag value associated with each ancestor of the given corresponding index node is a prefix of the given key value.

BRIEF DESCRIPTION OF THE DRAWINGS

FIG. 6 is a flow diagram illustrating one embodiment of a method of performing an object get operation.

FIG. 7 is a flow diagram illustrating one embodiment of a method of performing an object put operation.

FIG. 8 is a flow diagram illustrating one embodiment of a method of performing an object release operation.

FIG. 9 is a flow diagram illustrating one embodiment of a method of repacking an object storage space.

Figure 1:
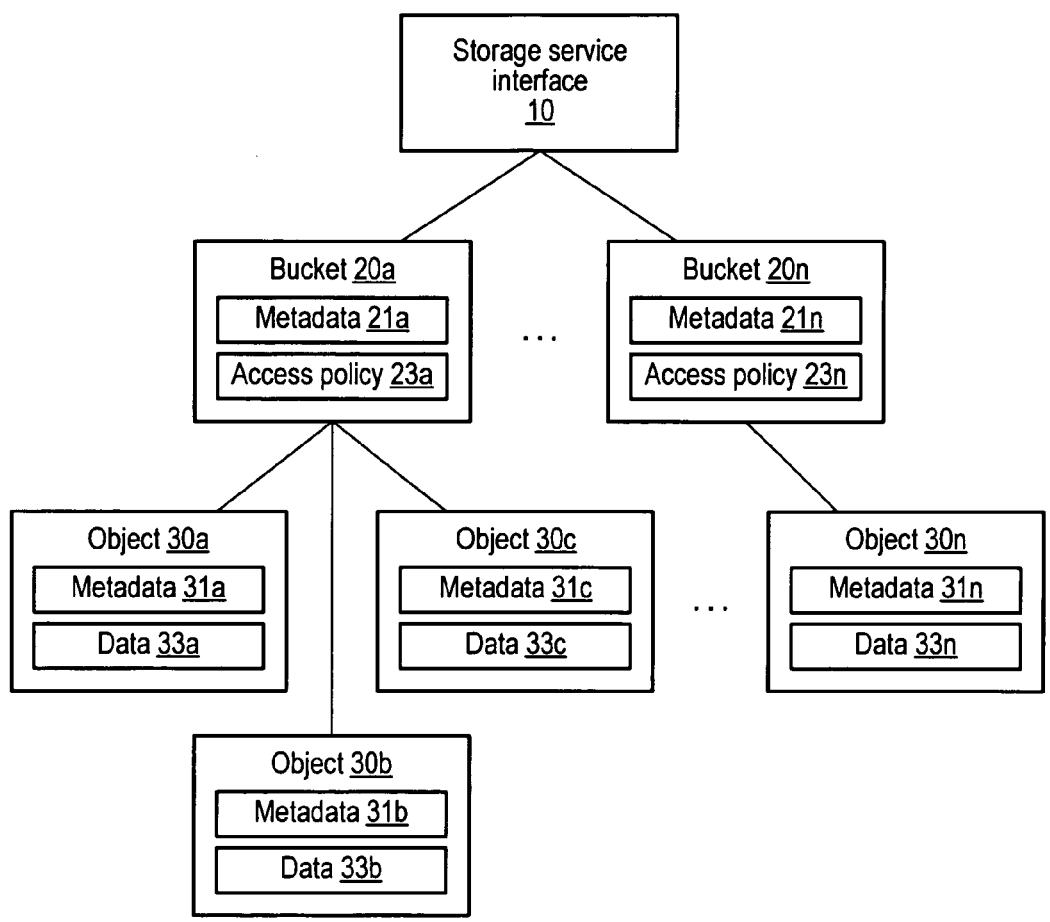
FIG. 1 is a block diagram illustrating one embodiment of a storage model for presenting storage to users as a web service.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Introduction

As computing applications become more data intensive as well as geographically dispersed, the need for reliable, location-independent access to application data increases. For example, multimedia applications, such as authoring, storage and playback applications, require escalating amounts of data storage as the quality and quantity of multimedia content improves. Further, it may be desirable to access application data from a variety of locations irrespective of the location of the device storing the data. For example, while many computers include substantial amounts of disk-based storage, accessing such storage remotely in a uniform and convenient manner presents technical and security difficulties.

In contrast to configuring individual computers to rely solely on their own internal storage resources or provisioning local network-based storage resources (e.g., Network Attached Storage (NAS), Storage Area Network (SAN), etc.), an Internet-connected data storage service may be configured to provide generic storage services to clients via Internet-based protocols, such as web services (WS) protocols, for example. Internet-based protocols such as web services protocols are typically platform-independent, in that they typically function independently of underlying software or hardware. Consequently, providing data storage capabilities as web services may afford many different types of applications straightforward access to arbitrary amounts of storage independent of the storage resources implemented within the applications' host systems or on local networks. Additionally, web service-accessible storage may generally be accessible from any location that provides Internet access. Web service-accessible storage may facilitate implementation of a number of different computing features, such as remote access to common data by different devices or applications, remote access to widely distributed data by individual applications during execution, access to and/or sharing of data among distributed users working in collaboration, dissemination of application result data among distributed users, and many other similar features.

In the following discussion, one embodiment of a possible data storage model that may be used in a web services-based storage system is described. Subsequently, a storage service system that may be configured to provide storage services according to the data storage model is disclosed, and its various components are described in detail.

Overview of Storage Service User Interface and Storage Model

One embodiment of a storage model for providing data storage to users as a service, such as a web service, is illustrated in FIG. 1. In the illustrated model, storage service interface 10 is provided as a customer- or user-facing interface to the storage service. According to the model presented to a user by interface 10, the storage service may be organized as an arbitrary number of buckets 20*a-n* accessible via interface 10. Each bucket 20 may be configured to store an arbitrary number of objects 30*a-n*, which in turn may store data specified by a user of the storage service.

As described in greater detail below, in some embodiments storage service interface 10 may be configured to support interaction between the storage service and its users according to a web services model. For example, in one embodiment, interface 10 may be accessible by clients as a web services endpoint having a Uniform Resource Locator (URL), e.g., http://storageservice.domain.com, to which web services calls generated by service clients may be directed for processing. Generally speaking, a web service may refer to any type of computing service that is made available to a requesting client via a request interface that includes one or more Internet-based application layer data transport protocols, such as a version of the Hypertext Transport Protocol (HTTP) or another suitable protocol.

Web services may be implemented in a variety of architectural styles, using a variety of enabling service protocols. For example, in a Representational State Transfer (REST)-style web services architecture, the parameters that are pertinent to a web services call (e.g., specifying the type of service requested, user credentials, user data to be operated on, etc.) may be specified as parameters to the data transport command that invokes the web services call to the web services endpoint, such as an HTTP GET or PUT command. In some implementations, REST-style web services architectures are stateless, in that each web services call may contain all the information necessary to process that call without reference to external state information. In contrast to REST-style web services architectures, document-based or message-based web services architectures may encode the parameters and data pertinent to a web services call as a document that may be transmitted to a web services endpoint and then decoded and acted upon by the endpoint. For example, a version of eXtensible Markup Language (XML) or another suitable markup language may be used to format the web services request document. In some embodiments, the markup language used to format the request document may delimit parameters that control the processing of the request, while in other embodiments certain features of the markup language itself (e.g., certain tags) may directly control aspects of request processing. Additionally, in some embodiments, the resulting document may be encapsulated within another protocol, such as a version of the Simple Object Access Protocol (SOAP), for example, in order to facilitate processing of the web services request by the endpoint. Other protocols may also be employed within various embodiments of web services architectures. For example, a version of Web Services Description Language (WSDL) may be employed by a web services endpoint to publish its interfacing requirements to potential clients. Web services endpoints may make themselves known to potential clients through a directory protocol such as a version of the Universal Description, Discovery and Integration (UDDI) protocol. Numerous other types of protocols relating to the provision of computing services via web services interfaces may exist, and any given web services implementation may use any suitable combination of such protocols.

It is contemplated that in some embodiments, interface 10 may support interfaces other than web services interfaces, instead of or in addition to a web services interface. For example, an enterprise may implement a storage service for use by clients external to the enterprise, who may access the service via web services protocols, as well as users within the enterprise, who may use a different type of interface (e.g., a proprietary interface customized to the enterprise's intranet). In some embodiments, interface 10 may support each of the various types of interfacing protocols through which any user of the storage service may access the service. In other embodiments, different instances of interface 10 may be provided for each distinct interface approach. It is noted that in some embodiments, those aspects of interface 10 related to handling interactions with clients (e.g., receiving and responding to service requests) may be implemented separately from those aspects that implement the general architecture of the storage service (e.g., the organization of the service into a hierarchy of buckets and objects). In some such embodiments, the portion of interface 10 relating to client interaction (e.g., via web services protocols) may be bypassed by certain users, such as those internal to an enterprise, as described in greater detail below in conjunction with the description of FIG. 2.

As shown in FIG. 1, interface 10 provides storage service users with access to buckets 20. Generally speaking, a bucket 20 may function as the root of an object namespace that is associated with a user of the storage service. For example, a bucket 20 may be analogous to a file system directory or folder. In some embodiments, individual buckets 20 may also form the basis for accounting for usage of the storage service. For example, a user may be associated with one or more buckets 20 for billing purposes, and that user may be billed for usage of storage resources (e.g., storage of objects 30) that hierarchically reside within the namespace established by those buckets 20.

In the illustrated embodiment, each of buckets 20a-n includes associated metadata 21a-n as well as a respective access policy 23a-n. Generally speaking, metadata 21 may include any suitable metadata that may be used to describe aspects or properties of a given bucket 20. For example, metadata 21 may include information identifying the date of a bucket's creation, the identity of its creator, whether the bucket has any objects 30 associated with it, or other suitable information. In some embodiments, metadata 21 may include information indicative of usage characteristics of a bucket 20, such as the total size of objects 30 associated with bucket 20, access history of users with respect to bucket 20 and/or its associated objects 30, billing history associated with bucket 20, or any other suitable information related to current or historical usage of bucket 20. In one embodiment, each bucket 20 may be associated with a respective unique identifier, which may be specified by a user or automatically assigned by the storage service. The unique identifier may be stored within metadata 21 or as a separate property or field of bucket 20. It is noted that in some embodiments, a given bucket 20 may not include explicit references, pointers or other information corresponding to the objects 30 associated with given bucket 20. Rather, as described in greater detail below, location and selection of objects 30 may be performed through the use of a separate mapping facility referred to herein as a keymap.

An access policy 23 may include any information needed to control access to objects 30 associated with a bucket 20. Access policy 23 may include information identifying the client or clients allowed to access a bucket 20 and its associated objects 30, and in what capacity. For example, access policy 23 may store a user identifier and/or authentication credentials (e.g., a password) for one or more clients, and may further specify whether a given client is allowed to modify or only read objects 30. Access policy 23 may also implement default or group-oriented policies (e.g., by allowing universal read access but limiting write access to objects 30 to a specified client or group of clients) or any other desired security model.

In the illustrated embodiment, a given bucket 20 may be associated with one or more objects 30, each of which may include respective metadata 31 and data 33. Generally speaking, data 33 of an object 30 may correspond to any sequence of bits. The type of data represented by the bits stored within an object 30 may be transparent to the storage service. That is, the bits may represent text data, executable program code, audio, video or image data, or any other type of digital data, and the storage service may not necessarily distinguish among these various data types in storing and manipulating objects 30. In some embodiments, the size of data 33 may be limited to a fixed ceiling (e.g., 1 gigabyte (GB)), while in other embodiments, objects 30 may be allowed to scale in size subject only to the physical storage resources available to the storage service.

Similar to metadata 21 associated with buckets 21, metadata 31 may be configured to store any desired descriptive information about its corresponding object 30. For example, metadata 31 may include information about the date and/or time the corresponding object 30 was created, the size of object 30, the type of data 33 stored by object 30 (e.g., a data type defined by the Multipurpose Internet Mail Extensions (MIME) standard), or any other type of descriptive information. In some embodiments, metadata 31 may store usage or history information indicative of user interactions with corresponding object 30, as well as access policy information (e.g., permission information indicating the types of access various users may have to the object 30), object cost information (e.g., billing rate or history associated with the object 30), or any other suitable information or combination of types of information attributable to object 30. In some instances, a client may provide metadata along with object data to be stored as metadata 31, while in other cases, metadata 31 may include metadata generated by the system that manages storage service features (e.g., the storage service system illustrated in FIG. 2 and described below). Some, all or none of metadata 31 may be accessible to a client having access rights to an object 30, depending on the type of metadata, specific provisions of the client's access rights, or other suitable factors.

In one embodiment, individual objects 30 may be identified within the storage service system using either of two distinct items of information: a key or a locator. Generally speaking, keys and locators may each include alphanumeric strings or other types of symbols that may be interpreted within the context of the namespace of the storage service system as a whole, although keys and locators may be interpreted in different ways. In one embodiment, a key may be specified by a client at the time a corresponding object 30 is created within a particular bucket 20 (e.g., in response to a request by the client to store a new object). If no key is specified by the user, a key may be assigned to the new object 30 by the storage service system. In such an embodiment, each respective key associated with objects 30 of a particular bucket 20 may be required to be unique within the namespace of that bucket 20. Generally speaking, a key may persist as a valid identifier through which a client may access a corresponding object 30 as long as the corresponding object exists within the storage service system.

Within a given bucket 20, keys may be used to generate a hierarchical object namespace similar to a file directory or folder namespace common to the file systems of conventional operating systems. For example, a client may be granted object reading and writing access rights to a particular bucket 20 having the unique identifier 050739517. In one embodiment, the client may then issue web services calls to the address http://storageservice.domain.com/050739517 in order to generate keys within the bucket namespace that correspond to objects within the bucket. For example, a client may specify that an object 30 is to be created within this particular bucket using the key "My Documents/Email/message.txt", such that the object 30 may be accessed using a web services call to the address:

http://storageservice.domain.com/050739517/My Documents/Email/message.txt

It is noted that in some embodiments, hierarchical structure that is implied by a key may not necessarily be reflected in the underlying hierarchy of object storage. For example, in one embodiment, objects 30 associated with a given bucket 20 may be stored in a flat, non-hierarchical fashion within the storage service system, even though the keys associated with the objects 30 may imply a hierarchy. That is, in such an embodiment, buckets 20 may not hierarchically include other buckets 20. However, in other embodiments, hierarchical inclusion of buckets 20 within other buckets 20 may be supported, although any such hierarchy of buckets need not map directly to a hierarchy implied by object keys.

In one embodiment, a request by a client to access an object 30 identified by a key may be subjected to client authentication procedures, access control checks, and/or a mapping process (such as described in greater detail below) before the underlying data 33 of the requested object 30 is retrieved or modified. For example, a client may be requested to provide a password or other credential to prove the client's identity, and once identified, the access control parameters associated with the requested bucket 20 may be evaluated to determine whether the identified client is sufficiently privileged to warrant access to the requested key. By contrast, the storage service system may support an alternative method of accessing objects 30 by locators rather than keys. Generally speaking, a locator may represent a globally unique identifier of an object 30 among all objects 30 known to the storage service system. That is, while a key may be unique to a namespace associated with a particular bucket 20, a locator may be unique within a global namespace of all objects 30 within all buckets 20. For example, a locator may include an alphanumeric string generated by the storage service system to be unique among other locators. As described in greater detail below, in some embodiments, multiple instances of an object 30 may be replicated throughout the physical storage devices used to implement the storage service system, for example to increase data redundancy and fault tolerance. In such embodiments, a unique locator may exist for each replicated instance of a given object 30.

It is noted that while in some embodiments, a key may be guaranteed to remain valid for access to an object 30 so long as that object 30 exists within the storage service system, such a guarantee may or may not apply to any given locator of that object 30. For example, if a replicated instance (or replica) of object 30 migrates to a different physical storage location (e.g., due to failure or replacement of its underlying storage medium), a locator that refers to that specific instance may cease to be valid, although another locator corresponding to the migrated instance of object 30 in its new location may be generated and used. More details on the relationship between keys and locators are given below in the discussion regarding the operation of the keymap system component.

As an example of key-based versus locator-based object access, the object 30 referenced by the key given above, http://storageservice.domain.com/050739517/My Documents/Email/message.txt may have one or more instances stored within the storage service system, one of which may be identified by a locator of the format:

http://storageservice.domain.com/locator/ 3859C89A208FDB5A

In this particular embodiment, it is noted that the key reference to object 30 is expressed relative to a particular bucket 20, while the locator reference is expressed as an absolute 128-bit hexadecimal number within the global locator space (although other types of locator encodings or formats may be employed). In one embodiment, a client-issued web services request directed to a locator may bypass some or all of the authentication, access rights, translation or other steps that may be applied to a key-based web services request. Owing to fewer layers of processing, in some such embodiments a locator-based request may be processed more quickly than a key-based request. However, because security measures may be bypassed for locator-based requests, clients may need to provide their own assurances that locators for sensitive objects 30 are not compromised (e.g., using encrypted or other secure means with which to transmit and receive locators). Further, because the persistence of locators may not be guaranteed (e.g., in the case of object instance migration discussed above), a client choosing to perform locator-based object access may need to tolerate the possibility of locators becoming invalid during use, for example, by obtaining new locators on a preemptive basis or in response to discovering that an existing locator is no longer valid.

Depending on the storage needs of the client and the caveats noted above, locator-based access may offer improved processing performance (e.g., in latency and throughput of web services request processing) relative to key-based access. For example, a client may elect to use locator-based access to refer to frequently-accessed objects 30 that are not particularly sensitive (e.g., reference materials, images or other suitable types of data). It is noted that in some embodiments, locator-based access may be disabled on the basis of individual objects 30, thus forcing clients that wish to access such objects to use key-based requests and to correspondingly submit to any authentication and access rights controls associated with such requests. However, even for objects 30 for which locator-based access is enabled, a malicious or malfunctioning client that lacks possession of a valid locator may have only a random chance of successfully accessing any given object 30. Such a chance may be rendered arbitrarily improbable through use of a large locator namespace, secure techniques for generating locators (e.g., use of secure hashes of object data), or other suitable techniques.

Storage System Architecture and Implementation

Figure 2:
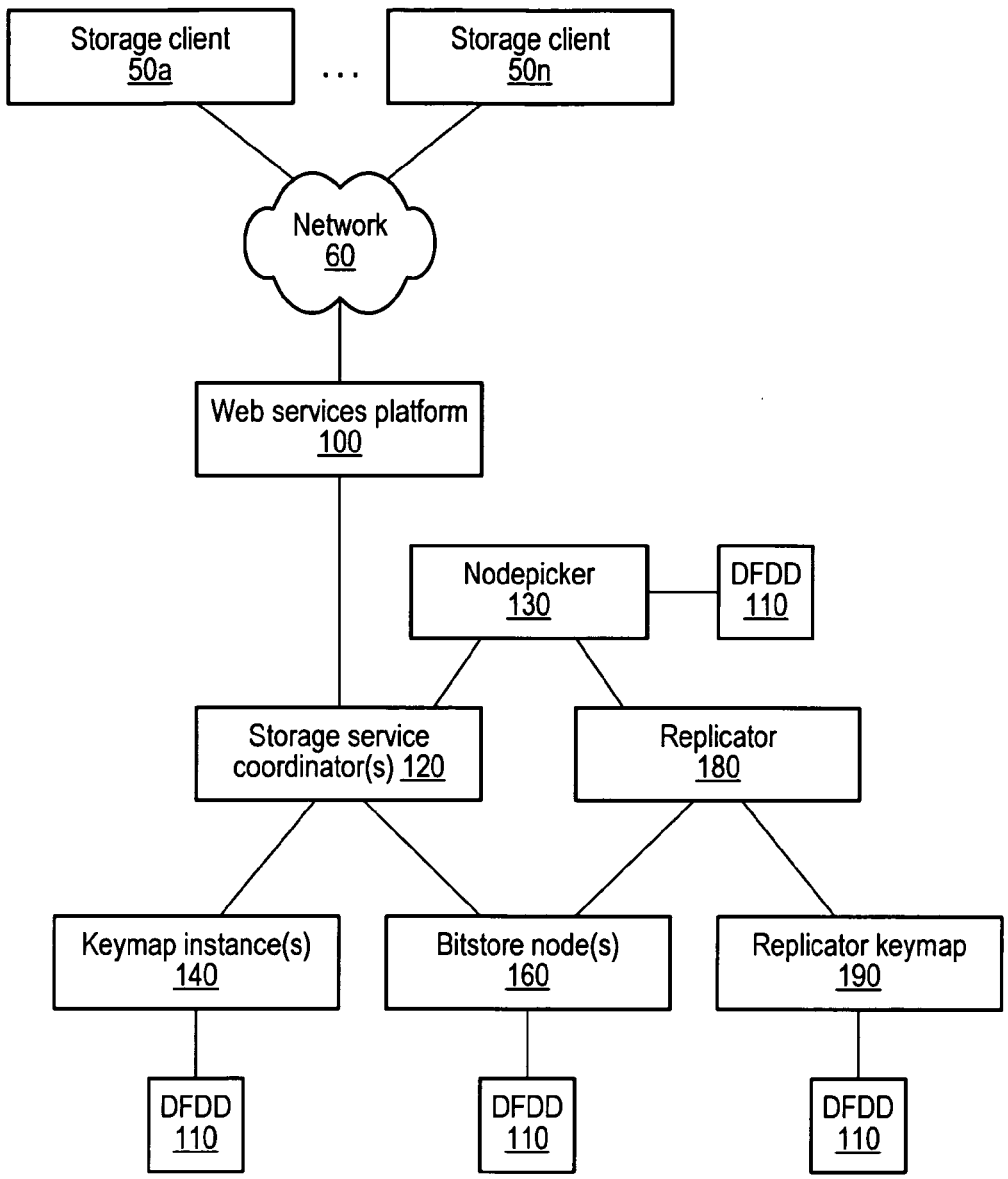
FIG. 2 is a block diagram illustrating one embodiment of a storage service system architecture.

One embodiment of a storage service system architecture that may be configured to implement a web services-based storage service such as that illustrated in FIG. 1 is shown in FIG. 2. In the illustrated embodiment, a number of storage clients 50a-n may be configured to interact with a web services platform 100 via a network 60. Web services platform 100 may be configured to interface with one or more instances of a storage service coordinator 120 (or simply, coordinator(s) 120), which in turn may interface with one or more keymap instances 140 and bitstore nodes 160. Additionally, a replicator 180 may also be configured to interface with bitstore nodes 160 as well as a replicator keymap instance 190. Both coordinator(s) 120 and replicator 180 may interface with a nodepicker service 130. In the illustrated embodiment, each instance of nodepicker 130, keymap 140, bitstore nodes 160 and the replicator keymap 190 may be associated with a respective instance of a discovery and failure detection daemon (DFDD) 110. It is noted that where one or more instances of a given component may exist, reference to that component hereinbelow may be made in either the singular or the plural. However, usage of either form is not intended to preclude the other.

Figure 3:
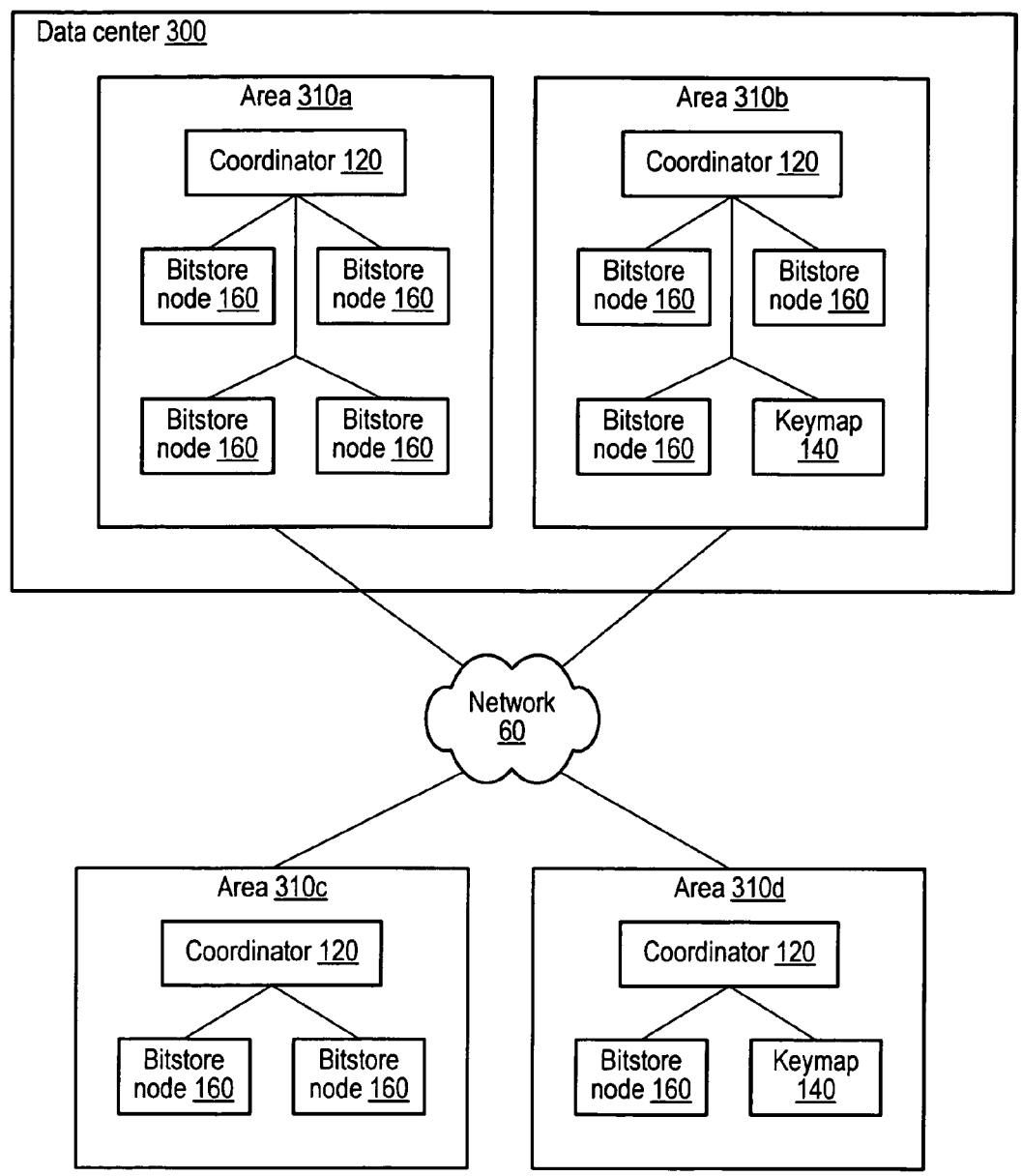
FIG. 3 is a block diagram illustrating one embodiment of a physical deployment of storage service system components.

In various embodiments, the components illustrated in FIG. 2 may be implemented directly within computer hardware, as instructions directly or indirectly executable by computer hardware (e.g., a microprocessor or computer system), or a combination of these techniques. For example, the components of FIG. 2 may be implemented by a distributed system including a number of computing nodes (or simply, nodes), such as the computer system embodiment shown in FIG. 29 and discussed below. In various embodiments, the functionality of a given storage service system component may be implemented by a particular node or distributed across several nodes. In some embodiments, a given node may implement the functionality of more than one storage service system component. Following an overview of the general functionality of the components of FIG. 2 and an exemplary physical deployment of the storage service system as shown in FIG. 3, details of certain embodiments of particular storage system components are provided below in conjunction with the descriptions of FIGS. 4-28.

Generally speaking, storage clients 50 may encompass any type of client configurable to submit web services requests to web services platform 100 via network 60. For example, a given storage client 50 may include a suitable version of a web browser, or a plugin module or other type of code module configured to execute as an extension to or within an execution environment provided by a web browser. Alternatively, a storage client 50 may encompass an application such as a database application, media application, office application or any other application that may make use of persistent storage resources. In some embodiments, such an application may include sufficient protocol support (e.g., for a suitable version of Hypertext Transfer Protocol (HTTP)) for generating and processing web services requests without necessarily implementing full browser support for all types of web-based data. That is, storage client 50 may be an application configured to interact directly with web services platform 100. As described below, storage client 50 may be configured to generate web services requests according to a Representational State Transfer (REST)-style web services architecture, a document- or message-based web services architecture, or another suitable web services architecture.

In other embodiments, storage client 50 may be configured to provide access to web services-based storage to other applications in a manner that is transparent to those applications. For example, storage client 50 may be configured to integrate with an operating system or file system to provide storage in accordance with a suitable variant of the storage model described above. However, the operating system or file system may present a different storage interface to applications, such as a conventional file system hierarchy of files, directories and/or folders. In such an embodiment, applications may not need to be modified to make use of the storage system service model of FIG. 1. Instead, the details of interfacing to web services platform 100 may be coordinated by storage client 50 and the operating system or file system on behalf of applications executing within the operating system environment.

Storage clients 50 may convey web services requests to and receive responses from web services platform 100 via network 60. In various embodiments, network 60 may encompass any suitable combination of networking hardware and protocols necessary to establish web-based communications between clients 50 and platform 100. For example, network 60 may generally encompass the various telecommunications networks and service providers that collectively implement the Internet. Network 60 may also include private networks such as local area networks (LANs) or wide area networks (WANs) as well as public or private wireless networks. For example, both a given client 50 and web services platform 100 may be respectively provisioned within enterprises having their own internal networks. In such an embodiment, network 60 may include the hardware (e.g., modems, routers, switches, load balancers, proxy servers, etc.) and software (e.g., protocol stacks, accounting software, firewall/security software, etc.) necessary to establish a networking link between given client 50 and the Internet as well as between the Internet and web services platform 100. It is noted that in some embodiments, storage clients 50 may communicate with web services platform 100 using a private network rather than the public Internet. For example, clients 50 may be provisioned within the same enterprise as the storage service system. In such a case, clients 50 may communicate with platform 100 entirely through a private network 60 (e.g., a LAN or WAN that may use Internet-based communication protocols but which is not publicly accessible).

Generally speaking, web services platform 100 may be configured to implement one or more service endpoints configured to receive and process web services requests, such as requests to access objects 30 stored by a storage service system. For example, web services platform 100 may include hardware and/or software configured to implement the endpoint http://storageservice.domain.com used in previous examples, such that an HTTP-based web services request directed to that endpoint is properly received and processed. In one embodiment, web services platform 100 may be implemented as a server system configured to receive web services requests from clients 50 and to forward them to coordinator(s) 120 or to other components of the storage service system for processing. In other embodiments, web services platform 100 may be configured as a number of distinct systems (e.g., in a cluster topology) implementing load balancing and other request management features configured to dynamically manage large-scale web services request processing loads.

In various embodiments, web services platform 100 may be configured to support REST-style or document-based (e.g., SOAP-based) types of web services requests as described in detail above. In one particular embodiment, platform 100 may be configured to implement a particular web services application programming interface (API) that supports a variety of operations on entities managed by the storage service system. For example, the API implemented by platform 100 may support basic client operations on buckets or objects, including listing of buckets 20 or objects 30 (optionally filtered according to a filter pattern or criterion), retrieval of data or metadata of buckets 20 or objects 30, and creation or deletion of buckets 20 or objects 30. In some embodiments, the API may support more sophisticated client operations such as batch application of operations to multiple buckets 20 or objects 30.

In addition to functioning as an addressable endpoint for clients' web services requests, in some embodiments web services platform 100 may implement various client management features. For example, platform 100 may coordinate the metering and accounting of client usage of web services, including storage resources, such as by tracking the identities of requesting clients 50, the number and/or frequency of client requests, the size of objects 30 stored or retrieved on behalf of clients 50, overall storage bandwidth used by clients 50, class of storage requested by clients 50, or any other measurable client usage parameter. Platform 100 may also implement financial accounting and billing systems, or may maintain a database of usage data that may be queried and processed by external systems for reporting and billing of client usage activity.

In certain embodiments, platform 100 may be configured to collect and/or monitor a variety of storage service system operational metrics, such as metrics reflecting the rates and types of requests received from clients 50, bandwidth utilized by such requests, system processing latency for such requests, system component utilization (e.g., network bandwidth and/or storage utilization within the storage service system), rates and types of errors resulting from requests, characteristics of requested objects 30 (e.g., size, data type, etc.), or any other suitable metrics. In such embodiments, platform 100 may be configured to collect such metrics in the aggregate, for example as averages over time, or as specific data points that may be subjected to a variety of analyses. In various embodiments, such metrics may be employed to test or monitor system performance in ways that may or may not be visible to clients 50. For example, in one embodiment such metrics may be used by system administrators to tune and maintain system components, while in other embodiments such metrics (or relevant portions of such metrics) may be exposed to clients 50 to enable such clients to monitor their usage of the storage service system.

In some embodiments, platform 100 may also implement user authentication and access control procedures. For example, for a given web services request to access a particular object 30 associated with a given bucket 20, platform 100 may be configured to ascertain whether the client 50 associated with the request is authorized to access given bucket 20 and particular object 30. Platform 100 may determine such authorization by, for example, evaluating an identity, password or other credential against credentials associated with given bucket 20, and evaluating the requested access to particular object 30 against an access control list specifying allowable operations to particular object 30. If a client 50 does not have sufficient credentials to access a bucket 20 or to perform a requested operation on an object 30 (e.g., the client 50 attempts to write an object 30 while having only read access privileges), platform 100 may reject the corresponding web services request, for example by returning a response to the requesting client 50 indicating an error condition. It is contemplated that in some embodiments, each bucket 20 and object 30 may have an associated access control policy governing access to that bucket or object. Such an access control policy may be stored as records or lists of access control information within metadata 21 or 31, or as a data structure distinct from metadata 21 and 31.

While in some embodiments, a storage service system such as the system of FIG. 2 may support objects 30 of arbitrary sizes, in other embodiments objects 30 may be constrained to a certain maximum size, also referred to as a chunk size. In some such embodiments, when a client provides data to be stored in association with a key and the data exceeds the chunk size, platform 100 may be configured to divide the data into two or more chunks according to the chunk size. In one embodiment, platform 100 may be configured to generate each chunk as a respective object 30 having an associated key value. Platform 100 may generate the key values for each chunk as a function of the client-supplied key in such a way that the original client data can be reconstructed from the chunks when a request for access referencing the client-supplied key is performed. For example, platform 100 may be configured to generate N chunks from client data, and may generate N corresponding keys for these chunks by appending N distinct patterns to the client-supplied key, where the N distinct patterns are lexicographically ordered in the same order in which the N chunks were generated. Each of the N chunks may then be managed as a distinct object 30 using the techniques described below, and the original data may be regenerated by listing all of the objects 30 having key values for which the client-supplied key is a prefix and retrieving those objects in the listed order. In some embodiments, individual chunks may be accessed, modified or removed without disturbing other chunks, which may improve system performance relative to managing data as a single, large object 30. It is contemplated that in some embodiments, a client 50 may be permitted to specify whether a data object it provides should be split into chunks or not.

As is the case with many of the storage service system components shown in FIG. 2, segregating the functionality of web services platform 100 from other components may improve maintenance and overall scalability of the storage service system. For example, additional hardware and software resources may be specifically provisioned for managing additional web services processing load independently of resources allocated to other tasks. Further, the effects of any resource failures associated with platform 100 may be confined to that particular functional area, thus facilitating the isolation and resolution of failures. However, in some embodiments, it is contemplated that the functionality of platform 100 may be integrated into other components. For example, coordinator(s) 120 may be configured to include the tasks associated with platform 100.

It is also noted that while web services platform 100 may represent the primary interface through which clients 50 may access the features of the storage service system, it need not represent the sole interface to such features. For example, in some embodiments coordinator(s) 120 may be configured to support an alternate API that may be distinct from a web services interface. Such an alternate API may be used, for example, to allow clients internal to the enterprise providing the storage service system to bypass web services platform 100. In some cases, the accounting and/or credentialing services of platform 100 may be unnecessary for internal clients such as administrative clients.

Coordinators 120 may be configured to coordinate activity between web services platform 100 and other components of the storage service system. In one embodiment, the primary responsibilities of coordinators 120 may include conducting read and write activity of object data 33 and metadata 31 for objects 30 in response to web services requests directed to those objects 30. For example, as described in greater detail below, object read access may involve performing an access to a keymap instance 140 to retrieve locators that indicate the bitstore nodes 160 where replicas of a given object 30 are stored, followed by performing an access to a particular bitstore node 160 in order to read the requested data. Similarly, object creation or modification may involve storing a number of replicas of objects 30 to various bitstore nodes 160 and updating keymap instance 140, if necessary, to reflect the locators of the created or modified replicas. In some embodiments, coordinators 120 may be configured to perform these read and write operations to keymap instances 140 and bitstore nodes 160. However, it is noted that in certain embodiments, coordinators 120 may not operate to create the full number of desired replicas of an object 30 at the time of its creation or modification. As described in greater detail below, in some embodiments a write operation to an object 30 may be considered complete when coordinators 120 have completed writing a certain number of replicas of that object 30 (e.g., two replicas). Further replication of that object 30 may be completed as an out-of-band or asynchronous operation by replicator 180. That is, in such embodiments, the in-band or synchronous portion of the object creation or modification operation may include the generation of fewer than the total desired number of replicas of the affected object 30. It is noted that while coordinator 120 is illustrated as a distinct component from keymap instances 140, bitstore nodes 160, and other system components, it is possible in some embodiments for an instance of coordinator 120 to be implemented together with another system component (e.g., as software components executable by a single computer system). Thus, although the description herein may refer to coordinator 120 storing or retrieving data to or from a bitstore node 160, a keymap instance 140, or another component, it is understood that in some embodiments such processing may occur within shared computing system resources.

As described above with respect to FIG. 1, in some embodiments the storage service system may include a bucket-based storage model in which keys for various objects 30 may be grouped into buckets 20 for administrative (e.g., accounting, billing), security or other purposes. In one embodiment, coordinators 120 may be configured to process various bucket-related operations in response to corresponding web services requests from clients 50. For example, coordinators 120 may be configured to perform some or all of the following bucket operations:

Create bucket: Generate and store a new bucket name for a bucket 20.

Delete nonempty bucket: Delete a given bucket 20 including associated metadata 21 and all keys associated with objects 30 within given bucket 20.

Delete empty bucket: Delete given bucket 20 and associated metadata 21 only if no keys of objects 30 are associated with given bucket 20, otherwise return an error condition.

Write bucket data: Write data (e.g., metadata 21) to an existing bucket 20.

List bucket keys: List keys of objects 30 associated with a given bucket 20 (optionally sorted or filtered according to a pattern, regular expression, wildcards, etc.).

List buckets: List buckets 20 associated with a given subscriber (e.g., a user or client 50).

In some embodiments, coordinators 120 may be configured to generate identifiers for newly created buckets 20 using a suitable random number algorithm with a low probability of generating collisions. In other embodiments, coordinators 120 may be configured to support client-specified bucket identifiers, for example by checking requested identifiers for uniqueness with respect to existing bucket identifiers upon a client request for bucket creation.

As mentioned above, instances of objects 30 may be replicated across different bitstore nodes 160, for example to increase the likelihood that object data will survive the failure of any given node 160 or its related infrastructure. Object replication within the storage service system presents several opportunities for management and optimization that may be addressed in the illustrated embodiment by nodepicker 130 and replicator 180, as follows.

When coordinator 120 receives a request to write an object 30, it may correspondingly write object 30 to a given number of nodes 160 before declaring the write to be complete. However, the number and particular selection of nodes 160 to which object 30 should be written may vary depending on a number of different storage policy considerations. For example, requiring that a certain minimum number of replicas (e.g., two or three) of object 30 have been successfully written before the write operation is considered to be completed may be prudent in order for the written data to be durable in view of possible failures. However, it may also be desirable to ensure that the nodes 160 chosen to store the minimum number of replicas are distributed among different possible loci of failure, or areas. For example, nodes 160 that are located in the same data center may be more likely to fail concurrently (e.g., due to a catastrophic failure such as a natural disaster, power failure, etc.) than nodes 160 that are geographically separated.

Nodepicker 130, which may be referred to generically as storage node selection logic, may be configured as a service accessible by coordinator 120 and replicator 180 that, in one embodiment, may implement algorithms for selecting nodes 160 for object read and write operations such that various storage policies are satisfied. For example, in the case of writing an object 30 as outlined above, nodepicker 130 may operate to develop a write plan, or a particular sequence of nodes 160 to which the object 30 should be written. In developing a particular write plan, nodepicker 130 may be configured to ensure that the write plan has a reasonable chance of succeeding—for example, that the nodes 160 specified in the write plan are in fact operational and are expected to have sufficient storage resources available to accept the object 30—and that the write plan, if completed, would satisfy all storage policies pertinent to write operations. Example write storage policies may include the following:

Durability policy: If the write plan successfully completes, instances of object 30 will be stored on at least N different nodes 160.

Area diversity policy: If possible, the write plan will include nodes 160 distributed among at least M different areas.

Locality policy: If possible, the write plan will give preference (e.g., in number) to nodes 160 in an area local to the requesting coordinator 120.

Load balancing policy: Attempt to equalize write request traffic among nodes 160 (e.g., to avoid "hot nodes").

Space balancing policy: Attempt to equalize the storage resource capacity utilization among nodes 160.

Lowest-cost chain policy: Attempt to minimize the total cost (e.g., network latency) of the sequence of node write operations in the write plan.

It is noted that in various embodiments, nodepicker 130 may be configured to take some or all of these policies, or other policies not listed, into account when formulating a given write plan. Further, different policies may be weighted with different priorities. For example, in one embodiment the durability policy may be a mandatory policy that all write plans must satisfy, while the remaining policies may be satisfied on a best-effort basis. In some cases, some storage policies may conflict with others. For example, the area diversity property, which favors wide distribution of object instances among different areas, is generally contrary to the locality policy, which favors localizing object instances within a particular area. If the number of object instances is sufficiently large, it may be possible to satisfy both policies. For example, if five instances of an object 30 are to be created, it may be possible to store two instances to two distinct areas and three instances within a third distinct area local to the requesting coordinator 120, thus satisfying both the locality and area diversity policies. If it is not possible to satisfy all policies specified for a write plan, nodepicker 130 may attempt to prioritize those policies that will be satisfied and create a best-effort write plan, or may return an error indication to the requesting coordinator 120 indicating that the object write cannot be satisfactorily performed.

In some embodiments, nodepicker 130 may also assist coordinators 120 in reading objects 30. For example, an object read operation may be requested by a coordinator 120 other than the coordinator that originally or most recently wrote the requested object 30. Thus, instances of object 30 that may have been stored locally with respect to the writing coordinator 120 may not be local with respect to the reading coordinator 120. Nodepicker 130 may be configured to identify the node 160 that may offer the best read performance available to the reading coordinator 120. For example, nodepicker 130 may identify a node 160 that is closest to the reading coordinator 120 (e.g., in terms of geographic distance or network topology) or a node 160 that offers the highest read bandwidth (e.g., the least loaded node 160 or the node 160 having a higher-performance class of storage hardware), or nodepicker 130 may use other performance criteria for selecting a node 160 from which to read object 30. In other embodiments, rather than optimize the performance of the read operation with respect to the reading coordinator 120, nodepicker 130 may globally plan concurrent read operations so as to optimize the performance of the system as a whole (e.g., to maximize global read throughput).

To develop write plans and to advise coordinators 120 with respect to object read operations, nodepicker 130 may be configured to monitor the state of nodes 160, e.g., with respect to their operational status and available resources. In one embodiment, nodepicker 130 may be configured to interact with an instance of DFDD 110 (described below) in order to identify the nodes 160 within the storage service system that are currently operational. Once nodepicker 130 is aware of the operational nodes 160, it may query those nodes to ascertain the resources (e.g., storage capacity) available at each one. Because the operational and resource states of nodes 160 may change over time, in some embodiments nodepicker 130 may occasionally refresh operational state information via DFDD 110 and poll the resultant nodes 160 to refresh their resource state information. It is noted that in some instances, nodepicker 130 may not have a perfectly synchronous view of the state of nodes 160. For example, a particular node 160 believed to be available by nodepicker 130 may in fact have failed since the last update of state information. In such instances, nodepicker 130 may be unable to guarantee that its read or write plans may be able to be completed by a coordinator 120. If a coordinator 120 cannot access a node 160 that is specified by nodepicker 130, the related operation may fail and be reattempted by the coordinator 120 in its entirety, or the coordinator 120 may negotiate with nodepicker 130 to revise the requested plan. In some cases, if the failure of a node 160 specified in a write plan impacts only optional or best-effort storage policies while still allowing mandatory storage policies to be satisfied, the write plan may be allowed to complete. In some such embodiments, replicator 180 may be configured to attempt to satisfy the unsatisfied storage policies at a later time, as described below.

In some embodiments, multiple instances of nodepicker 130 may be deployed throughout the storage service system. For example, a respective instance of nodepicker 130 may be deployed for each instance of coordinator 120. While nodepicker 130 may be deployed as a service that may be accessed from coordinators 120 (and replicator 180) via an API, this configuration is not essential. In other embodiments, the functionality of nodepicker 130 may be incorporated directly within instances of coordinator 120 and/or replicator 180.

As mentioned above, the reliability and availability of object data may be increased by replicating objects 30 throughout the storage service system. For example, distributing instances or replicas of objects 30 within a geographically-dispersed system may improve the performance of similarly-dispersed clients 50 that attempt to access such objects 30 by possibly locating some object instances closer to such clients. (It is noted that in the context of object replication, the terms "instance" and "replica" may be used interchangeably herein.) Further, object replication may generally decrease the chances of data loss resulting from destruction of a particular object instance. However, it may be the case in some embodiments that at a given point in time, the number of valid replicas of an object 30 may be less than a desired or target number of replicas. For example, a replication storage policy to be enforced across the storage service system may specify that a particular target number of replicas of each object 30 (e.g., 3 or any other suitable number) should exist at any given time. However, for a given object 30, the actual number of valid replicas might be less than the target number, for a variety of reasons. For example, a previously valid replica may become inaccessible due to a failure of the device on which it was stored. Alternatively, in some embodiments the number of instances of an object 30 that are written by a coordinator 120 may be less than the target number of replicas for that object 30. For example, as described above, the instances may be written according to a write plan specified by nodepicker 130, which may take into account a durability policy that requires fewer instances than the target number.

In one embodiment, replicator 180 may operate to examine objects 30 to determine whether the number of valid replicas of each object 30 satisfies a target number (e.g., whether the number of replicas is at least the target number at the time the determination is made). Specifically, in one embodiment, replicator 180 may be configured to continuously iterate over records specifying the number and location of instances of each object 30. For example, replicator 180 may reference the replicator keymap 190, which, like keymap instances 140 described in greater detail below, may be configured to store mappings between object keys and corresponding locators identifying replicated object instances. (In other embodiments, replicator 180 may consult one of keymap instances 140 rather than a dedicated instance of the keymap.) In some embodiments, it is contemplated that multiple instances of replicator 180 may be configured to concurrently examine different portions of the keymap space, which may reduce the overall amount of time required to examine the status of all objects 30 managed by the storage service system.

If replicator 180 determines that the target number of valid replicas is not satisfied for a given object 30, it may be configured to write additional replicas of the given object 30, in a manner similar to coordinator 120 performing a write operation to the given object 30. For example, replicator 180 may interface with nodepicker 130 to obtain a write plan for creating additional replicas, as described above. Alternatively, replicator 180 may implement its own algorithms reflecting policies for generating object replicas. In some embodiments, replicator 180 may accord different priorities to creating replicas for objects 30 depending upon the condition under which additional replicas are required. For example, an object 30 that has fewer than the target number of locators listed in the replicator keymap 190 may have been recently written by coordinator 120. By contrast, an object 30 that has the target number of locators of which some are invalid may have exhibited a failure of underlying storage. As a matter of policy, replicator 180 may attempt to correct the former case before the latter, or vice versa. Alternatively, replicator 180 may attempt to generate additional replicas for any object 30 having fewer than the target number of valid replicas whenever this condition is encountered, regardless of the particular circumstances giving rise to the condition.

As mentioned above, the overall reliability of storage of an object 30 may be increased by storing replicas of object data, for example within different areas or data centers. However, it is noted that in some embodiments, each replica need not correspond to an exact copy of the object data. In one embodiment, an object 30 may be divided into a number of portions or "shards" according to a redundant encoding scheme (such as a parity, error correction code or other scheme), such that the object data may be recreated from fewer than all of the generated portions. For example, using various schemes to generate N portions from an object 30, the object data may be recreated from any N−1 of the portions, any simple majority of the N portions, or other combinations of portions according to the encoding scheme. In such an embodiment, the replicas of object 30 may correspond to the generated portions, or certain combinations of the portions. Such an approach may provide effective fault tolerance while reducing data storage requirements in comparison to storing multiple complete copies of the object data. However, it is noted that in some embodiments, redundant encoding techniques may also be used in combination with complete replication of object data. For example, multiple individual complete copies of object data may be stored among nodes 160 as respective collections of multiple portions determined according to a suitable redundant encoding technique as mentioned above. Finally, it is noted that in some embodiments, certain objects 30 need not be stored with any degree of replication or fault tolerance at all. For example, as described below in conjunction with the description of storage classes, a client may request that an object 30 be stored according to a storage class that specifies little or no degree of fault tolerance, possibly at lower cost than for a storage class specifying a higher degree of fault tolerance.

Generally speaking, keymap instances 140 may provide records of the relationships between keys of objects 30 and locators of particular instances or replicas of objects 30. In storing such records, keymap instances 140 also reflect the degree to which objects 30 are replicated within the storage system (e.g., how many instances of an object 30 exist, and how they may be referenced). Bitstore nodes 160 may generally provide storage for individual instances of objects 30 as identified by locators. However, a given node 160 may be unaware of the state of an instance with respect to any other nodes 160, or of the relationship between an instance's locator and the key of its corresponding object 30. That is, generally speaking, the state information maintained by keymap instances 140 may be transparent to bitstore nodes 160. DFDD 110 may operate to detect and communicate state information regarding the operational status of nodes 160 and/or keymap instances 140 (and replicator keymap 190, if implemented), such that clients of DFDD 110 such as coordinators 120 and replicator 180 may obtain an accurate, though possibly delayed view of the detected status. These components are addressed in greater detail below.

One embodiment illustrating a physical deployment of certain components of the storage service system architecture of FIG. 2 is shown in FIG. 3. In the illustrated embodiment, a data center 300 is shown including two areas 310*a-b*. Additionally, areas 310*c-d* are shown externally to data center 300, and areas 310*a-d* are interconnected via network 60. Each of areas 310*a-d* includes a respective coordinator instance 120*a-d*. Areas 310*a-d* may also include various combinations of bitstore nodes 160 and keymap instances 140, as well as other components of FIG. 2 not shown in FIG. 3. For example, area 310*a* includes four bitstore nodes 160, area 310*b* includes three bitstore nodes 160 and a keymap instance 140, area 310*c* includes two bitstore nodes 160, and area 310*d* includes one bitstore node 160 and one keymap instance 140.

As mentioned above, in one embodiment each of areas 310*a-d* may be considered a locus of independent or weakly correlated failure. That is, the probability of any given area 310 experiencing a failure may be generally independent from or uncorrelated with the probability of failure of any other given area 310, or the correlation of failure probability may be less than a threshold amount. For example, two areas 310 may exhibit less than a 10% chance of failing concurrently. Failure correlation or independence may be measured using any suitable statistical or probabilistic technique and implemented in a variety of ways. For example, areas 310 may be physically separated or connected to independent utility grids, rendering it likely that a catastrophe that affects one area 310 will not affect the other. Similarly, within data center 300, distinct areas 310 may have independent backup power supplies, network connections or other redundant resources that may function to enable one area 310 to continue operating despite a failure of another area 310.

It is noted that in some embodiments, two areas 310 that have small but nonzero correlation between their respective likelihoods of failure may still be referred to as having independent likelihoods of failure. For example, despite each having robust and independent systems for backup power, cooling, etc., two areas 310 within a given data center 300 may be susceptible to concurrent failure in the event of a catastrophe of sufficient magnitude (e.g., an explosion sufficient to destroy the entire data center 300). However, the probability of an event sufficient to cause these two areas 310 to fail concurrently may be small enough that, for practical purposes, the two areas 310 may be said to have independent likelihoods of failure.

Areas 310 may include additional levels of hierarchy (not shown). For example, in one embodiment areas 310 may be subdivided into racks, which may be further subdivided into individual nodes, such as bitstore nodes 160, although any suitable area organization may be employed. Generally speaking, areas 310 may include computing resources sufficient to implement the storage service system components deployed within the area. For example, each bitstore node 160 may be implemented as an autonomous computer system that may include a variety of hardware and software components as described below in conjunction with the descriptions of FIGS. 4-9. Similarly, each keymap instance 140 may be implemented via a number of computer systems configured as described below in conjunction with the descriptions of FIGS. 10-22.

In some embodiments, components such as web services platform 100, coordinators 120, nodepicker 130, replicator 180, and DFDD 110 may be implemented via discrete computing resources within each area 310 in which the components are deployed. For example, each of these components may be implemented as a set of instructions and data executable by a respective computer system. Alternatively, some or all of these components may be implemented as processes that may execute concurrently on one or more computer systems. In some embodiments, computing resources used to implement some or all of these components may be shared with those resources used to implement bitstore nodes 160 or keymap instances 140. For example, a computer system may be configured to implement both some portion of keymap 140 functionality as well as coordinator 120 functionality. Generally speaking, any suitable partitioning of the components of FIG. 2 across computing resources deployed within individual areas 310 may be employed. It is noted that, as shown in FIG. 3, different areas 310 may include different combinations of storage service system components, and the embodiment shown is intended to be illustrative rather than limiting.

Additionally, different storage service system components may communicate according to any suitable type of communication protocol. For example, where certain components of FIG. 2 are implemented as discrete applications or executable processes, they may communicate with one another using standard interprocess communication techniques that may be provided by an operating system or platform (e.g., remote procedure calls, queues, mailboxes, sockets, etc.), or by using standard or proprietary platform-independent communication protocols. Such protocols may include stateful or stateless protocols that may support arbitrary levels of handshaking/acknowledgement, error detection and correction, or other communication features as may be required or desired for the communicating components. For example, in one storage service system embodiment, a substantial degree of inter-component communication may be implemented using a suitable Internet transport layer protocol, such as a version of Transmission Control Protocol (TCP), User Datagram Protocol (UDP) or a similar standard or proprietary transport protocol. However, it is also contemplated that communications among storage service system components may be implemented using protocols at higher layers of protocol abstraction. For example, like communications between clients 50 and web services interface 100, communications between storage service system components may be conducted using application layer protocols such as web services calls over HTTP, for example.

Bitstore Configuration

Figure 4:
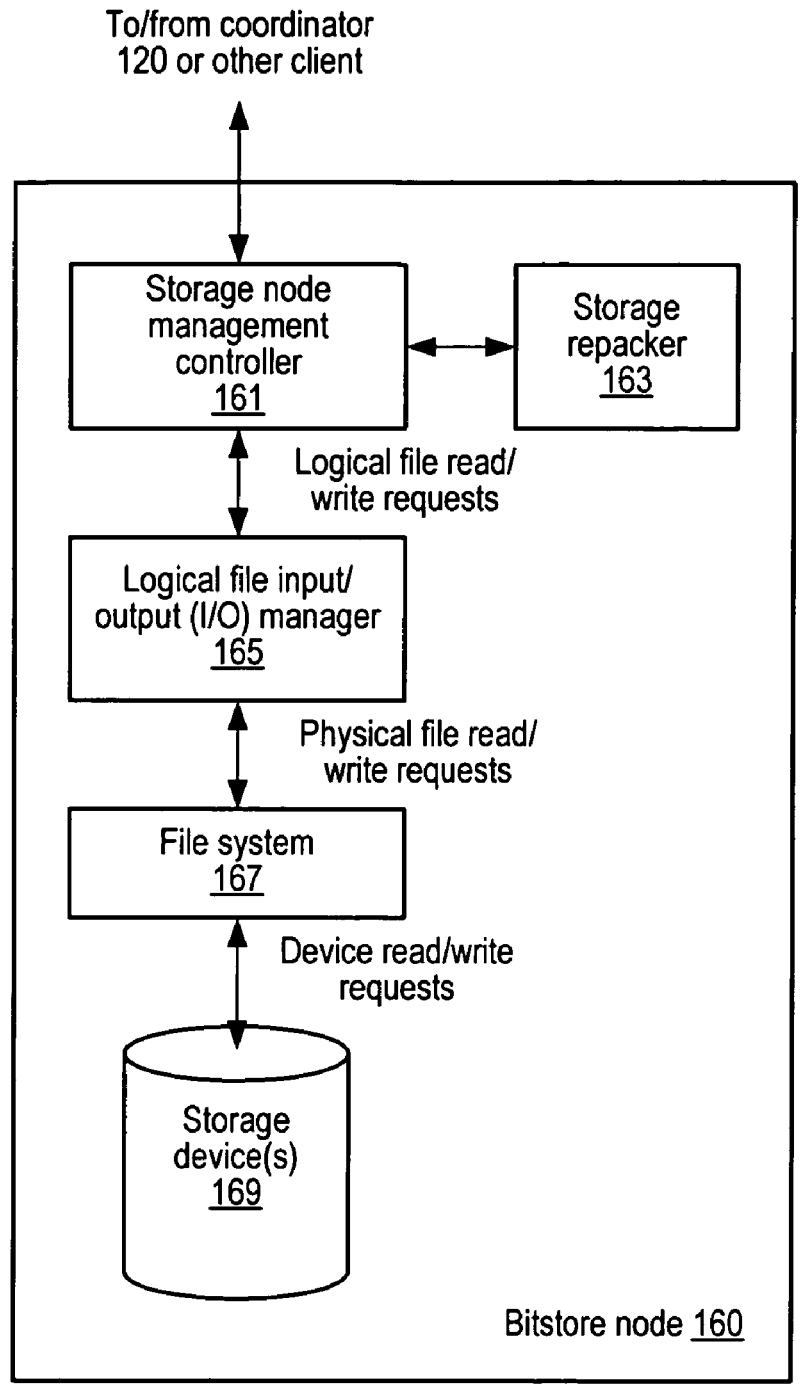
FIG. 4 is a block diagram illustrating one embodiment of a storage node.
Figure 5:
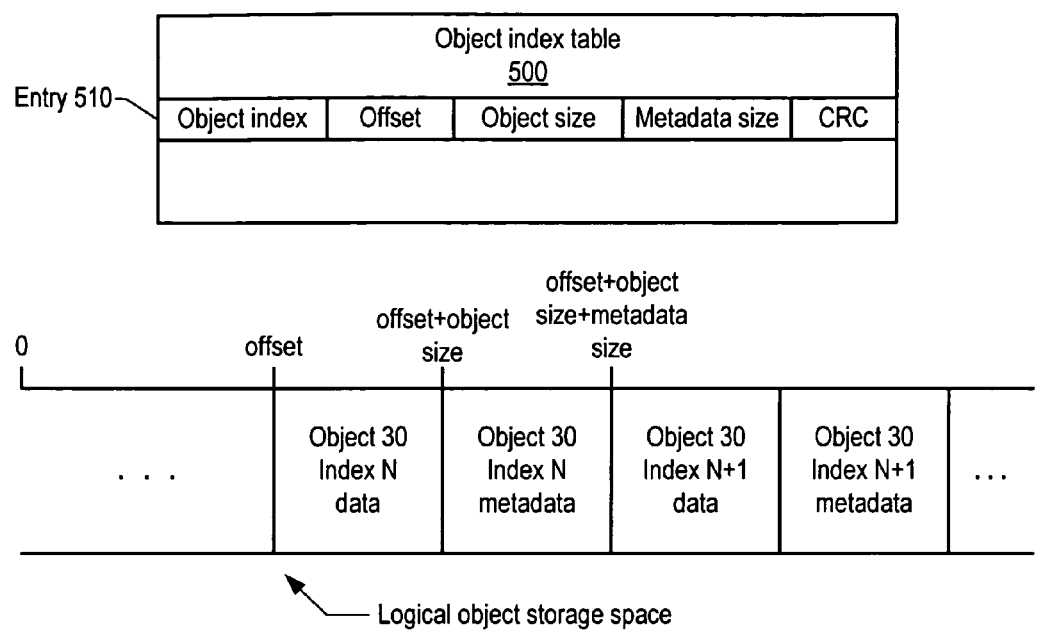
FIG. 5 is a block diagram illustrating one embodiment of data structures configured to organize data objects within a storage node.

As discussed above, in the storage service system architecture embodiment shown in FIG. 2, bitstore nodes 160 may generally operate to provide storage for the various objects 30 managed by the storage service system. One exemplary embodiment of a bitstore node 160 is shown in FIG. 4. In the illustrated embodiment, bitstore node 160 includes a storage node management (SNM) controller 161 configured to interface with a storage repacker 163 and a logical file input/output (I/O) manager 165. Manager 165 is configured to interface with a file system 167, which is in turn configured to manage one or more storage devices 169. In various embodiments, any of SNM controller 161, storage repacker 163, logical file I/O manager 165 or file system 167 may be implemented as instructions that may be stored on a computer-accessible medium and executable by a computer to perform the functions described below. Alternatively, any of these components may be implemented by dedicated hardware circuits or devices.

In one embodiment, SNM controller 161 may be configured to provide an object storage API to a client of node 160 as well as to coordinate the activities of other components of node 160 to fulfill actions according to the API. For example, a controller 120 may be configured to store and retrieve objects 30 to and from a given node 160 via the API presented by SNM controller 161. While API management is described herein as a feature of SNM controller 161, it is contemplated that in some embodiments, the API processing functions of node 160 may be implemented in a module or component distinct from SNM controller 161.

The object storage API may support object put, get and release operations. In one such embodiment, an object put operation, which may also be generically referred to as a store operation or a write operation, may specify the data and/or metadata of an object 30 as an argument or parameter of the operation. Upon completion on a given node 160, a put operation may return to the requesting client a locator corresponding to the stored object 30, which may uniquely identify the object instance on the given node 160 relative to all other objects 30 stored throughout the storage service system, as described in greater detail below.

Conversely, an object get operation, which may also be generically referred to as a read or retrieval operation, may specify a locator of an object 30 as a parameter. Upon completion, a get operation may return to the requesting client the object data and/or metadata corresponding to the specified locator. In some embodiments, the get operation may support a parameter that allows a requesting client to specify whether object data, metadata or both are to be returned to the client.

Like a get operation, an object release operation, which may also be generically referred to as a delete or remove operation, may specify a locator of an object 30 as a parameter. However, upon completion, a release operation may release storage resources previously associated with the referenced object 30, and such resources may then be used to store other objects 30. In one embodiment, once a locator is released, subsequent get operations to the locator may or may not succeed for a period of time. That is, a release operation may serve as a signal to node 160 that it may release storage resources for reuse, but node 160 may not attempt to do so immediately or to notify or otherwise synchronize such reuse with a client. Thus, continued attempts by a client to access an object 30 following its release may succeed for arbitrary periods of time, following which the object 30 may become inaccessible without notice. In other embodiments, node 160 may be configured to prevent client access to a locator that was previously released, regardless of whether the object data is still available.

It is contemplated that in various embodiments, put, get and release operations may employ other parameters and/or return various status, error or other indications according to any suitable protocol. For example, a put operation may return an error condition if there are insufficient resources on node 160 for the requested object 30 to be stored; or if the put cannot be completed for some other reason. It is also contemplated that in some embodiments, the object storage API of node 160 may include other operations. For example, the API may be configured to facilitate the creation of object replicas by supporting a replicate operation. In one embodiment, a replicate operation may operate similarly to a put operation, except that instead of supplying the data of the object 30 to be stored to a target node 160, a requesting client may specify a locator of that object 30 on a different node 160. The target node 160 may then interact with the specified node 160 to obtain the object data and/or metadata and may return to the client a locator of the object relative to the target node. In other embodiments, node 160 may support other suitable operations on objects 30.

It is noted that in some embodiments implementing put, get and release operations as described above, existing objects 30 may not be modified in place. Rather, an instance of an object 30 may be effectively modified by releasing the existing instance after writing a new instance that includes the modified data. Such an approach may simplify implementation of the underlying management layers of node 160, for example by reducing fragmentation or object relocation that may occur if a modification to an object 30 renders it smaller or larger than its original size. As described in greater detail below with respect to web services platform 100, in some embodiments the storage service system may support splitting of large objects into chunks, each of which may be managed as a distinct object 30. This approach may improve the performance of node 160 in processing large objects that may be frequently modified by limiting the scope of the chunks that may need to be rewritten. However, it is contemplated that in other embodiments, node 160 may include those features necessary to support modification of objects 30 in place rather than through the release-rewrite approach just described.

In the illustrated embodiment, logical file I/O manager 165 (or, simply, manager 165) may be configured to virtualize underlying device or file system characteristics in order to present to SNM controller 161 and repacker 163 one or more logically contiguous storage spaces in which objects 30 may reside. For example, a given object 30 may be located within a logical storage space according to its offset within the storage space and its extent from that offset (e.g., in terms of the object size, including data and metadata). By providing such a logical storage space, manager 165 may present a uniform view of underlying storage to SNM controller 161 regardless of the implementation details of such underlying storage.

To facilitate access to objects 30 within the logical storage space, in one embodiment manager 165 may be configured to assign an object index value (also referred to as an object index) to each object 30 stored to a node 160. Generally speaking, the index of any given object 30 may be unique within a particular node 160. For example, in one embodiment the object index may be obtained by incrementing a counter whenever an object 30 is stored to a node 160, and using the resulting counter value as the object index. (In embodiments where multiple object write operations are allowed to proceed concurrently, the counter increment may be synchronized, e.g., through serialization, to ensure that object index values are assigned in a consistent and predictable fashion.) A sufficiently large counter value, such as a 64-bit unsigned integer, for example, may ensure that for practical purposes every object 30 is assigned a unique index value. Such a counter may roll over after, say, $2^{64}$ objects have been stored, after which previously-generated index values may repeat. However, collisions are extremely unlikely, as it is highly improbable that the object 30 that was previously assigned a given index value will still exist within node 160 after the counter rolls over. It is noted that any other suitable method for assigning an object index may also be employed. As described below, object index values may be used in combination with a unique identifier of a node 160 to determine a locator value that may be used by coordinator 120 or other clients of node 160 to reference a particular object 30.

Manager 165 may be configured to use the unique object index values described above to organize information about where objects 30 are located within the logical storage space in ways that facilitate object access. For example, as shown in the upper portion of FIG. 5, in one embodiment manager 165 may be configured to store a table or similar data structure that may be organized for ready access via object index values. In the illustrated embodiment, index table 500 may include a number of entries 510, each of which may include a number of fields including an object index field, an offset field, an object size field, a metadata size field, and a cyclic redundancy check (CRC) field. As shown in the lower portion of FIG. 5 for several exemplary objects 30, the offset field of an entry 510 may specify the location of the beginning of the corresponding object 30 within the logical storage space, and the object size and metadata size fields may specify the degree to which the object data and metadata extend from the offset point. In the illustrated embodiment, object data precedes object metadata, although this order may be reversed in other embodiments. The CRC field may store the result of a cyclic redundancy check algorithm or other suitable type of checksum or hash algorithm. The value initially stored into the CRC field may be computed when an object 30 is initially stored to node 160. Subsequently, when the object 30 is accessed, the same algorithm may be applied to the object data and or metadata and the resultant value compared against the stored CRC field value. If the comparison results in a mismatch, the integrity of the stored data may have been compromised. It is noted that in other embodiments, entries 510 may include additional or different fields from those shown. For example, the CRC field may be omitted or implemented elsewhere. Additionally, absolute locations of object data and metadata may be stored in addition to or instead of relative offsets.

Repacker 163 may be configured to operate on the logical object storage space to remove gaps that may appear when objects 30 are released and their associated storage resources are reclaimed. In one embodiment, repacker 163 may be configured to scan the logical object storage space (e.g., periodically or continuously) to identify objects 30 that have been marked by SNM controller 161 and/or manager 165 as having been released by a previous release operation. Repacker 163 may then cause the entries 510 of those objects 30 with indexes that appear after the index of the released object 30 to be updated to reflect the removal of the released object 30, which may effectively result in those objects 30 shifting towards the origin point of the logical object storage space. For example, if object N in the lower portion of FIG. 5 were to be released, repacker 163 may operate to cause the entry 510 corresponding to object N+1 to be updated to reflect the offset field of object N as the new offset field of object N+1. Repacker 163 may also cause the entry 510 associated with object N to be deleted, and may update the offsets of objects following object N+1 to reflect the shift. In one embodiment, manager 165 may cause corresponding shifts of object data and metadata to occur within the files or structures underlying the logical object storage space and/or storage devices 169. Thus, in some embodiments, the operation of repacker 163 may reduce fragmentation of underlying storage structures and may correspondingly improve the object access performance of node 160.

In some embodiments, manager 165 may be configured to execute on multiple different execution platforms including different types of hardware and software. In some such embodiments, one or more additional layers of abstraction may exist between the logical object storage space presented by manager 165 to SNM controller 161 and its clients. For example, in the illustrated embodiment, manager 165 may be configured to implement the logical object storage space as one or more physical files managed by file system 167. Generally speaking, file system 167 may be configured to organize various types of physical storage devices 169 into logical storage devices that may store data in logical units referred to herein as physical files. Logical storage devices managed by file system 167 may be hierarchical in nature. For example, file system 167 may support a hierarchy of directories or folders that may be navigated to store and access physical files. Generally speaking, file system 167 may be configured to track and manage the relationship between a given physical file and the locations of storage devices 169 where corresponding data and/or metadata of the physical file are stored. Thus, in one embodiment, manager 165 may manage the mapping of the logical object storage space to one or more physical files allocated by file system 167. In turn, file system 167 may manage the mapping of these physical files to addressable locations of storage devices 169.

File system 167 may generally be integrated within an operating system, although any given operating system may support a variety of different file systems 167 that offer different features for management of underlying devices 169. For example, various versions of the Microsoft Windows® operating system support file systems such as the NT file system (NTFS) as well as the FAT32 (File Allocation Table-32) and FAT16 file systems. Various versions of the Linux and Unix operating systems may support file systems such as the ext/ext2 file systems, the Network File System (NFS), the Reiser File System (ReiserFS), the Fast File System (FFS), and numerous others. Some third-party software vendors may offer proprietary file systems for integration with various computing platforms, such as the VERITAS® File System (VxFS), for example. Different file systems may offer support for various features for managing underlying storage devices 169. For example, some file systems 167 may offer support for implementing device mirroring, striping, snapshotting or other types of virtualization features.

It is noted that in some embodiments, still further layers of abstraction may exist between manager 165 and storage devices 169. For example, in some embodiments a volume manager layer may be provided between file system 167 and storage devices 169, and may be configured to perform some or all of the virtualization features mentioned above. Alternatively, a particular storage device 169 may be configured as a standalone array of hard disk drives or other devices that includes a virtualization controller. The virtualization controller may be configured to present the disk drives to file system 167 as a single physical device, although internally the virtualization controller may support arbitrarily complex mappings of the device's storage address space to the disk drives, similar to virtualization mappings that may be supported by a volume manager or within file system 167 as mentioned above. It is also noted that in some embodiments, fewer layers of abstraction than those shown may exist. For example, in some embodiments, manager 165 may be configured to interact directly with storage devices 169, e.g., as raw physical devices, without using a file system 167. Generally speaking, storage devices 169 may include any suitable types of storage devices that may be supported by file system 167 and/or manager 165. Storage devices 169 may commonly include hard disk drive devices, such as Small Computer System Interface (SCSI) devices or AT Attachment Programming Interface (ATAPI) devices (which may also be known as Integrated Drive Electronics (IDE) devices). However, storage devices 169 may encompass any type of mass storage device including magnetic- or optical-medium-based devices, solid-state mass storage devices (e.g., nonvolatile- or "Flash"-memory-based devices), magnetic tape, etc. Further, storage devices 169 may be supported through any suitable interface type in addition to those mentioned above, such as interfaces compliant with a version of the Universal Serial Bus or IEEE 1394/Firewire® standards.

As described above, for any given instance of an object 30 stored within a storage service system, a corresponding locator may uniquely identify that instance across all of the nodes 160 within the system. In one embodiment, a locator may be generated as a concatenation, combination or other function of the object index value that may be assigned to an object instance by manager 165 as well as a unique identifier or "node ID" corresponding to the node 160 on which the object instance is stored. For example, as described above, a 64-bit object index value may be combined with a 64-bit node ID to yield a 128-bit locator. Such a locator would allow for each of as many as $2^{64}$ unique nodes 160 to store as many as $2^{64}$ unique object instances, although smaller or larger numbers of bits may be employed to form locators in various embodiments.

In one embodiment, a node ID may be formed through the concatenation or combination of a unique network address, such as an Internet Protocol (IP) address corresponding to a given node 160, with a timestamp or datestamp. For example, a node 160 may be assigned a node ID according to its IP address (e.g., at node startup/initialization or at the time the node ID is assigned, if not during initialization) in combination with a timestamp reflecting the time at which the IP address was assigned, or a time during which the IP address is known to be valid. Generally speaking, two distinct nodes 160 belonging to the same IP address space will not validly be assigned the same IP address at any given time. Thus, the combination of a node's IP address and a timestamp value may yield an identifier unique to that node. For example, a 32-bit IP address may be concatenated or combined with a 32-bit timestamp (e.g., that represents the number of seconds elapsed since some common reference time) to yield the 64-bit node ID referred to above, although other bit widths may be employed. It is also contemplated that other techniques may be employed for assigning unique node IDs that do not depend on node IP addresses. For example, a central authority such as a name server may delegate node IDs upon request in a fashion that guarantees the uniqueness of node IDs, similar to the assignment of object index values within a node 160 as described above.

It is noted that in embodiments where a node ID is derived from a node's IP address, the node ID may not reflect the current IP address of a node 160 at any given time. For example, the node ID may persist until a node 160 is reset, but the node's IP address may be changed or reassigned following generation of the node ID. Also, in some embodiments a node ID may be hashed, encrypted or obfuscated in a deterministic way in order to prevent storage clients 50 or other potentially malicious entities from decoding locators to determine actual node IP addresses.

The operation of exemplary embodiments of get, put and release operations with respect to the embodiment of node 160 of FIG. 4 is illustrated in FIGS. 6-8. Referring first to FIG. 6, a get operation may begin in block 600 where the operation is received at node 160 from a coordinator 120 or other client. For example, a coordinator 120 may issue a get operation to a particular locator that includes a node ID and an object index value, as described above. The node ID may be used directly to route the get operation to the appropriate node 160, for example if the node ID reflects the current IP address of the target node 160. Alternatively, a directory service such as DFDD 110, described below, may be employed to resolve the node ID of a locator into an addressable endpoint or destination through which the get operation may be routed to the appropriate node 160.

Once received by node 160, the get operation may be processed to identify the extents of the targeted object instance within the logical object storage space of node 160 (block 602). For example, controller 161 may receive the get operation and convey it to manager 165. In turn, manager 165 may use the object index portion of the locator referenced by the get operation to access index table 500 in order to obtain the location of the desired object instance within the logical object storage space. For example, manager 165 may obtain the offset into the logical object storage space where the object instance begins, as well as the length of the object instance from that offset. In some embodiments, a get operation may specify whether object data, metadata, or both are desired. In such embodiments, manager 165 may determine the logical object storage extents relevant to the requested data. For example, if both object data and metadata are desired, manager 165 may use both the object data size and metadata size to determine the extent from the object offset to be retrieved. As noted above, in other embodiments, storage extents for object instances may be stored and managed by manager 165 in different ways, such as through absolute locations rather than relative offsets within the logical object storage space.

Object extents within the logical object storage space may then be mapped to extents within one or more corresponding files within a physical file storage space (block 604). For example, manager 165 may map the logical object storage space to one or more files managed by file system 167, and may issue appropriate file access operations to file system 167 to obtain data corresponding to the desired object extents, e.g., by referencing one or more file names as well as locations or offsets within the named files to be read. It is contemplated that in alternative embodiments, controller 161 may be configured to bypass the logical block storage space features managed by manager 165, and may instead interact directly with physical files managed by file system 167.

References to physical files may then be mapped to device-relative requests (block 606). For example, file system 167 may be configured to generate one or more read requests to specific addressable locations of storage device(s) 169, such as logical block addresses (LBAs) or addresses specific to device geometries (e.g., cylinder, track, sector and/or head). As noted above, in some embodiments manager 165 may be configured to bypass file system 167 and manage storage device(s) 169 directly.

Requested object data may then be retrieved from storage device(s) 169 (block 608) and returned to the requesting client (block 610). For example, retrieved data may be passed back up through the request hierarchy shown in FIG. 4, or may be returned directly from storage device(s) 169 or file system 167 to controller 161 for conveyance to the requesting client.

As shown in FIG. 7, in one embodiment, a put operation may begin in block 700 when the operation is received at node 160 from a coordinator 120 or other client, in a manner similar to that described above for block 600 of FIG. 6. For example, a coordinator 120 may issue put operations to nodes 160 specified in a write plan generated by nodepicker 130. In contrast to a get operation, a put operation may include the object data and/or metadata to be stored, and may optionally include additional parameters specifying the length of the data and/or metadata.

Once received by node 160, the put operation may be processed to assign storage extents for the object instance within the logical object storage space (block 702). In one embodiment, manager 165 may be configured to assign an object index value to the new object instance and to record in index table 500 a new entry 510 specifying the offset of the new object instance. For example, the offset of the new entry may be determined relative to the storage extents (e.g., offset and length) of the existing object instance having the highest index value. If the length of the data and/or metadata of the new object instance were not specified as parameters to the put operation, manager 165 or controller 161 may be configured to compute these for inclusion in the new entry 510.

Newly assigned storage extents within the logical object storage space may then be mapped to extents within one or more corresponding files within a physical file storage space (block 704). For example, the assigned extents for the new object instance may be appended to the end of one or more existing physical files, or otherwise located within existing or newly allocated physical files. Physical file extents may then be mapped to storage device extents (block 706), e.g., by file system 167 in a manner similar to that described above for get operations, and the object instance data and/or metadata may then be stored to storage device(s) 169 (block 708).

Upon confirmation that the data and/or metadata has been successfully written to storage device(s) 169, a locator corresponding to the stored object instance may be returned to the requesting client (block 710). For example, manager 165 may be configured to append the generated object index value to the node ID of node 160, and may return the resulting value as the object locator upon an indication from file system 167 that the physical file write operations successfully completed.

As shown in FIG. 8, in one embodiment a release operation may begin in block 800 when the operation is received at node 160 from a coordinator 120 or other client, in a manner similar to that described above for block 600 of FIG. 6. A release operation may simply specify the locator of the object instance to be released, although in other embodiments other arguments may also be supplied.

Like a get operation, once received by node 160, a release operation may be processed to identify the extents of the targeted object instance within the logical object storage space of node 160 (block 802). For example, controller 161 may receive the release operation and convey it to manager 165. In turn, manager 165 may use the object index portion of the locator referenced by the release operation to access index table 500 in order to identify the corresponding entry 510 of the referenced object instance. The referenced object may then be marked as released (block 804). For example, manager 165 may be configured to set the offset or another field of entry 510 to an illegal value, such as a negative number, which may signify that the entry is no longer valid. An acknowledgement may then be returned to the requesting client indicating that the object has been released (block 806).

As described above, storage resources associated with an object instance may not be immediately freed, reclaimed or reallocated for other use when the object instance is released. Rather, in one embodiment, those resources may persist until an independent process operating asynchronously with respect to the release operation reclaims them. FIG. 9 illustrates the operation of one embodiment of such a process, such as may be implemented by storage repacker 163, for example. In block 900, an object index entry corresponding to a particular object instance stored on node 160 may be selected. For example, repacker 163 may be configured to select index entries 510 from index table 500 in sequential order according to the object index values stored in the entries. Subsequently, the selected entry may be examined to determine if the corresponding object instance has been released (block 902). For example, repacker 163 may check the offset field or another field to ascertain whether the field has been set to a value indicating that the corresponding object instance has been released, such as a negative value or some other value.

If the selected object has not been released, operation may proceed back to block 900 where another object may be selected. If the selected object has been released, the logical object storage space may be repacked to reclaim the storage resources corresponding to the released object (block 904). For example, repacker 163 may be configured to adjust the index entries 510 of those object instances that follow the released object within the logical object storage space, such that the offset of the first such object instance is set to the offset of the released object, the offset of the next such object instance is set as a function of the data size, metadata size and offset of the first such object instance, and so forth. However, in some embodiments, not all of the object instances following a released object instance need be repacked before a new object is selected for examination. For example, repacking may be interleaved with object selection, such that each object encountered is repacked when it is selected for examination.

In some embodiments, manager 165 may perform similar repacking or consolidation operations within the physical file storage space in response to the repacking of the logical object storage space. For example, manager 165 may cause logical object data extents to be remapped to different physical file data extents. Similarly, in some embodiments file system 167 may perform analogous repacking or consolidation operations among storage device(s) 169 in response to repacking of the physical file storage space. In other embodiments, repacking of the physical file storage space or the storage devices themselves may occur independently of the logical object storage space repacking initiated by repacker 163. For example, file system 167 may be configured to defragment physical files stored on storage device(s) 169 by rearranging the mapping of physical file storage extents to device storage extents such that the mapped device storage extents are mostly or entirely contiguous relative to the access pattern of the storage device.

Following repacking of the logical object storage space, the index entry corresponding to the released object may be deleted (block 906) and operation may continue from block 900 where another object is selected. As noted above, in some embodiments, repacking may occur "on the fly" as objects are selected, which may improve overall utilization of the logical object storage space while minimizing the number of operations required to relocate objects.

It is noted that in some embodiments, any of the get, put, release or other operations that may be supported by node 160 may support various types of handshaking, acknowledgement, or error handling protocols with respect to the requesting client. For example, if a client requests a malformed request for an operation (e.g., fails to supply a necessary parameter), or if node 160 cannot satisfactorily complete the operation (e.g., has insufficient resources to honor a put operation), node 160 may return an error indication to the requesting client. Such an indication may or may not include specific details regarding the nature of the fault condition.

In one embodiment, a coordinator 120 may be configured to independently convey operations to each respective node 160 targeted by the operations, even when multiple operations may have data in common. For example, in the case of a put operation where an object 30 is being written to multiple nodes 160 according to a write plan, a coordinator 120 may independently communicate with each specified node 160. However, in an alternative embodiment, operations having common data and/or parameters that are intended for multiple destination nodes 160 may be chained. In one embodiment, a coordinator 120 or other client may initiate a chained operation by specifying each recipient in a parameter of the operation, such as a recipient list. Multiple recipients indicated in an operation may signify chaining by default, or another parameter may be used to mark the operation as chained. The coordinator 120 or other client may then initiate the chained operation by conveying it to a first one of the destination nodes 160 specified in the operation.

Upon receiving the chained operation, a node 160 may process the operation and may forward it to another one of the destination nodes 160 specified in the operation. Prior to such forwarding, a recipient node 160 may remove itself from the list of destinations included in the operation to signify receipt and avoid circular forwarding. The operation may be forwarded concurrently with the recipient node's processing. Alternatively, forwarding may be contingent upon the recipient node's successful completion of processing. In some embodiments, a chained operation may be conveyed to recipients in the order those recipients are indicated within the operation. In other embodiments, nodes 160 may dynamically select the next recipient, for example, by determining which of the remaining destinations is closest, least loaded, or satisfies some other selection criterion. It is noted that in some embodiments, a combination of chained and non-chained operations may be generated by a coordinator 120 or other client. For example, if the same data is the target of a put operation destined for six distinct nodes 160, a coordinator 120 may generate a single chained operation specifying the six destination nodes, or two chained operations each specifying three of the destination nodes. Other combinations are also possible, including generation of six non-chained operations that coordinator 120 may independently convey to each of the respective destination nodes 160.

Keymap Configuration

As described above, various bitstore nodes 160 may be configured to provide storage for instances of an object 30. Nodes 160 may not provide any particular support for redundancy or data security individually; in fact, in some embodiments nodes 160 may be implemented using generic computing platforms running open-source operating systems (e.g., Linux) and providing storage via inexpensive, commodity hard drives (e.g., ATAPI/IDE hard drives). In such embodiments, individual systems may not be especially fault-tolerant. Rather, data security and redundancy may be provided through replication of objects 30 across a number of nodes 160, as described above.

As discussed previously, a given object 30 may correspond to a key that may be specified by a storage client. Individual instances of the given object 30 may correspond to respective locators that may uniquely identify those instances across the collection of nodes 160 included in the storage service system. In one embodiment, each keymap instance 140 deployed within the storage service system may be configured to store and maintain the relationships or mappings between a key and all corresponding locators for a given object 30 and its replicated instances stored among nodes 160. In the discussion below, the general features and functionality of various embodiments of keymap instance 140 are discussed, followed by a description of how a particular embodiment of keymap instance 140 may be implemented.

Figure 10:
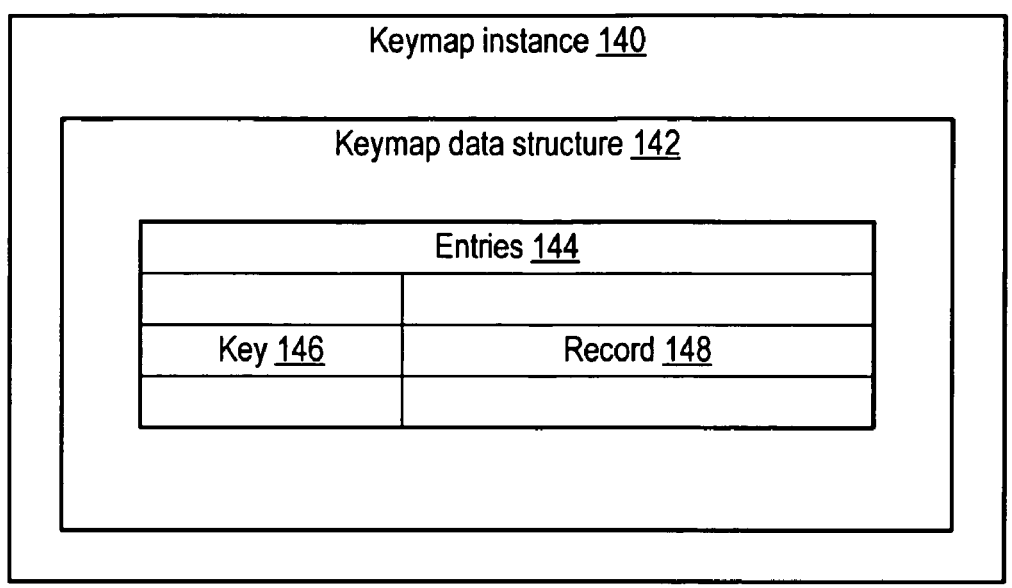
FIG. 10 is a block diagram illustrating one embodiment of a set of keymap instance data structures.

In one embodiment, a given keymap instance 140 may be configured to store details of relationships between various keys and associated locators within one or more tables or any other suitable type of data structure. For example, in one embodiment as shown in FIG. 10, a keymap instance 140 includes a keymap data structure 142 having a number of entries 144. Each entry includes a respective key 146 as well as an associated record 148. In some embodiments, as described in greater detail below, the organization of the data structure used to organize entries 144 may be complex. However, from a functional standpoint, keymap instance 140 may generally preserve a one-to-one, table-like relationship between a given key 144 and its corresponding record 148.

Record 148 may generally include the locator(s) corresponding to a given key 144, but may include other information as well. For example, one embodiment of record 148 may be structured as follows:

```
struct KeyRecord {
    int16_t version;
    int16_t storageClass;
    int64_t creationDate;
    int64_t objectSize;
    uint32_t crc32;
    int8_t numLocators;
    struct locator {
        int64_t nodeID;
        int64_t objectIndex;
    } replicas [ ];
}
```

While this example data structure is expressed using the syntax of the C programming language, it may be implemented using any suitable language, representation or format. Alternative embodiments of record 148 may include more, fewer or different fields than those shown. In some instances, record 148 may be referred to as an "inode," drawing on the similarity of purpose of record 148 in organizing a storage space to the inode structure employed in certain types of Unix file systems. However, the use of the term "inode" in the present context is not intended to invoke specific details of the implementation or use of inodes within file systems or other storage contexts.

In the above embodiment, record 148 includes seven particular elements. The 16-bit version element may be used to store a unique identifying value that is particular to the format of record 148. For example, different versions of record 148 may be used in different implementations of keymap instance 140, and in some embodiments the records 148 stored within a given keymap instance 140 may be heterogeneous. The version element may be used to distinguish between different versions of record 148 so that other elements of the record may be properly decoded and used.

The 16-bit storageClass element may be used to store an indication of the storage class of the object 30 corresponding to a record 148. Storage classes are described in greater detail in a subsequent section. Generally speaking, a given storage class of an object may identify storage characteristics and/or policies that may be common to other members of the given storage class, but may differ from members of other storage classes. For example, a "high reliability" storage class and a "low reliability" storage class may be defined for a given implementation of the storage service system. Objects 30 that are members of the high reliability storage class may be replicated to a greater degree than objects 30 that are members of the low reliability storage class, thus decreasing the sensitivity to loss of an individual replica, possibly in exchange for a higher usage cost than is assessed for members of the low reliability storage class. Numerous other possible types and combinations of storage classes are possible and contemplated.

The 64-bit creationDate element may be used to store an indication of the date and time the corresponding object 30 was created within the storage service system. This element may be formatted in any suitable manner. For example, the date and time may be explicitly encoded as distinct fields within the element, or a single number representing the number of elapsed time units (e.g., seconds, milliseconds, etc.) since a common point of reference. In some embodiments, the creationDate element may include additional fields configured to indicate the date and time of last modification of any aspect of the corresponding object 30, although in other embodiments a last modification element may be included as a distinct element within record 148.

The 64-bit objectSize element may be used to store an indication of the size of the corresponding object, e.g., in bytes. In some embodiments, this element may reflect the size of both object data and metadata, while in other embodiments these may be stored as distinct fields. The 32-bit crc32 element may be used to store an indication of the Cyclic Redundancy Check (CRC) checksum computed for the object data and/or metadata according to any suitable checksum algorithm. For example, the checksum may be included to verify data integrity against corruption or tampering. In other embodiments, any suitable type of hash or signature computed from object data and/or metadata may be used in addition to or in place of the CRC checksum.

The 8-bit numLocators element may be used to store an indication of the number of locators included within record 148 within the replicas[ ] array. Within this array, each locator is stored as a 64-bit nodeID element as well as a 64-bit object index value, which may be derived as described above in the discussion on the configuration of bitstore nodes 160. In some embodiments, locators may be stored as single elements within the replicas[ ] array.

In one embodiment, keymap instance 140 may be configured to provide a keymap API to a keymap client, such as a coordinator 120, as well as to perform those functions necessary to support the provided API. For example, a controller 120 may be configured to use the API to store, retrieve, delete or perform other operations on records 148 associated with entries 144 managed by the keymap instance 140. Analogous to the operations on object instances that may be supported by nodes 160 as described above, in one embodiment the keymap API may support put, get and delete operations on keymap entries 144. In one such embodiment, a keymap entry put operation, which may also be generically referred to as a keymap store operation or a keymap write operation, may specify the key 146 and record 148 to be stored within a keymap entry 144. In one embodiment, a put operation that specifies a key 146 for which an entry 144 already exists may replace the record 148 associated with the existing entry 144 with the record specified as an argument or parameter of the put operation. Upon completion on a given keymap instance 140, a keymap put operation may return to the requesting client a status indication, such as whether the operation succeeded or failed, and what type of failure occurred (if any), for example. In some embodiments, if a keymap put operation results in replacement of an existing entry 144, keymap instance 140 may be configured to return the previous value of entry 144 to the requesting client.

A keymap entry get operation, which may also be generically referred to as a keymap read or retrieval operation, may in one embodiment specify a key as a parameter. Upon completion, a keymap get operation may return to the requesting client the record 148 of the keymap entry 144 associated with the requested key, if such an entry exists. If no corresponding entry 144 exists, an indication to that effect may be returned to the requesting client.

In one embodiment, a keymap entry delete operation may be configured to operate similarly to a put operation, except that the requesting client need not specify a record to write to the entry. Upon completion on a given keymap instance 140, a keymap delete operation may return to the requesting client a status indication similar to that of the keymap put operation. Like the put operation, in some embodiments, keymap instance 140 may be configured to return the previous value of the deleted entry 144 to the requesting client.

The keymap API may also support other types of operations in various embodiments. For example, the keymap API may support operations that may assist keymap clients in managing keymap entries. In one embodiment, the keymap API may support a list operation that may be configured to identify those entries 144 having keys 146 matching some criteria specified by the requesting client. For example, the list operation may allow a client to specify a string or pattern as a parameter to the operation. Upon completion on a given keymap instance 140, the list operation may return to the requesting client a list of those keys 146 that satisfy the specified string or pattern. In one embodiment, a key 146 may satisfy a given string only if the string is a proper prefix of the key 146 (e.g., the Nth character of the string matches the Nth character of the key, for all characters of the string). In other embodiments, a key 146 may satisfy a given string if the string can be found at any location within the key 146.

The list operation may support other parameters in some embodiments. For example, the list operation may allow a requesting client to specify a limit to the number of matches to be returned. Additionally, the requesting client may specify constraints on the keys 146 to be searched, for example by specifying an open-ended or closed-ended lexicographic range within which the keys 146 to be searched should fall. In some embodiments, keymap instance 140 may be configured to return records 148 as well as keys 146 that satisfy the list operation criteria. Also, in some operations, the keymap API may support a count operation that may support the same types of parameters and execution behavior as the list operation. However, instead of returning those keys 146 and/or records 148 that satisfy the criteria provided by the requesting client, a count operation may return the number of keys that satisfy those criteria (e.g., the number of keys that would have been returned by a corresponding list operation). It is noted that the keymap API may also support other operations not detailed above.

In some circumstances, different keymap clients may seek to modify the same keymap entry 144. For example, in response to various client- or system-driven operations, two different coordinators 120 may attempt to concurrently change the contents of a given record 148 (e.g., to add, delete or modify locators of replicas), or one may attempt to modify a record 148 while another attempts to delete the corresponding entry 144. In order to provide a consistent method for resolving concurrent requests to a given keymap entry 144, in one embodiment the keymap API may require that at least those keymap operations that update or modify keymap state (e.g., keymap put and delete operations) provide a sequence number as a parameter to the keymap operation. Keymap instance 140 may then be configured to resolve conflicting updates to an entry 144 by comparing the sequence numbers (e.g., numerically or lexicographically) and consistently picking one of the operations on the basis of the comparison. In some embodiments, the provided sequence number may be stored in the modified keymap entry 144 along with the modified record 148 for synchronization recovery as described in greater detail below.

For example, a keymap client may generate a sequence number based on a timestamp. In one embodiment, such a timestamp may include a 64-bit number formatted as follows. Bit 63 of the timestamp may be set to zero (e.g., to avoid confusion as to whether the timestamp is a signed or unsigned number). Bits 62:32 may include the number of seconds elapsed since a reference point in time (e.g., Jan. 1, 1970 at midnight, Greenwich Mean Time, a reference time employed by many versions of Unix and Linux). Bits 31:22 may include the number of milliseconds elapsed since the last second. Bits 21:0 may contain bits generated substantially at random. In other embodiments, the timestamp may be generated on the basis of different widths or types of fields. Alternatively, a keymap client may employ a completely different basis for generating sequence numbers. Provided the resolution of the sequence number is high, the chance of collision among different sequence numbers provided by different keymap clients for the same keymap entry 144 may be low. However, if a collision were to occur, keymap instance 140 may be configured to resolve the collision using any suitable, consistent technique.

In many embodiments, the abstract functional behavior of keymap instance 140 in mapping keys to locators may be relatively straightforward. For example, as described above, a set of basic operations supported by one embodiment of a keymap instance 140 may include put, get and delete operations configured to manipulate entries 144 that reflect relationships between keys 146 and locators included within records 148. However, implementation of keymap functionality within a storage service system may present a number of challenges. In particular, if the storage service system is to support a large number of objects 30 (e.g., millions or billions of objects 30 totaling terabytes (TB) or petabytes (EB) of storage, or beyond) on behalf of a large number of clients, implementation of the keymap may be required to scale correspondingly in capacity. However, it may not be possible or economically feasible to implement sufficient system memory resources to represent the entirety of the information contained in the keymap within a single computer system. Additionally, for fault tolerance and increased processing throughput for keymap client requests, multiple replicas of keymap data may be deployed in a distributed fashion within the storage service system. However, replication of keymap data may lead to keymap synchronization and consistency issues, for example if one replica were to be modified while another is being accessed.

Figure 11A:
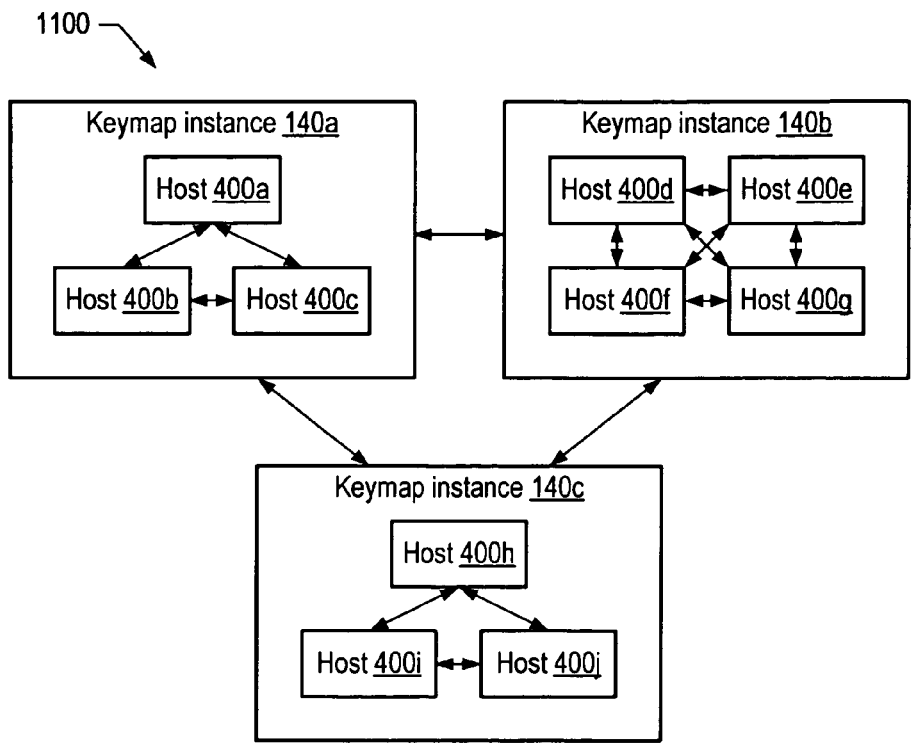
FIGS. 11A-D illustrate one embodiment of a hierarchical implementation of a keymap instance.

Scalability of keymap functionality may be improved by introducing levels of hierarchy within keymap instances 140. One embodiment of such a hierarchy is illustrated in FIGS. 11A-D. In FIG. 11A, an example keymap deployment 1100 is illustrated. As described above, e.g., with respect to FIG. 3, in some storage service system embodiments, multiple keymap instances 140 may be distributed throughout the system, for example in different data centers 300 or areas 310. Generally, a collection of keymap instances may be referred to as a deployment. In some embodiments, a storage service system may encompass a single keymap deployment 1100 including all of the keymap instances 140 provisioned within the system, although in other embodiments, a system may include multiple keymap deployments 1100 unified under additional levels of keymap hierarchy.

In the illustrated embodiment, deployment 1100 includes keymap instances 140a-c, each of which is configured to exchange keymap information with the others, for example according to an instance synchronization protocol as described in greater detail below. As shown, each keymap instance 140 includes a number of hosts 400 configured to communicate with one another. For example, keymap instance 140a includes hosts 400a-c, keymap instance 140b includes hosts 400d-g, and keymap instance 140c includes hosts 400h-j. Generally speaking, each host 400 may include a computer system and associated software, and may include elements such as a processor, system memory, storage devices, networking interfaces or other suitable components. For example, one embodiment of a computer system or node that may be configurable to serve as a host 400 is discussed below in conjunction with the description of FIG. 29.

In general, each keymap instance 140 may be configured to maintain a complete representation of keymap data, including keymap entries 144 as well as any other data used to index and manage the keymap hierarchy, for all objects 30 stored within the storage service system. Within a keymap instance 140, keymap data may be distributed across hosts 400, such that individual hosts 400 store some (possibly redundant) portion of the keymap data. It is noted that while only a few hosts 400 are shown in FIG. 11A, in other embodiments each keymap instance 140 may have any suitable number of hosts 140. For example, in some large-scale implementations, dozens or perhaps hundreds of hosts 140 may be included in a keymap instance 140. It is also contemplated that while in some embodiments, hosts 400 for a given keymap instance 140 may be localized within a given area 310, or data center 300, in other embodiments such hosts 400 may be distributed among different areas 310 or data centers 300. Further, while hosts 400 may be configured to implement only keymap-related functionality in some embodiments, in other embodiments hosts 400 may implement functionality related to other elements of the storage service system. For example, in one embodiment various ones of hosts 400 may also be configured as bitstore nodes 160, and thus may store keymap data as well as object data.

Figure 11B:
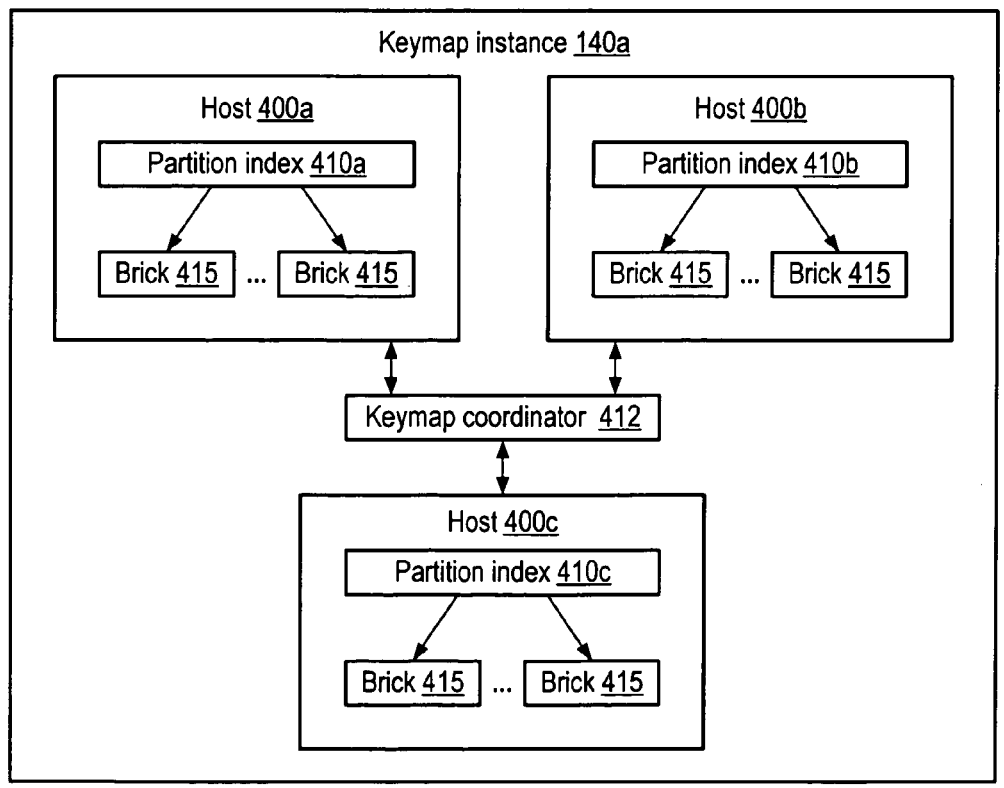

FIG. 11B shows an exemplary embodiment of keymap instance 140a in greater detail. In the illustrated embodiment, each of hosts 400a-c included within keymap instance 140a includes a respective partition index 410a-c and an arbitrary number of bricks 415. Generally speaking, a brick 415 may correspond to an intermediate keymap data structure within a keymap instance 140. In some embodiments, as described in greater detail below in conjunction with the description of FIG. 12, keymap data may be separated into partitions among bricks 415, and replication of partitions within keymap instances 140 may occur at the brick level. Partition index 410 may be configured to index bricks 415 to facilitate selection of one or more particular bricks 415 for processing during a keymap operation. For example, partition index 410 may be configured as a tree or another suitable data structure. In one embodiment, partition index 410 as well as deeper index levels within keymap instance 140 may be configured as a portion of a particular type of data structure referred to as a stratified unbalanced tree or trie, which is described in detail in a subsequent section. In the illustrated embodiment, keymap instance 140 further includes keymap coordinator 412. Generally speaking, keymap coordinator 412 may be configured to implement keymap access management, content management and synchronization methods or protocols such as those described in greater detail below. It is noted that while keymap coordinator 412 is illustrated as distinct from hosts 400, in some embodiments it may be implemented as a process or module within one or more of hosts 400. It is also noted that in some embodiments, partition indexes 410 may be implemented within keymap coordinator 412, rather than separately within hosts 400.

Figure 11C:
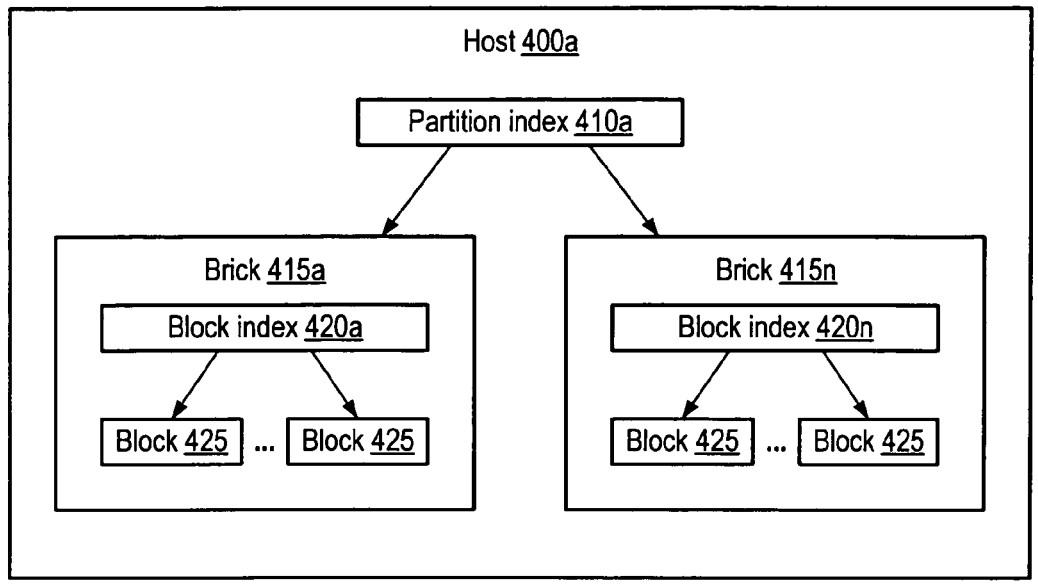
Figure 11D:
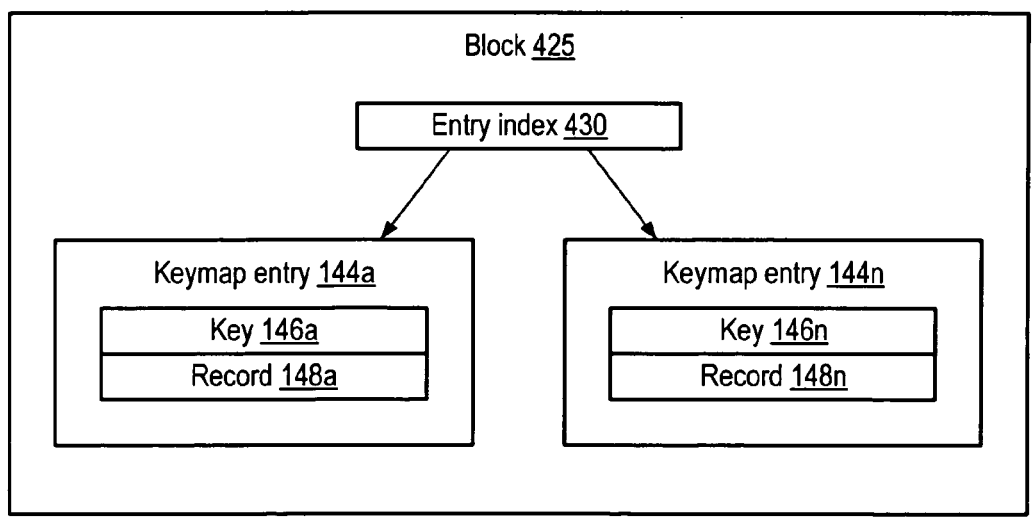

FIG. 11C illustrates an exemplary embodiment of host 400a including bricks 415a-n. As shown, each of bricks 415a-n includes a respective block index 420a-n as well as an arbitrary number of blocks 425. Generally speaking, a block 425 may correspond to an intermediate keymap data structure within a keymap instance 140, analogous to brick 415, but subordinate to the brick level of abstraction. Analogous to partition index 410, block index 420 may be any suitable data structure configured for indexing blocks 425 within a brick 415. For example, block index 420 may be configured as a portion of a stratified unbalanced tree in one embodiment. As shown in FIG. 11D, in one embodiment blocks 425 may be configured to include an arbitrary number of individual keymap entries 144a-n as well as an entry index 430 configured to index entries 144 for selection. As described previously, each of entries 144a-n may include an indication of a respective key 146a-n as well as a respective record 148a-n.

Figure 12:
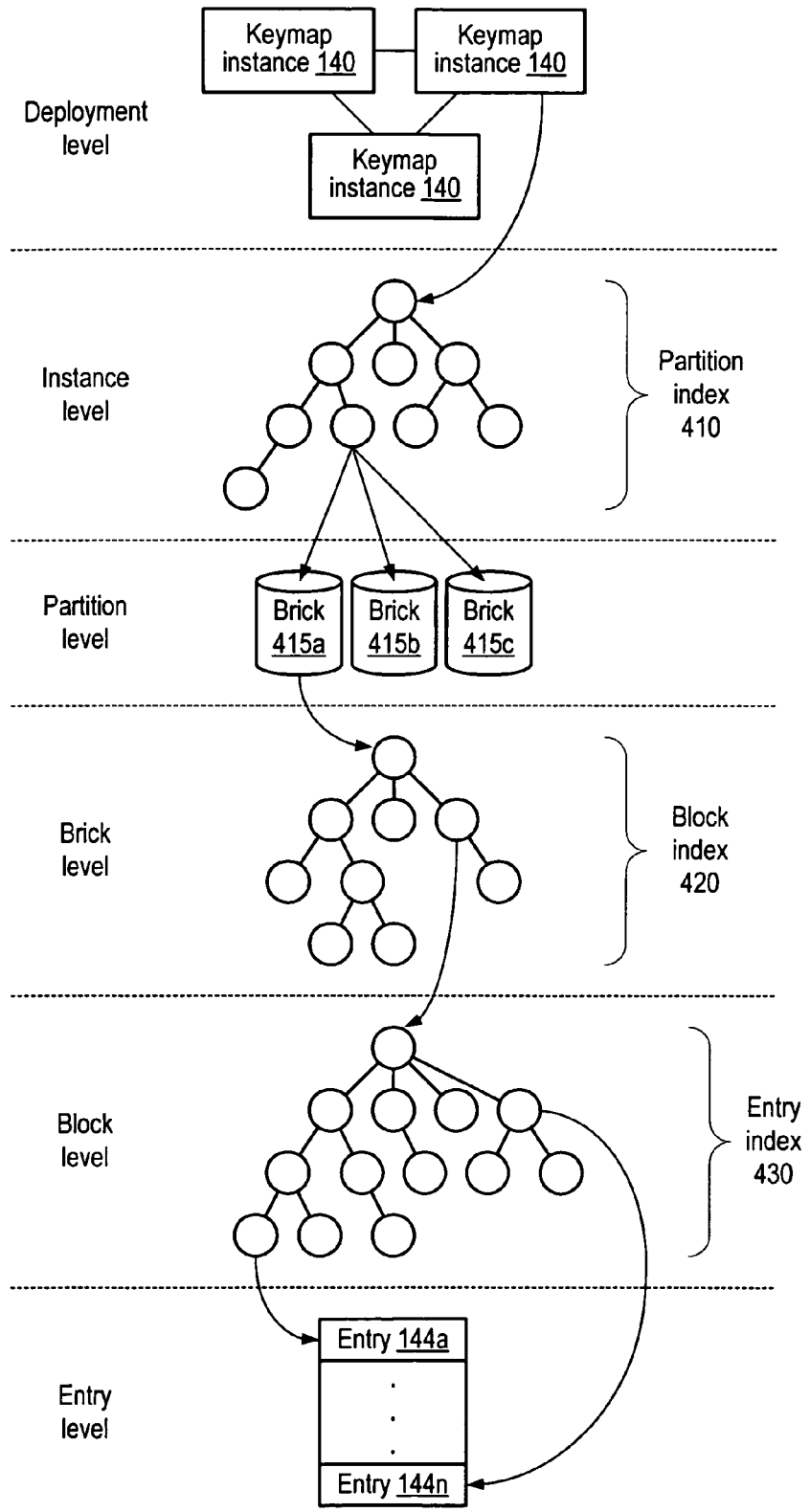
FIG. 12 is a block diagram summarizing relationships among hierarchical layers within a keymap instance.

The relationships among the hierarchical layers between keymap instances 140 and keymap entries 144 of the embodiment illustrated in FIGS. 11A-D are summarized in FIG. 12. At the deployment level of abstraction that includes multiple keymap instances 140, a particular keymap instance 140 may reference a partition index 410 at the instance level of abstraction. The referenced partition index 410 may identify the brick or bricks 415 that correspond to a particular entry 144. For example, in the illustrated embodiment, all keymap entries are replicated by three distinct partitions corresponding to distinct bricks 415. A given brick, in turn, may reference a particular block 425 (not shown in FIG. 12) via block index 420, and the referenced block may refer to a particular entry 144 via entry index 430. It is noted that while a keymap may be implemented using a hierarchical implementation such as shown in FIG. 12, other implementations are possible. Broadly speaking, it is contemplated that keymap instances 140 may be implemented using any suitable technique for associating keys 144 with records 148. For example, in one embodiment a keymap instance 140 may be implemented using a conventional database or other type of structured index.

It is noted that some of the hierarchical layers in the embodiment of FIG. 12 may be configured to provide redundancy (e.g., the replication of keymap instances 140 within the deployment level as well as the replication of bricks 415 at the partition level) while other layers may be configured to provide scalability. For example, the distribution of indexing across multiple distinct levels (e.g., partition index 410, block index 420 and entry index 430) may facilitate scaling of the data structure by allowing each portion of the index to grow in a manageable way as the number of entries 144 to be indexed within the keymap deployment increases. It is noted that in other embodiments, more or fewer levels of hierarchy as well as different combinations of redundant and non-redundant levels may be employed.

As with objects 30, the use of replication within layers of the keymap hierarchy may improve fault tolerance by decreasing sensitivity to the loss of individual replicas. However, if no attempt is made to synchronize replicas of keymap data as modifications occur, the correct (e.g., most current) state of the keymap may become ambiguous, which may in turn lead to unpredictable or erroneous system operation. In some embodiments, replicated portions of keymap data may be updated in a strictly synchronous fashion using atomic or transactional semantics (e.g., two-phase commit semantics) in which updates may not be reported as complete to a keymap client until they have durably and verifiably completed with respect to every replica. While atomic update semantics may minimize or even eliminate the possibility of updates leaving keymap data in an inconsistent state, the performance of atomic updates may degrade considerably in a distributed environment of considerable scale. For example, if replicas of keymap data are widely distributed, replica access latency from the perspective of the client may vary considerably, with the slowest replica dictating the overall time required to complete an update operation. Moreover, if one replica should fail, strict atomic update semantics may cause clients to stall until the failure is corrected, which may lead to unacceptable delays to clients.

Other types of synchronization protocols that may provide better client performance than atomic protocols may be employed within the keymap hierarchy. In some embodiments, a hybrid synchronization approach may be implemented in which one type of synchronization protocol may be employed with respect to replicas within a particular keymap instance 140 (e.g., replicas at the partition level, as shown in FIG. 12), while another type of protocol may be employed to synchronize different keymap instances 140 within a keymap deployment. Such a hybrid approach may allow synchronization overhead to be tailored more specifically to the usage dynamics of replicas at different levels within the keymap hierarchy.

For example, keymap data accesses may exhibit locality of reference such that repeated requests to particular entries 144 are more likely to be directed to a specific keymap instance 140 (e.g., the instance closest to the requesting client in terms of geography, network topology or another suitable criterion) than to another keymap instance 140. That is, it may be the case that replicas of keymap data within a given keymap instance 140 may be more likely to be accessed by a given client than corresponding keymap data in a different keymap instance 140. Correspondingly, in some embodiments replicas within a given keymap instance 140 may be synchronized using a protocol that may be configured to converge (e.g., to propagate changes among replicas) more quickly than a protocol used to synchronize distinct keymap instances 140.

In one embodiment, synchronization of keymap data replicas within a given keymap instance 140 may be performed using a suitable version of a quorum protocol. Generally speaking, an update or modification of replicas of keymap data (including keymap entry put and delete operations) performed according to a quorum protocol may be deemed complete with respect to a requesting client when the modification has been durably (e.g., completely and persistently) performed with respect to at least a quorum number of replicas. Similarly, a keymap entry get operation performed according to a quorum protocol may be deemed complete when the same data has been read from at least a quorum number of replicas. In some embodiments, the quorum number may be defined as a simple majority of the number of replicas present, while in other embodiments arbitrary degrees of supermajority may be employed. It is noted that a quorum protocol operation may fail to complete if the quorum requirement is not met. However, if the quorum number of replicas is smaller than the total-number of replicas, the probability of a given quorum protocol operation failing may be less than that of an atomic protocol operation, which effectively requires a consensus among replicas rather than a quorum. It is noted that quorum protocols other than the one described herein may be employed by keymap instances 140. For example, a multiphase commit protocol such as Paxos or two-phase commit may be employed to implement quorum-type keymap semantics.

In the course of normal operation of read and update operations according to a quorum protocol, it is possible for an update to fail to be propagated to every replica, for example due to communication failures or failure of resources underlying a replica. In one embodiment, disagreement among replicas may be detected and repaired during a read operation. Specifically, if different values are detected among different replicas of a particular entry 144 during a keymap entry get operation, a keymap put operation may be generated to reconcile the difference. In one embodiment, the entry 144 used as the basis for the put operation may be the entry with the most recent (e.g., numerically or lexicographically highest) associated timestamp among the different values read. Thus, discrepancies among replicas may be resolved "on the fly," e.g., as keymap entry get operations are processed, without requiring a distinct process or operation to repair the discrepancies.

Figure 13:
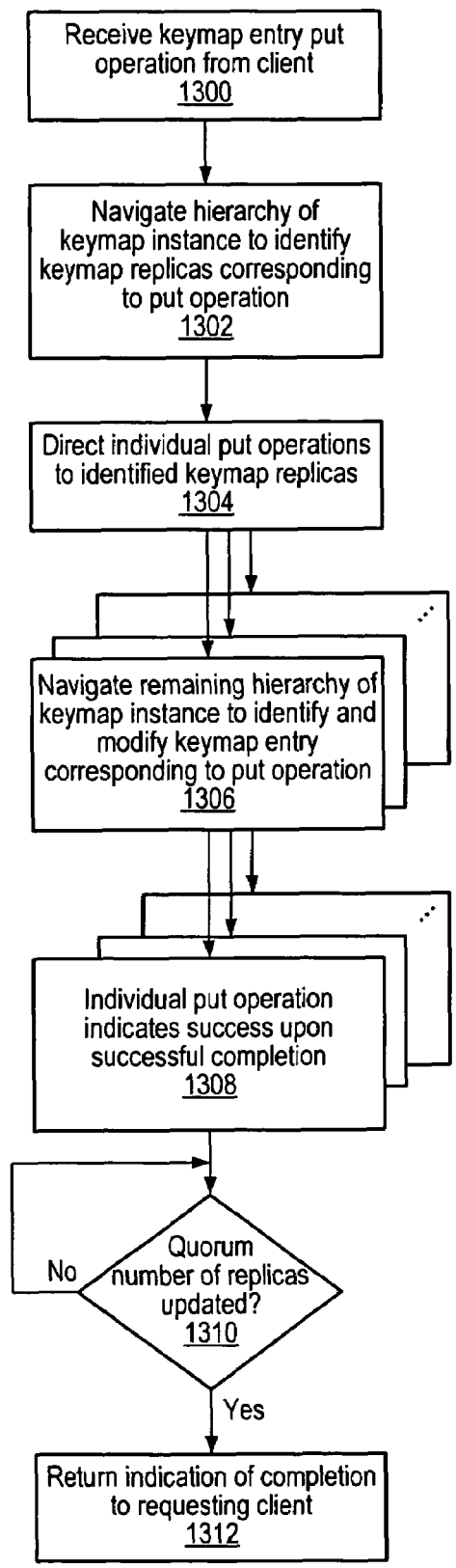
FIG. 13 is a flow diagram illustrating one embodiment of a method of performing a keymap entry put operation.
Figure 14:
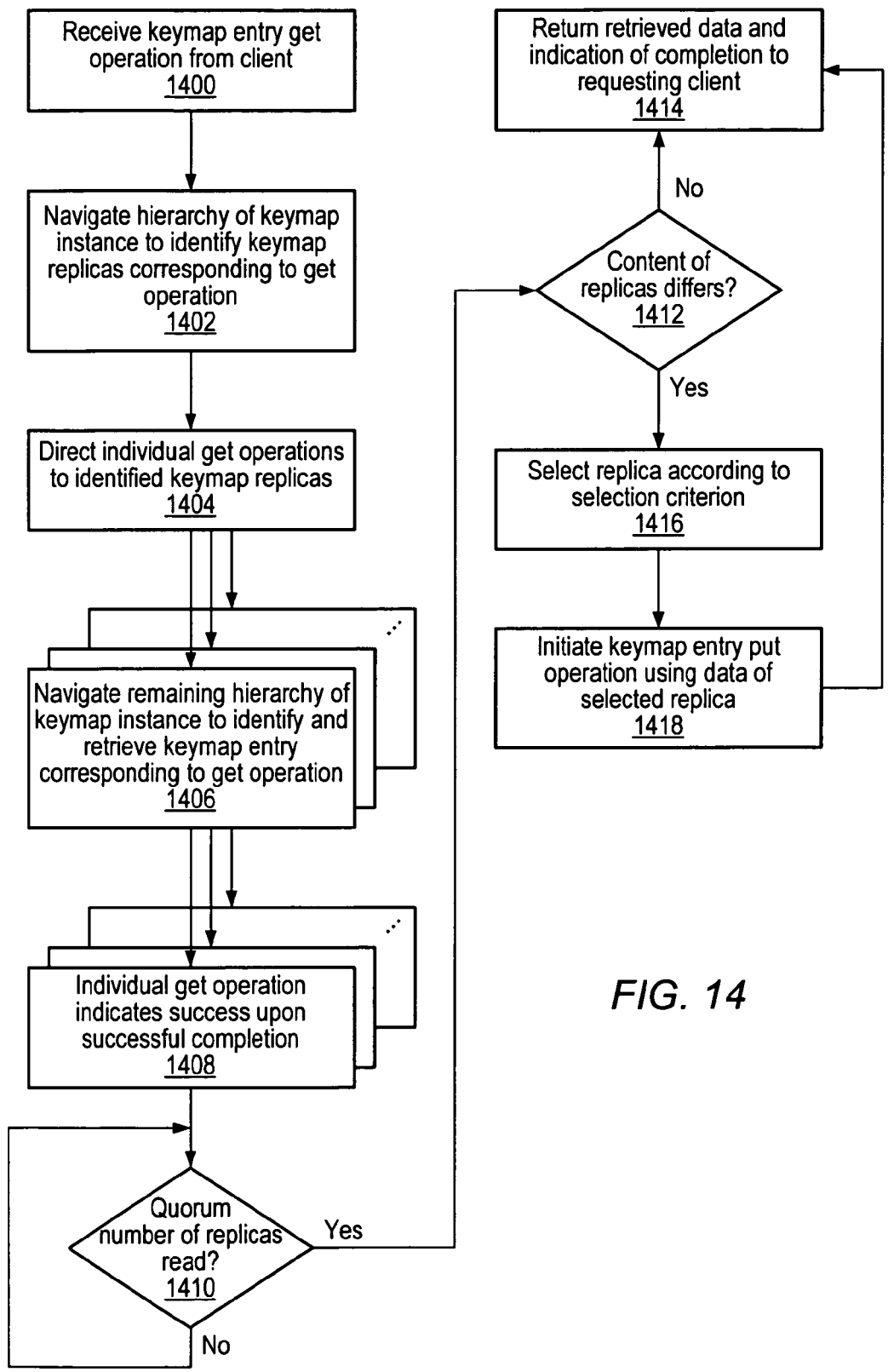
FIG. 14 is a flow diagram illustrating one embodiment of a method of performing a keymap entry get operation.

The operation of exemplary embodiments of keymap entry put, get, delete and list operations with respect to an embodiment of keymap instance 140 configured to implement a quorum protocol is illustrated in FIGS. 13-14. In various embodiments, these methods may be implemented within a keymap coordinator process that may be configured, for example, within one or more of the hosts 400 included within keymap instance 140, or as a separate process or system within keymap instance 140 such as keymap coordinator 412 shown in FIG. 11B. Referring first to FIG. 13, a keymap entry put operation may begin in block 1300 when the operation is received at keymap instance 140 from a coordinator 120 or other keymap client. For example, in response to storing a corresponding object instance of a particular object 30 to a particular bitstore node 160, a coordinator 120 may generate a keymap entry put operation in order to update the entry 144 of the object 30 to reflect the locator of the stored object instance.

The hierarchy of keymap instance 140 may then be navigated to identify the replicas corresponding to the keymap entry put operation (block 1302). For example, for the embodiment of FIG. 12, partition index 410 may be consulted to determine which bricks 415 replicate the entry 144 corresponding to the object 30 of interest. Subsequently, individual put operations may be directed to the identified replicas (block 1304). For each put operation, the remaining hierarchy of keymap instance 140 may be navigated to access and modify the corresponding entry 144 (block 1306). For example, within a given brick 415, block index 420 and entry index 430 may be traversed in order to access the specified entry 144. Once a given replica of an entry 144 has been successfully written, the corresponding put operation may indicate success (block 1308). It is noted that the individual put operations targeting respective replicas of an entry 144 may execute concurrently. Correspondingly, multiple instances of blocks 1306-1308 are shown in parallel.

Success indications of the individual replica put operations may be monitored to determine whether the quorum number of replicas has been successfully updated (block 1310). For example, in an embodiment including three replicas, the quorum number of replicas for completion of a keymap entry put operation may be two. If the quorum number of replicas has been successfully updated, an indication that the requested keymap entry put operation has completed may be returned to the requesting client (block 1312). If not, monitoring may continue. In some embodiments, a timeout may be enforced, such that if a keymap entry put operation does not complete within a specified period of time after processing begins, the operation may be terminated and an error indication may be returned to the requesting client. In other embodiments, a keymap entry put operation may remain pending indefinitely until it completes.

In one embodiment, a keymap entry delete operation may be implemented as a special case of a put operation. In such an embodiment, a keymap entry 144 may include an additional field configured as a deletion sentinel or flag field, and a delete operation may execute as a put operation configured to set the deletion field to an asserted status (e.g., by setting the field to a particular value, such as '1'). Those entries 144 having asserted deletion fields may be disregarded during future keymap operations. In some such embodiments, a separate process may be configured to independently iterate through keymap instance 144 to purge those entries 144 having asserted deletion fields. In other embodiments, such entries 144 may be retained indefinitely as a log of historical keymap behavior.

One embodiment of a method of operation of a keymap entry get operation is illustrated in FIG. 14. Operation may begin in block 1400 when the get operation is received at keymap instance 140 from a coordinator 120 or other keymap client. For example, in response to a request from a storage client 50 for object data corresponding to a particular key, nodepicker 130 or a coordinator 120 may generate a keymap entry get operation in order to obtain a locator corresponding to the particular key, so that a bitstore node 160 may be accessed to retrieve the object data as described in the previous section.

As with a keymap entry put operation, the hierarchy of keymap instance 140 may then be navigated to identify the replicas corresponding to the keymap entry get operation (block 1402). Subsequently, individual get operations may be directed to the identified replicas (block 1404). For each get operation, the remaining hierarchy of keymap instance 140 may be navigated to access and retrieve the corresponding entry 144 (block 1406). Once a given replica of an entry 144 has been successfully retrieved, the corresponding get operation may indicate success (block 1408). It is noted that, as with the individual put operations described above and shown in FIG. 13, the individual get operations targeting respective replicas of an entry 144 may execute concurrently, and blocks 1406-1408 are correspondingly shown in parallel.

Success indications of the individual replica get operations may be monitored to determine whether the quorum number of replicas has been successfully read (block 1410). If not, monitoring may continue until additional replicas have been read. As for the keymap entry put operation described above, in some embodiments a keymap entry get operation may wait indefinitely until the quorum number of replicas has been successfully read. In other embodiments, a keymap entry get operation may time out after a period of time, after which an error indication and/or the best data available at the time (e.g., the replica data having the most recent timestamp) may be returned to the requesting client.

If the quorum number of replicas has been successfully read, it may be determined whether the content of the retrieved replicas differs (block 1412). For example, the entirety of each replica of the requested entry 144 may be compared against each other retrieved replica, or only certain fields of the entry 144 (e.g., certain fields of record 148) may be compared. If there is no difference among the retrieved replicas according to the criteria used in the comparison, the retrieved data may be returned to the requesting client along with an indication that the keymap entry get operation is complete (block 1414).

If a difference among replicas exists, one of the replicas may be selected according to a selection criterion (block 1416). For example, the criterion may include considering the timestamp value of each replica, where the replica having the highest timestamp value may be selected. A keymap entry put operation may then be initiated using the data of the selected replica (block 1418). For example, the put operation may be performed according to FIG. 13 as described above. As a result of the put operation, a quorum number of replicas of the originally-requested entry 144 may be written with the contents of the selected replica, decreasing the likelihood that a future get operation will encounter a discrepancy among replicas. Following the put operation, the data of the selected replica may be returned to the requesting client along with an indication that the keymap entry get operation is complete (block 1414). In some embodiments, completion of the get operation in the case of a detected discrepancy among replicas may be contingent upon completion of the put operation initiated to resolve the discrepancy, while in other embodiments, the get operation may be indicated as complete to the requesting client independent of whether the consequent put operation has completed.

As discussed above, in some embodiments the keymap API may support keymap entry list or count operations configured to indicate those keys 146 of keymap entries 144 that satisfy some criterion, such as a search pattern. In one embodiment, list and/or count operations may be implemented as a special case of keymap entry get operations, where for each entry 144 that satisfies the criteria of a given list or count operation, a corresponding keymap entry get operation is performed. However, the additional overhead of actually retrieving entry data (e.g., records 148) from multiple replicas according to a quorum protocol may be unnecessary for keymap entry list or count operations. Thus, in some embodiments, those steps of the keymap entry get operation that are concerned with the quorum protocol may be omitted from a keymap entry list or count operation. For example, rather than identifying all replicas of a given entry and generating individual get operations for each replica as in blocks 1402-1404, for a list or count operation a single replica (e.g., a brick 415) may be arbitrarily selected and its corresponding hierarchy navigated in order to identify each entry 144 that satisfies the list or count operation criteria. For the resulting entries 144 that satisfy the criteria, corresponding keys 146 or a count of the resulting entries 144 may be returned to the requesting client, bypassing the quorum-related processing portions of FIG. 14 (e.g., blocks 1410-1418).

In some embodiments, a keymap instance 140 may implement a cache in addition to the various data structures used to index entries 144. For example, a cache may allow keymap operations directed to keys of frequently used entries 144 to bypass navigation of index data structures in order to directly access corresponding entries 144, which may improve the performance of keymap entry get operations. Additionally, a cache may help prevent hosts 400 associated with popular, frequently accessed keys from becoming overloaded by keymap request traffic. For example, in one embodiment where the keymap cache is distributed among hosts 400, a copy of a key may be cached on a different host 400 than the host 400 that maintains index data structures for the key. Through such distribution of key caching among hosts 400, key processing workload may be more evenly shared among hosts 400.

In one embodiment, a keymap cache may be configured to store and be indexed by hashes of keys 148 rather than the keys themselves. Data hashing, discussed in greater detail below in conjunction with the discussion of unbalanced index data structures, may constitute an efficient technique for representing variable length data, such as a key 148, in a fixed-length data structure, which may be easier to manage within the keymap cache. Additionally, various hash algorithms may generate evenly distributed hash values for data that may not be initially evenly distributed (e.g., a set of keys 148 having a considerable portion of data in common), which may facilitate the uniform distribution of keymap cache data among hosts 400. In some embodiments, the contents of an entry 144 may be stored in the keymap cache along with a hashed value of the corresponding key 148. In other embodiments, pointer or other reference information for entry 144 may be stored rather than the contents of entry 144 itself.

Generally speaking, in keymap embodiments including keymap caches, keymap entry put and get operations may operate with minor modifications to the description provided above. In one embodiment, keymap entry get operations may first consult the cache to determine whether the get operation can be serviced from the data resident in the cache. A get operation may wait for a fixed amount of time for a response from the cache before proceeding with the quorum protocol for reads. If the cache returns a value after the quorum protocol read is initiated, the value read from the cache may be processed and the corresponding entry 144 returned, and the quorum protocol read may be terminated. If no value is returned from the cache, the entry 144 read from the quorum protocol read operation, or a pointer to such an entry 144, may be installed in the keymap cache along with corresponding key information.

Generally speaking, keymap entry put operations in keymap embodiments that include caches may operate substantially as described above, except that a locking or other consistency protocol may be employed to prevent multiple put operations from concurrently attempting to modify the same cache entry. In one embodiment, a keymap entry put operation may be configured to attempt to lock a cache entry corresponding to a key 148 before commencing the quorum protocol for writes. Upon receiving a response from the cache that the lock request succeeded (e.g., because no other lock on the entry exists, or because there is no corresponding entry in the cache), the quorum protocol may proceed. After the put operation is complete according to the quorum protocol, the lock may be released and the new entry data may be installed in the cache.

It is noted that in some embodiments, the quorum protocols for keymap entry put and get operations as just described may implement a strong consistency model for updating keymap entry state. That is, the quorum protocols may guarantee that once a put operation to a particular key has been acknowledged to a client as complete, a subsequent get operation will return the data that was most recently put, even if not every replica has been updated at the time the get operation is processed.

As keymap operations such as put and delete operations are directed to a particular keymap instance 140, the state of entries 144 within that particular keymap instance 140 may change over time.

Thus, in the absence of any attempt to reconcile them, different keymap instances 140 within a deployment may tend to become divergent or inconsistent over time. If only one storage service client 50 references a given object 30, and does so via the same keymap instance 140, such divergence may have no practical effect. However, if multiple storage service clients 50 refer to the same key via different keymap instances 140, such inconsistency may cause clients 50 to observe different keymap state and/or different versions of object data at the same point in time.

As described previously, strong consistency protocols such as atomic or quorum protocols may be employed when updating replicas to effectively prevent clients from observing replica inconsistency or to prevent such inconsistency from arising at all. However, in a distributed context where access latency of different replicas may vary, sometimes considerably, strong consistency protocols may have a high performance cost. For example, for an atomic or quorum protocol, the time required for operation completion may be a function of the time required to complete the operation with respect to the slowest of all the replicas or of the quorum number of replicas, respectively. Moreover, in the absence of strong consistency protocols, the probability of replica inconsistency becoming visible to a client (e.g., the probability of a storage service client 50 obtaining stale keymap or object data) may generally be a function of the probability of a client accessing a replica during a period of time when the accessed replica does not yet reflect an update.

For many objects 30, this latter probability may be low. For example, in some instances, the majority of objects 30 managed by the storage service system may be accessed by a single client 50 via a particular keymap instance 140, in which case inconsistency may be moot from a client perspective. For objects 50 that may be accessed by multiple clients 50, observable inconsistency may still be unlikely. For example, two keymap instances 140 are inconsistent with respect to a particular key for a period of, say, ten seconds. However, if no access is performed with respect to the particular key during the period of inconsistency (e.g., if the duration between accesses of the corresponding object 30 is greater than the period of inconsistency), or if an access that is performed is directed to the more recently updated keymap instance 140 (e.g., if the client 50 that last updated the state of a key is the next to reference the key via the same keymap instance 140), the inconsistency may have no observable effect on clients 50. Consequently, in some embodiments keymap instances 140 may employ a relaxed synchronization protocol that strives to converge keymap instances 140 to a consistent state, but which may allow some degree of inconsistency among keymap instances 140 at any given time. Such a synchronization protocol may provide better overall performance for the majority of clients 50 for which stricter synchronization may be unnecessary. In some embodiments, clients 50 that require stricter access synchronization of keymap data for shared objects 30 may implement additional protocols among themselves, without requiring that all clients 50 incur the burden of stricter synchronization. For example, a set of clients 50 that share access to a particular set of objects 30 may employ semaphore or other distributed locking techniques to coordinate their access to keymap data.

Figure 15A:
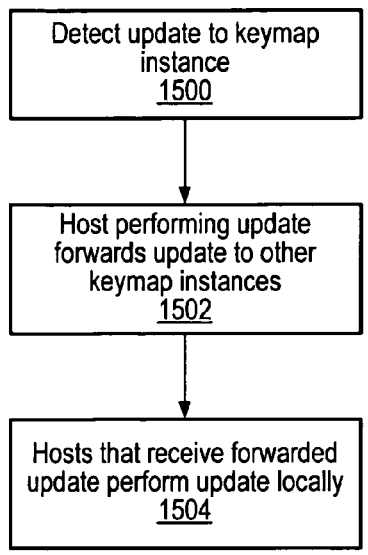
FIG. 15A is a flow diagram illustrating one embodiment of a method of synchronizing keymap instances using update propagation.
Figure 15B:
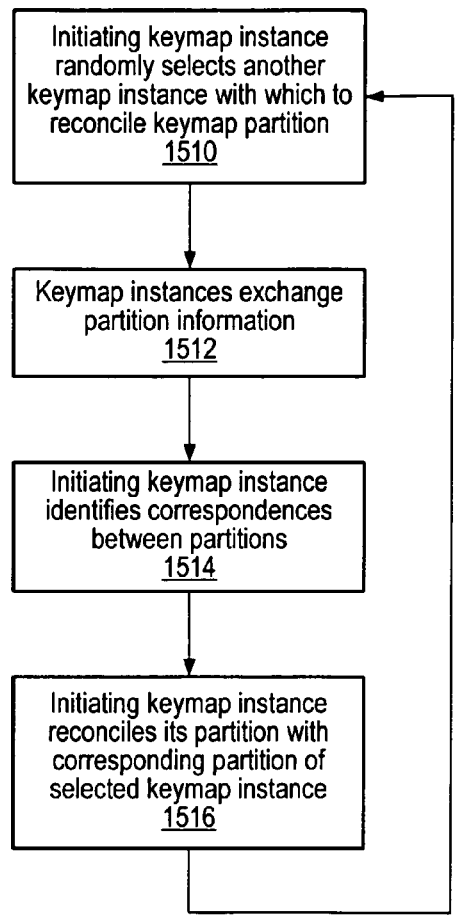
FIG. 15B is a flow diagram illustrating one embodiment of a method of synchronizing keymap instances using an anti-entropy protocol.
Figure 16:
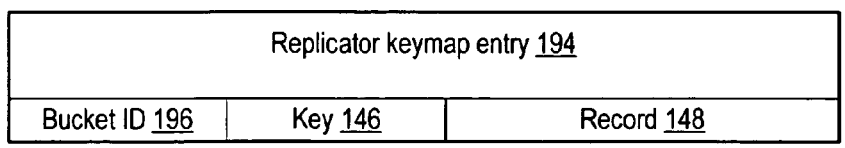
FIG. 16 is a block diagram illustrating one embodiment of a replicator keymap entry.

In some embodiments, relaxed synchronization protocols among keymap instances 140 may include a combination of different synchronization tasks that may independently carry out different aspects of the synchronization process. FIGS. 15A-B illustrate one embodiment of a method of operation of a relaxed synchronization protocol that includes two distinct synchronization tasks: an update propagation task shown in FIG. 15A, and an anti-entropy or set reconciliation task shown in FIG. 15B. Referring first to FIG. 15A, operation begins in block 1500 where an update to one of keymap instances 140 may be detected. For example, a keymap instance 140 may receive and complete a keymap entry put or delete operation according to a quorum protocol as described above.

The keymap instance 140 that processed the keymap update may then forward the update operation to each other keymap instance 140 provisioned within the storage service system (block 1504). For example, if keymap instance 140a processed a keymap entry put operation, it may forward the operation including arguments, parameters, etc. to keymap instances 140b and 140c. In one embodiment, the forwarding may be performed without verification or acknowledgement. For example, the keymap instance that processed the keymap update operation may forward the operation using a "fire and forget" protocol, making one attempt to forward the operation to each other keymap instance without attempting to verify whether the forwarded operation was received at its destination or to resend the operation if it was not received. Such forwarding may occur using any suitable forwarding strategy, such as concurrent broadcast from the originating keymap instance 140 to multiple keymap instances 140, sequential forwarding from the originating keymap instance 140 to other instances, tree-based strategies, etc.

Those associated hosts 400 that receive the forwarded operation may perform the update operation locally (block 1506). For example, if host 400f successfully receives a keymap entry put operation forwarded from host 400a, it may perform the operation as if it had received the operation from any keymap client. If the put operation successfully completes on host 400f, then as a result, keymap instances 140a and 140b may be synchronized with respect to the put operation.

Generally speaking, it may be expected that forwarding keymap update operations among hosts 400 will succeed a majority of the time. Therefore, minimizing the overhead involved in forwarding such operations may decrease the time and/or bandwidth required to achieve synchronization among keymap instances 140 in a majority of cases. For example, eliminating acknowledgement responses or other types of protocol verification or handshaking from the forwarding process may free communications bandwidth for other uses, such as to support a larger scale of keymap implementation involving a greater degree of synchronization traffic. In many instances, the time required to propagate keymap updates throughout a keymap deployment (which may generally correspond to the window of potential inconsistency of replicas of a given keymap entry 144) may be limited to the communication latency required to forward the operation to associated hosts 400 and the processing latency required for hosts 400 to apply the forwarded operation. Frequently, this total time may be on the order of seconds or fractions of seconds.

In some instances, however, forwarding of keymap update operations among hosts 400 may fail. For example, a communication link failure may render one host 400 unreachable from another, or may cause a forwarded operation to be lost, truncated or otherwise damaged in transit. Alternatively, a destination host 400 may fail to receive or correctly process a properly forwarded update operation, for example due to transient hardware or software issues. If, as in one embodiment, no attempt is made on the part of an originating host 400 to verify or assure that forwarded keymap update operations are successfully received and processed by targeted hosts 400, forwarding failure of individual operations may result in inconsistency among keymap instances 140 with respect to certain entries 144.

Correspondingly, in one embodiment a relaxed synchronization protocol among keymap instances 140 may include the anti-entropy or set reconciliation task mentioned above and shown in FIG. 15B. This task may be referred to as an "anti-entropy" task in that generally, operation of the task may serve to reduce differences and increase similarities among different keymap instances 140, thus decreasing the overall entropy among keymap instances 140 that may be introduced by random or systemic failure of update propagation to properly synchronize instances. In the illustrated embodiment, operation begins in block 1510, where an initiating keymap instance 140 randomly selects another keymap instance 140 with which to perform a reconciliation of a particular partition, which as described above may include a number of replicated bricks 415 resident on different hosts 400.

The initiating keymap instance 140 may then exchange information about the partitions within the instance with the selected keymap instance 140 (block 1512). For example, particular hosts 400 within the two keymap instances 140 may be configured to exchange copies of the partition index 410 maintained within each instance, which may in turn identify those bricks 415 defined within each instance.

Based on the exchanged partition information, the initiating keymap instance 140 may then identify correspondences between partitions in the two instances (block 1514) and may reconcile each partition within the initiating keymap instance 140 with a corresponding partition within the selected keymap instance 140 (block 1516). For example, as described previously, each partition within a given keymap instance 140 may be replicated across a number of bricks 415. In one embodiment, the initiating keymap instance 140 may be configured to direct a particular brick 415 within a partition (which may be referred to as the "lead brick") to communicate with a corresponding or "peer" brick 415 of a corresponding partition within the selected keymap instance 140 in order to reconcile differences between the partitions. In one embodiment, reconciliation of two bricks 415 may involve the bricks exchanging information about differences in the keymap entries 144 included in each brick 415, and then propagating the most current information within each keymap instance 140. For example, if one brick 415 determines on the basis of timestamp information that its version of an entry 144 is more current than that of a peer brick 415, it may communicate the entry data to the peer brick 415. Subsequently, the peer brick 415 may perform a keymap entry put operation (e.g., according to a quorum protocol as described in detail above) to update its copy of the entry 144.

Once partition reconciliation between the two keymap instances 140 has completed, operation may continue from block 1510 where the reconciliation process is initiated again with respect to another random keymap instance 140. In various embodiments, each keymap instance 140 may be configured to perform this process at predetermined or dynamically determined intervals. For example, reconciliation may occur at a static rate of once per minute, or at intervals determined according to a random or other statistical probability distribution. In some embodiments, reconciliation may be performed after a certain number of keymap accesses have occurred, or after access to certain individual ones, types or groups of keymap entries has been detected.

Generally speaking, the methods of update propagation and set reconciliation or anti-entropy shown in FIGS. 15A-B may operate in a complementary fashion. Under the majority of circumstances, update propagation may satisfactorily synchronize different keymap instances 140 within a deployment. In those instances where keymap inconsistencies arise due to the failure of update propagation, the anti-entropy task may generally operate to reconcile such inconsistencies. It is noted that in some embodiments, execution of the anti-entropy task may not guarantee that two keymap instances 140 are precisely synchronized in their entirety. However, in one embodiment the anti-entropy task may be implemented to guarantee that its operation will not increase the degree of inconsistency between two keymap instances 140. Thus, over repeated applications, the anti-entropy task may facilitate convergence of keymap instance 140. More details on one particular embodiment of the anti-entropy task are provided below in conjunction with the description of specific embodiments of data structures with which keymap instance 140 may be implemented.

As shown in FIG. 2 and discussed above, in some embodiments a storage service system may include a replicator keymap instance 190 in addition to other keymap instances 140. In one embodiment, replicator keymap instance 190 may be configured essentially identically to keymap instances 140 described above, and may participate in keymap synchronization using the protocols discussed above. However, in such an embodiment, replicator keymap instance 190 may be configured to serve replicator 180 rather than coordinators 120 or other keymap clients. In some circumstances, segregating replicator keymap instance 190 from other keymap instances 140 may improve keymap performance in general. For example, replicator 180 may generate a substantial amount of keymap request traffic as it iterates through the keymap to check on the health and number of replicas of objects 30. If commingled with keymap traffic generated on behalf of requests of storage service clients 50, replicator keymap traffic might negatively impact response time or other quality-of-service measures pertinent to clients 50. By contrast, configuring replicator 180 to make use of a dedicated keymap instance 190 may isolate internally-generated keymap traffic from client-generated traffic. Additionally, such segregation may better enable the implementation of each type of keymap instance to be scaled according to the requirements of its major client. For example, the implementation of replicator keymap instance 190 might be configured to facilitate processing of a large number of concurrent keymap operations rather than to minimize the latency of any given keymap operation, whereas keymap instances 140 may be optimized for a different combination of quality-of-service criteria. However, it is noted that segregation of keymap instances in this fashion is not required, and in some embodiments, replicator 180 may be a client of keymap instances 140 rather than of a dedicated replicator keymap instance 190.

In one embodiment, replicator keymap instance 190 may also be configured to facilitate accounting of usage of storage service system resources by clients 50. Specifically, replicator keymap instance 190 may be configured to augment the entries 144 stored by keymap instances 140 with additional data indicative of a respective entity that bears billing or other financial responsibility for the corresponding objects 30. For example, in the embodiment illustrated in FIG. 16, a replicator keymap entry 194 is shown. Within replicator keymap instance 190, entry 194 may function identically to entries 144 with respect to the structure and hierarchy of keymap instances 140. However, in the illustrated embodiment, entry 194 includes the additional field, bucket ID 196. Generally speaking, bucket ID 196 may include an indication of the identifier of the bucket 20 that includes an object 30 corresponding to a key 146. Such an identifier may be defined, for example, by web services interface 100 or coordinator 120 as described above in response to a request from a client 50 to create a bucket 20 in which to store objects 30. It is noted that in other embodiments, accounting information need not be reflected solely within the entries of replicator keymap instance 190. For example, in one embodiment the keymap entries 144 of some or all keymap instances 140 may be configured to store an indication of bucket ID 196, for example as an additional field within record 148 or key 146.

As discussed above, the relationship between objects 30 and buckets 20 may be transparent to the general operation of keymap instances 140. However, given that this relationship is typically static, explicitly associating buckets 20 and objects 30 via replicator keymap entries 194 may facilitate accounting and billing of clients 50. For example, rather than explicitly querying web services interface 100 for the bucket 20 associated with each object 30, an accounting process (which may be included within replicator 180 or another module, or implemented as a distinct module within the system) may be configured to sort replicator keymap entries 194 according to bucket ID 196. Upon completing such a sort, all keys 146 associated with a particular bucket ID 196 would be readily apparent. The sizes of corresponding objects 30 as indicated within records 148 may then be aggregated to determine the total storage resource utilization associated with a bucket ID 196. Additionally, other characteristics of objects 30 may be taken into account, such as the class of storage associated with a particular object 30. Resource utilization may then be monetized according to a suitable billing model.

In various embodiments, replicator keymap entries 194 may include other fields instead of or in addition to bucket ID 196 that may facilitate various internal system maintenance or accounting tasks. It is noted that in embodiments where replicator keymap instance 190 is distinct from other keymap instances 140, the storage cost of such additional fields may be configured to replicator keymap instance 190. However, it is contemplated that in embodiments lacking a dedicated replicator keymap instance 190, entries 144 of keymap instances 140 may be augmented to include such additional fields.

Stratified Unbalanced Data Structures

As described previously, in some embodiments a storage service system may scale to support very large numbers of objects 30, e.g., on the order of billions or more. Thus, in such embodiments, each keymap instance 140 will have a similar number of entries 144 to manage. In some embodiments, keymap instances 140 may support various types of sorting and/or grouping operations, such as the keymap entry list and count operations discussed in the previous section. Additionally, to support consistent keymap operation, the many keys managed by each keymap instance 140 may need to be synchronized among other keymap instances 140 as described above.

In many circumstances, the keymap functionality provided by keymap instances 140 may be central to the operation of the overall storage service system. For example, if clients 50 elect not to perform locator-based access to specific instances of objects 30, keymap instances 140 may mediate every key-based object access request performed by clients 50. Thus, the performance of the storage service system as seen by clients 50 may depend directly on the efficiency and speed with which keymap instances 140 access and process keymap entries 144. In turn, the performance of keymap instances 140 may depend directly on the data structures used to index and organize entries 144, such as the data structures used to implement partition indexes 410, block indexes 420 and entry indexes 430 in the embodiment of FIG. 12.

Designing index data structures to support sorting and synchronization operations in a large-scale keymap implementation may present considerable challenges. Conventional applications that require indexing of large amounts of data, such as, e.g., databases, frequently employ conventional balanced data structures, such as B-trees or other types of balanced trees. Generally speaking, when used to index a given quantity of data items such as keymap entries 144, balanced data structure algorithms attempt to distribute data items across the balanced data structure according to the quantity of items being managed. For example, given 10,000 keymap entries 144 to index, a balanced data structure algorithm may attempt to choose breakpoints among the entries 144 such that the entries are divided into 10 groups of roughly 1,000 entries per group. The balanced data structure algorithm may create further levels of balanced hierarchy within each group, for example, subdividing each group of roughly 1,000 entries into five subgroups of roughly 200 entries each. As data items are added to and deleted from the balanced data structure, groups and/or subgroups within the data structure may become unbalanced. Thus, conventional balanced data structure algorithms may rebalance the data structure by reallocating data items among groups, creating additional groups, and/or creating additional levels of hierarchy. Such rebalancing may take place "on the fly" as data items are added or deleted, or may occur after a certain number of data item modifications have taken place or a certain amount of time has elapsed since the last rebalancing.

By virtue of segregating data items in a balanced fashion, balanced data structures may present a predictable, roughly uniform access latency for any given data item within the data structure, which may be desirable in a large-scale implementation where a large number of data items need to be indexed. However, it may be particularly difficult to efficiently reconcile or synchronize distributed instances of balanced data structures, for example using a relaxed synchronization model as described above. Specifically, as instances of balanced data structures are independently modified, the breakpoints that divide data items into groups within each instance may become divergent. As a result, there may be no direct correspondence in terms of data item membership between groups or subgroups of different balanced data structure instances. To reconcile two such instances, then, it may be necessary to exhaustively compare the entirety of the two instances, which may be extremely time-consuming in cases where each instance indexes a large number of data items.

As an alternative to balanced data structures that distribute data items among groups according to quantity, in some embodiments the index data structures of keymap instances 140 may be configured to implement unbalanced data structures (which may also be referred to as tries) that distribute data items among groups according to some relationship among the data items within each group. Specifically, keymap instances 140 may be configured to index entries 144 according to prefixes of their corresponding keys 146. As an example, consider a case in which there exist 600 keymap entries 144 having corresponding case-insensitive alphanumeric keys 146. A balanced index of these 600 entries might divide the entries into three balanced groups of 200 entries each. By contrast, in one embodiment an unbalanced index might define three alphanumeric groups such that those entries beginning with the characters a through l are assigned to the first group, those entries beginning with the characters m through x are assigned to the second group, and those entries beginning with the characters y or z or the numerals 0-9 are assigned to the third group.

Entries 144 may be unevenly distributed across the groups of the unbalanced index. For example, there may be 300 entries in the first group, 250 entries in the second group and only 50 entries in the third group. However, it is noted that for any given entry 144, membership of the given entry 144 in a particular group of an unbalanced index may be a function of its corresponding key 146 without dependence on the number of entries 144 in any particular group. Thus, if two instances of an unbalanced index maintain the same group definitions, each group may be independently synchronized without dependence on the other groups. For example, the a-l groups between the two instances may be synchronized independent of the m-x groups and the y-9 groups. By contrast, as described above, synchronization of two instances of a balanced index of the same set of entries 144 may require all entries across all groups to be considered.

Figure 17:
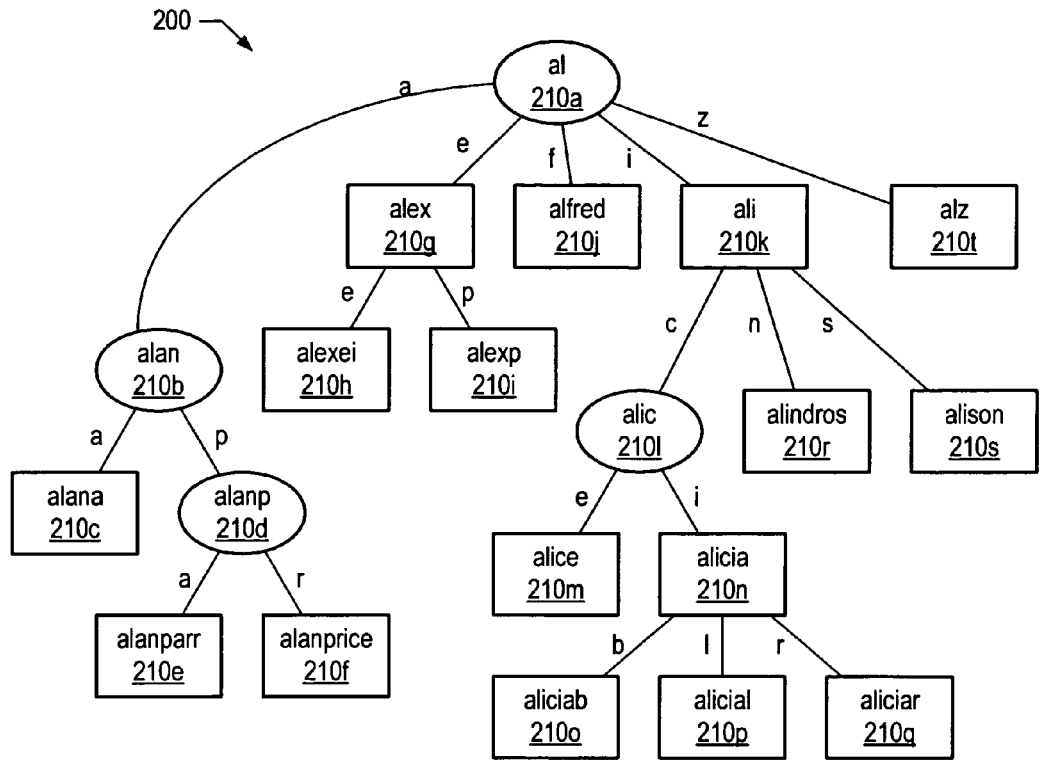
FIG. 17 illustrates one embodiment of an unbalanced index data structure.

One example illustrating the use of an unbalanced data structure to index a number of data items is shown in FIG. 17. In the illustrated embodiment, unbalanced index 200 (or simply, index 200) includes a number of nodes 210 arranged in a hierarchical fashion to index a number of string values beginning with the prefix "al". For example, the indexed values may correspond to keys 146 of various entries 144 of a keymap instance 140. Each node 210 within index 200 includes an associated tag value that may or may not directly correspond to a data item being indexed. In the illustrated embodiment, nodes depicted as ovals may correspond to interior nodes of index 200 that do not have corresponding data items, while nodes depicted as rectangles may correspond to indexed data items. Thus, for example, node 210*a* corresponds to the string "al" and is related to a number of other nodes within index 200, but there may not exist an actual key 146 corresponding to the string "al". By contrast, node 210*n* having the tag "alicia" may correspond to a key 146 specifying the same string. The distinction between interior and non-interior nodes 210 may or may not be explicitly reflected in the state of a node 210.

As described below, in some embodiments an unbalanced data structure may be configured as an index of other indexes. In some such embodiments, a data item indexed within a first instance of index 200 may be a root node 210 of another index 200, and the corresponding node 210 within the first index 200 may be considered a non-interior node. That is, in some embodiments a non-interior node 210 of a given index 200 may be generally defined as any node 210 associated with a data value, such as an entry 144 or a root node of another index 200, which is external to the given index 200. Similarly, an interior node of a given index 200 may reference only other nodes 210 within the given index 200 and may not bear any association with an entry 144 or other index 200 distinct from the given index 200. It is also noted that, as shown in FIG. 17, non-interior nodes 210 are not necessarily leaf nodes (e.g., nodes that do not reference other nodes at lower hierarchical levels).

Figure 18:
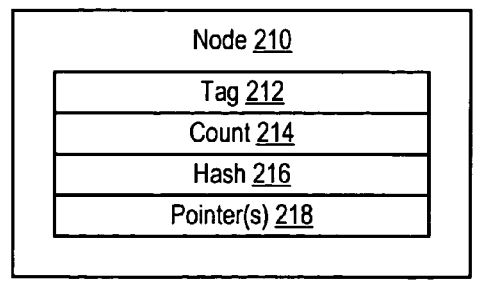
FIG. 18 illustrates one embodiment of an index node for use in an unbalanced data structure.

In various embodiments, each node 210 may encode a variety of information. One embodiment of a generic node 210 illustrating various data fields that may be encoded within the node is shown in FIG. 18. In the illustrated embodiment, node 210 includes a tag field 212, a count field 214, a fingerprint field 216, and one or more pointer fields 218. Generally, tag 212 may be configured to store a value corresponding to a given node 210 that may be used in the course of traversing or manipulating index 200, as described in greater detail below. In some embodiments, tag 212 may uniquely identify a node 210 among all nodes within index 200. Also, in some embodiments, a tag 212 of a given node 210 may include as prefixes the tags 212 of all direct ancestors of the given node 210 within index 200. That is, a tag 212 of any given node 210 may be determined through appending some value to the tag of that given node's immediate parent node 210. For example, consider node 210*n* of FIG. 17, which has the tag "alicia". Each of node 210*n*'s direct ancestor nodes 210*l*, 210*k* and 210*a* has a tag ("alic", "ali" and "al", respectively) that forms a proper prefix of the tag of node 210*n*.

As shown in FIG. 17, certain nodes 210 refer to one or more child or descendant nodes 210 farther below in the hierarchy of index 200. In one embodiment, pointer field(s) 218 may be configured to store data reflecting pointers or references from a given node 210 to another node 210. For example, a given pointer field 218 may include an address that identifies a location of the referenced node 210 within an address space, such as a memory address space. The given pointer field 218 may also include additional tag information regarding the referenced node 210. For example, as shown in FIG. 17, each arc from a given node 210 to a descendant node 210 is labeled with the first character of the tag 212 of the descendant node 210 that differs from the prefix formed by the tag 212 of the given node 210. In one embodiment, this additional tag information may be stored within a corresponding pointer field 218 along with a pointer to the referenced node 210. For example, the pointer fields 218 included in node 210*a* may respectively include references to nodes 210*b*, 210*g*, 210*j*, 210*k* and 210*t*, as well as corresponding tag data "a", "e", "f", "i" and "z".

As discussed above with respect to FIG. 12, an index such as index 200 may be used to organize data items such as keymap entries 144 for selection. In some embodiments, the pointer fields 218 of a non-interior node 210 (that is, a node 210 that maps directly to a data item being indexed) may also include a pointer to a corresponding data item, such as a keymap entry 144, a block 425, or a brick 415. In some embodiments, as described in greater detail below, unbalanced indexes such as index 200 may be implemented hierarchically, such that a non-interior node 210 of one index 200 may refer to another index 200. A pointer field 218 that references an indexed data item may be distinguished from a pointer field 218 that references another node 210 via any suitable technique, such as by using distinct encodings for the different types of pointer fields 218. For example, in embodiments where tag information associated with arcs to descendant nodes 210 is encoded within pointer fields 218 as described in the previous paragraph, a null tag may be used to distinguish a reference to an indexed data item from references to descendant nodes 210.

For a given node 210, count field 214 and fingerprint field 216 may be configured to reflect the state of nodes 210 beneath the given node 210. In one embodiment, count 214 may be configured to store the count of all nodes that are descendants of (e.g., are hierarchically beneath) the given node 210. For example, node 210*k* of FIG. 17 has eight other nodes 210 beneath it within index 200. Correspondingly, its count 214 may indicate a value of 8 using any suitable encoding or format.

In various embodiments, fingerprint field 216 of a given node 210 may be configured to store a value indicative of a hash (e.g., the result of a suitable hash algorithm) performed on some portion of the data of the nodes 210 hierarchically beneath the given node 210. For example, fingerprint field 216 of a given node 210 may reflect the sum of the hashes of the tags 212 of all nodes 210 that are descendants of the given node 210. Alternatively, fingerprint field 216 may reflect the hash of the concatenation of tags 212 of descendant nodes 210 according to a particular, consistent order of traversal (e.g., breadth-first or depth-first traversal). In other embodiments, other fields of a node 210 besides tag 212 may participate in hashing. In some embodiments, the data associated with a given node 210 may be reflected within its own fingerprint field 216, whereas in other embodiments a fingerprint field 216 of given node 210 may be determined strictly on the basis of its descendant nodes. For consistency of description, as used herein a fingerprint of a given node 210 may refer to a hash value that is a function of at least some descendant nodes of the given node 210, while a hash of given node 210 may refer to a hash value that is a function of data associated only with given node 210 and not its descendants.

Generally speaking, a hash algorithm may be configured to map a given source data value of possibly arbitrary length onto a smaller, typically fixed-length hash value such that if two hash values differ, the original source data values from which the two hash values were generated must also differ in some way. As hash algorithms are typically not one-to-one functions, identity between two hash values does not necessarily imply identity between original source data values. However, for some classes of hash algorithms, identity between original source data values given identical hash values may be statistically likely to within a quantifiable probability or degree of confidence, particularly for source data values that exhibit some degree of redundancy. Different types of hash algorithms may also be referred to as signature, fingerprint or checksum algorithms. It is contemplated that any suitable type of hash algorithm may be employed to generate a hash value to be stored in fingerprint fields 216, including, by way of non-limiting example, any suitable version of the Message Digest 5 (MD5) algorithm or the Secure Hash Algorithm (SHA), such as SHA-1, SHA-256, SHA-512, etc.

As described in the previous section, basic operations that may be performed on a keymap instance 140 may include put and get operations that may respectively store and retrieve an entry 144 that corresponds to a key specified as a parameter to the operation. In some embodiments, various indexes within keymap instances 140 may be implemented as unbalanced indexes such as index 200.

Where large numbers of data items need to be indexed, as may be common in keymap instances 140, it may be impractical to use a single instance of index 200 for all the data items. For example, a single large index may not completely fit into the memory of a system processing the index, which may negatively affect the performance of operations that depend on the index. In some embodiments, a large index may be implemented using a stratified, unbalanced data structure, or stratified index. Generally speaking, in a stratified index, multiple instances of index 200 may be hierarchically defined, where instances higher in the hierarchy may index other indexes 200, and indexes lower in the hierarchy may index particular entries 144 or other entities (e.g., blocks 425 or bricks 415).

Figure 19:
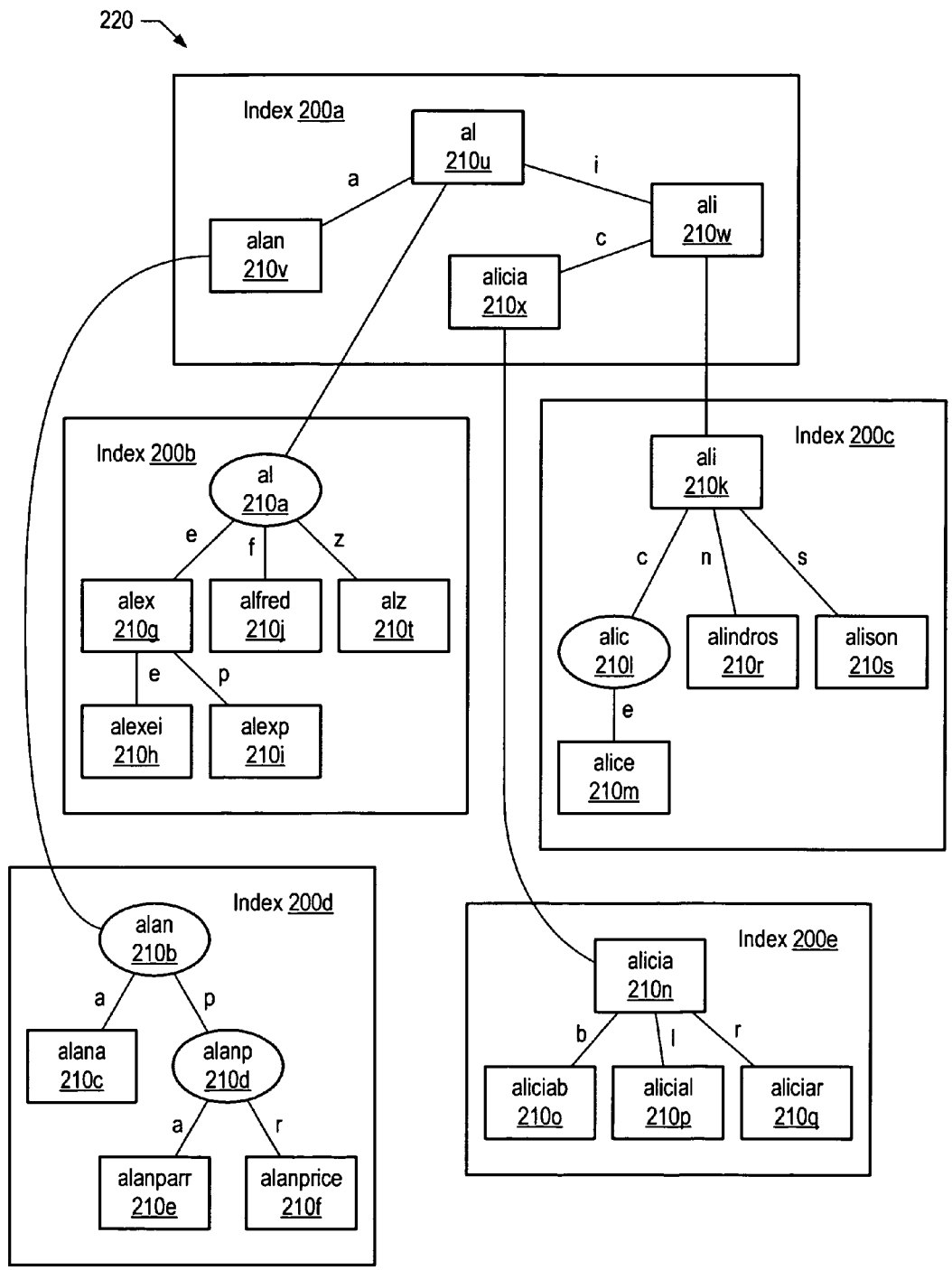
FIG. 19 illustrates one embodiment of a stratified index data structure.

One embodiment of a stratified index is illustrated in FIG. 19. In the illustrated embodiment, stratified index 220 includes five indexes 200a-e. Index 200a includes nodes 210u-x, each of which is a non-interior node that references a respective root node of one of indexes 200b-e. In turn, indexes 200b-e each include various ones of nodes 210a-t that were shown in FIG. 17. In some embodiments of stratified indexes 220, higher-level indexes such as index 200a may be configured to reside in the memory, cache or another higher level of a memory hierarchy of a system processing the index, while lower-level indexes such as indexes 200b-e may primarily reside in disk or another lower level of such a memory hierarchy. In such embodiments, lower-level indexes may be relocated from lower levels to higher levels of the memory hierarchy as needed, for example using paging-type techniques. By supporting hierarchical partitioning of indexes of large numbers of data items, stratified indexes 220 may more efficiently and effectively use system resources.

For example, using the aforementioned paging techniques, frequently used indexes 200 of stratified index 220 may be kept in higher levels of a memory hierarchy, which are typically faster to access but limited in capacity, while less frequently used indexes 200 may be stored in lower memory hierarchy levels, which are typically slower to access but have greater storage capacity than higher levels. It is contemplated that in some embodiments, as nodes 210 are added to indexes 200 within stratified index 220, individual indexes 200 may grow beyond a target size (such as the size of a disk block or memory page on the system implementing the indexes). In such embodiments, if a given index 200 grows to exceed the target size, it may be split into two or more index instances. In the course of performing such a split, nodes 210 may be added to a higher-level index 200 as necessary to account for the new index instances.

Figure 20:
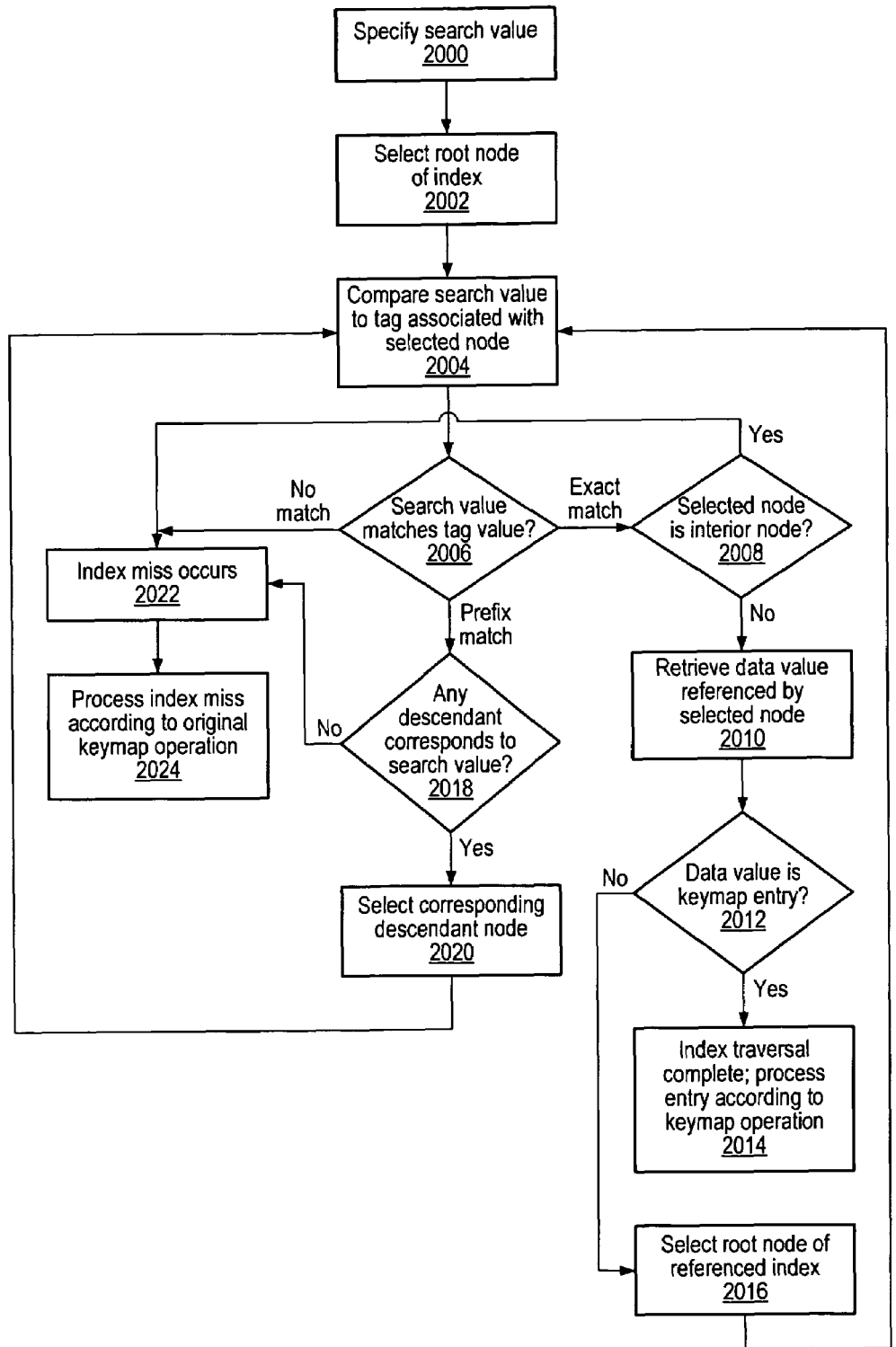
FIG. 20 is a flow diagram illustrating one embodiment of a method of traversing an unbalanced index data structure.

In response to a keymap entry put or get operation, stratified or non-stratified unbalanced indexes may be traversed to determine whether the specified key corresponds to a node 210 within the index 200. One embodiment of a method of unbalanced index traversal is illustrated in FIG. 20. In the illustrated embodiment, operation begins in block 2000 where the key value to be searched (also referred to as the search value) within the index is specified, for example via a relevant keymap operation. Subsequently, the root node 210 of the index (e.g., the node 210 having no parent node) is selected (block 2002).

For the selected node 210, the node's corresponding tag value 212 is compared against the search value to determine whether the tag value matches the search value exactly, is a prefix of the search value, or neither (block 2004). If the tag value 212 of the selected node 210 matches the search value, then the selected node 210 is examined to determine whether it is an interior or non-interior node (blocks 2006-2008). For example, the pointers 218 or other content of the selected node 210 may be examined to determine if the node references a data value indexed by index 200, such as an entry 144 or another instance of an index 200. If the selected node 210 is an interior node, an index miss may occur as described below (block 2022).

If the selected node 210 is a non-interior node, the data value referenced by the selected node 210 is retrieved (block 2010). In embodiments that support stratified unbalanced data structures, where some data structure instances may index other data structure instances, the retrieved data value may either correspond to an entry 144 or a root node of another instance of index 200. If the retrieved data value is an entry 144, index traversal may be complete and the retrieved entry 144 may be processed according to the keymap operation that initiated traversal (blocks 2012-2014). For example, if the initiating keymap operation was a get operation, the retrieved entry 144 may be returned as a result of the get operation. If the initiating keymap operation was a put operation, the retrieved entry 144 may be modified according to the parameters specified in the put operation.

If the retrieved data value does not correspond to an entry 144, then in the illustrated embodiment, it may correspond to a root node 210 of another index 200. Correspondingly, this root node 210 may be selected (blocks 2012, 2016) and operation may proceed from block 2004 where traversal of the newly selected index 200 may proceed. Thus, in one embodiment, execution of the method of FIG. 20 may proceed until the presence or absence of a node 210 corresponding to the search value is definitively determined.

Returning to block 2006, if the tag 212 of the selected node 210 does not match the search value but is a prefix of the search value, then descendants of the selected node 210 may be examined to determine if any descendant corresponds to the search value (block 2018). If so, the corresponding descendant node 210 may be selected (block 2020), and operation may proceed from block 2004. In one embodiment, the pointer(s) 218 of the selected node 210 may be examined to determine whether additional tag information associated with a particular pointer 218, when taken in conjunction with tag 212 of the selected node 210, also forms a prefix of (or entirely matches) the search value. For example, referring to FIG. 17, the tag "al" of node 210a may be determined to be a prefix of a search value of "alibaba". Additionally, the arc from node 210a to node 210k, which may be represented by a corresponding pointer 218, is associated with the additional tag information "i". This tag information, when appended to the tag "al" of node 210a, forms the value "ali", which is also a prefix of the search value. Therefore, node 210k may be selected for further traversal.

Returning to block 2018, if no descendant of the selected node 210 corresponds to the search value, the search value does not have a corresponding entry 144 within the index 200, which may also be referred to as an index miss (block 2022). The index miss may then be processed according to the type of keymap operation that initiated the index traversal (block 2024). For example, a keymap entry get operation may process an index miss by returning an appropriate status indication indicative of the miss to the requesting client. In contrast, a keymap entry put operation may process an index miss by inserting a new node 210 corresponding to the entry 144 to be stored in the index as a descendant of the selected node 210. For example, the new node 210 may be created and its various fields appropriately set for the entry 144 to be stored, and a pointer 218 to the new node 210 may be stored within the selected node 210. It is noted that if a new node 210 is added to an index 200 or an existing node 210 is modified, the count fields 214 and fingerprint fields 216 of all ancestor nodes 210 of the added or modified node 210 may be updated to reflect the change.

Returning to block 2006, if the tag 212 of the selected node 210 does not match the search value and is not a prefix of the search value, then an index miss may also occur, and processing may continue from block 2022. In some instances, this case may occur when the selected node 210 is the root node of an index 200. Correspondingly, in one embodiment, adding a new node 210 to the index 200 in response to this miss case may include creating a new root node 210 having a tag 212 that is a common prefix of both the search value and the tag 212 of the existing root node 210 (in this case, the selected node 210). (In some instances, the common prefix of the new root node 210 may be null, which may be interpreted as a valid prefix for any value.) The new root node 210 may then be configured to refer to the selected node 210 as a descendant. If necessary, an additional node 210 may be created to correspond to the search value and configured as an additional descendant of the new root node 210.

It is noted that in some embodiments, an index miss may not immediately occur while traversing stratified unbalanced indexes 200 if the tag 212 of the selected node 210 does not match the search value and is not a prefix of the search value. In one embodiment, if this case is encountered, then if selected node 210 has a parent, the parent node 210 is selected. If the parent node 210 is a non-interior node that references another index 200, the root node 210 of the referenced index 200 may be selected and processing may continue from block 2004. Otherwise, an index miss may occur. (It is noted, however, that this case may not arise in non-stratified, self-contained indexes 200 that do not index other indexes 200.) As an example of this case, consider the stratified index of FIG. 19 in which the search value is "alice". Traversal of index 200a may proceed to node 210w having tag "ali". Since node 210w has a pointer to descendant node 210x with associated tag information "c", which together with "ali" forms a prefix of the search value, node 210x may be selected. However, the tag of node 210x is "alicia", which does not match and is not a prefix of the search value. Thus, traversal may return to node 210w (the parent of node 210x), which is a non-interior node that references index 200c. Correspondingly, traversal may continue to node 210k and ultimately to node 210m, which has a tag 212 that matches the search value.

In various embodiments, unbalanced indexes 200 or stratified unbalanced indexes 220 may be used to index keymap entries 144 within keymap instances 140. For example, stratified indexes 220 may be employed to implement one or more of partition index 410, block index 420 or entry index 430, or any other levels of indexing that might be implemented within keymap instances 140. As discussed above, different keymap instances 140 may be divergent or inconsistent in the ordinary course of operation when a relaxed synchronization protocol is employed. In some embodiments, keymap instances 140 may be synchronized using exhaustive protocols that traverse each node of the respective index data structures in a consistent order (e.g., a depth-first or breadth-first search order) to identify discrepancies in index structure or indexed content. However, various features of the unbalanced indexes described above, such as the distribution of data according to key information rather than numbers of keys and the inclusion of count and/or cumulative hash information within the index data structure, may facilitate the implementation of more computationally efficient synchronization algorithms.

Numerous possible versions of the anti-entropy set reconciliation protocol described previously are contemplated for use with unbalanced, possibly stratified indexes implemented by keymap instances 140. A description of one embodiment of such a protocol follows, although it is understood that contemplated variations on the general protocol may exhibit different implementation priorities, for example in choosing to optimize certain cases over other cases or to use one or another particular type or class of algorithm to perform a general step of the protocol. Thus, it is intended that the described embodiment be regarded as illustrative rather than limiting.

In one embodiment, an anti-entropy protocol configured to reconcile different instances of an unbalanced index 200 or a stratified unbalanced index 220 may include the exchange between instances of various types of messages. An exemplary set of messages upon which one embodiment of the anti-entropy protocol may be based may include a DATA message, a REQUEST message, a HASH message, a FILTER message, and a FINGERPRINT message. The general function of respective embodiments of each of these messages is described below, followed by a discussion of how the messages may be used to implement an embodiment of the anti-entropy protocol. In the following discussion, reference may be made to exchange of data among keymap instances 140, although it is understood that such keymap instances may implement one or more instances of unbalanced indexes 200 or stratified unbalanced indexes 220 that include any of the features described above.

The DATA message may be used to convey data about one or more index nodes 210 from one keymap instance 140 to another. In one embodiment, the DATA message may be configured to convey only the tag 212 associated with a given node 210, while in other embodiments the DATA message may convey other fields associated with given node 210. In some embodiments, if a given node 210 is a non-internal node, the DATA message may also include all or some portion of the data item associated with the given node 210 (e.g., an entry 144 or information about a root node 210 of another index 200).

The HASH message may be used to convey information about one or more index nodes 210 from one keymap instance 140 to another, without explicitly conveying the fields of a given node 210 or a data item associated with a given node 210. In one embodiment, the HASH message may be configured to convey a tag 212 associated with a given node 210 as well as a hash of the given node 210 computed according to a suitable hash algorithm. In some embodiments, the hash of the given node 210 may also reflect a data item (e.g., a keymap entry 144) associated with the given node 210, but may exclude any descendants of given node 210.

The REQUEST message may be used to convey a request for information associated with one or more nodes 210. In one embodiment, the REQUEST message may be configured to convey one or more tag prefix values. In response, the requesting instance may expect to receive information about those nodes 210 having tags 212 for which the conveyed tag prefix value is in fact a prefix. For a given node 210, the received information may include the contents of the corresponding fields of the given node 210 and/or the data item (e.g., a keymap entry 144) corresponding to the given node 210. In some embodiments, the REQUEST message may support further qualification of the requested tag prefix values, such as by specifying that a value or range of values within the result space defined by a particular tag prefix value should be excluded from the results returned for that tag prefix value. For example, a REQUEST message may specify that information about all nodes 210 matching the tag prefix value "alex" should be returned, except for those nodes 210 that match the prefixes "alexe" or alexj".

The messages just described may generally operate at the level of granularity of individual nodes 210. However, if the differences between keymap instances 140 are generally small (e.g., confined to a minority of nodes 210), it may facilitate the synchronization process to quickly ascertain the status of multiple nodes 210 at once. In one embodiment, the FINGERPRINT and FILTER messages may be configured to communicate information about aggregations of nodes 210. Specifically, in one embodiment the FINGERPRINT message may be configured to convey the fingerprint field 216 of a node 210 along with its tag 212 from one keymap instance 140 to another. As described above, the fingerprint field 216 of a given node 210 may be configured to store a hash value that is determined as a function of the descendants of the given node 210. Thus, if the fingerprint fields 216 of respective nodes 210 in different keymap instances 140 are equal, it may be highly probable (depending upon the characteristics of the hash algorithm used) that the arrangement and content of the descendants of the respective nodes 210 are the same. That is, it may be highly probable that the portions of the keymap instances 140 descending from respective nodes 210 are synchronized.

The use of fingerprints may allow a quick determination as to whether portions of keymap instances 140 including substantial numbers of nodes 210 are synchronized or not. However, fingerprints indicating that corresponding portions are not synchronized generally may not provide further detail regarding how the portions differ. In one embodiment, a FILTER message may be configured to convey a filter value that encodes a number of nodes 210 corresponding to a particular prefix value from a first keymap instance 140 to a second keymap instance 140. The second instance may then use the received filter value to test its own nodes 210 that correspond to the prefix value, to ascertain which nodes 210 of the second instance are not present in the first instance, if any.

In one embodiment, the filter value conveyed by the FILTER message may be a Bloom filter, although it is contemplated that any suitable filtering technique for recoverably encoding a set of data values into a filter value may be employed. Generally speaking, a Bloom filter of a set of values (e.g., nodes 210) may correspond to an M-bit binary value, where M is an integer. Before any values are encoded into a Bloom filter, its initial value may be zero. That is, all bits of the filter may be in a deasserted state. A Bloom filter may be populated by passing each value to be encoded within the filter through each of a set of k independent hash functions, each of which maps the value to be encoded onto a value in the range [0, M−1]. For each of the k resulting hash values, a corresponding bit within the Bloom filter is asserted (e.g., set to a logical 1 value). M and k may be selected as design parameters according to the number and type of values to be encoded within the Bloom filter, as well as the desired probability of false positives (discussed below). For example, in a 1,024-bit Bloom filter using eight hash functions, each hash function may produce a corresponding 10-bit hash value specifying a particular one of the 1,024 bits of the filter to be asserted.

To test whether a given value has been encoded into a Bloom filter, the value is passed through the same set of k independent hash functions used to encode the filter, and the resulting k bits of the filter value are examined. If any of the resulting k bits of the filter are not asserted, the test value is definitely not encoded in the filter. If all of the resulting k bits of the filter are asserted, the test value may or may not be encoded in the filter. That is, the test value may have been originally encoded in the filter, or it may be a false positive. In some embodiments, the hash functions may be parameterized with a salt or seed value that is randomly or spontaneously generated (e.g., as a function of the current system time) on each separate occasion a Bloom filter is generated, to reduce the probability that the same false positive values will be generated when a given set of values is successively encoded into a filter.

Thus, for example, a first keymap instance 140 may encode a set of nodes {A, B, C, D, E} corresponding to a prefix P into a Bloom filter and may convey the filter to a second keymap instance 140 using a FILTER message. In the second keymap instance 140, a set of nodes {A, B, X, Y, Z} may correspond to prefix P. The second keymap instance 140 may test each of the nodes against the filter and may determine that nodes A, B and X may be encoded in the filter, while nodes Y and Z are definitely not encoded in the filter. Thus, the second keymap instance 140 may correctly conclude that nodes Y and Z are not present in the first keymap instance 140, and may conclude that nodes A, B and X are probably present in the first keymap instance 140, where X is a false positive. As a result, the second keymap instance 140 may take action to convey information about nodes Y and Z to the first keymap instance 140.

It is contemplated that the DATA, HASH, REQUEST, FINGERPRINT and FILTER messages may be implemented and conveyed according to any suitable protocol or API, and may include various types of fields or parameters configured to convey the information described above as well as any additional information necessary to decode and properly process the message. In one embodiment, messages may include additional parameters that indicate whether, for a given tag value included in the message, the sending keymap instance either has corresponding data or needs corresponding data, respectively referred to as the got-data and need-data parameters. For example, if a keymap instance 140 sends a FINGERPRINT message for a node 210 that has the tag "al" and some number of descendants, the instance may include a got-data parameter indicating that the instance has some nodes 210 within the prefix space defined by "al". The instance may also include a need-data parameter, for example if its copy of the prefix space defined by "al" is believed to be incomplete. In some embodiments, the got-data parameter may be implicit in the DATA and HASH messages, while the need-data parameter may be implicit in the FILTER and REQUEST messages, although a DATA or HASH message may explicitly specify a need-data parameter while a FILTER or REQUEST message may explicitly specify a got-data parameter. In one embodiment, a FILTER message may be required to specify at least one of the need-data or got-data parameters.

In one embodiment, an anti-entropy protocol conducted by two keymap instances 140 may begin when the two instances establish contact with one another. Each instance may assume that it both has and lacks some data. Correspondingly, each instance may send a FINGERPRINT message to the other instance that specifies the tag 212 and fingerprint 216 of the root node 210 of the instance and includes the got-data and need-data parameters. For example, in an embodiment of keymap instance 140 employing a stratified unbalanced index 220, the root node 210 may correspond to the node 210 having no parent node within the index 200 that has no parent or superior index 200.

Figure 21:
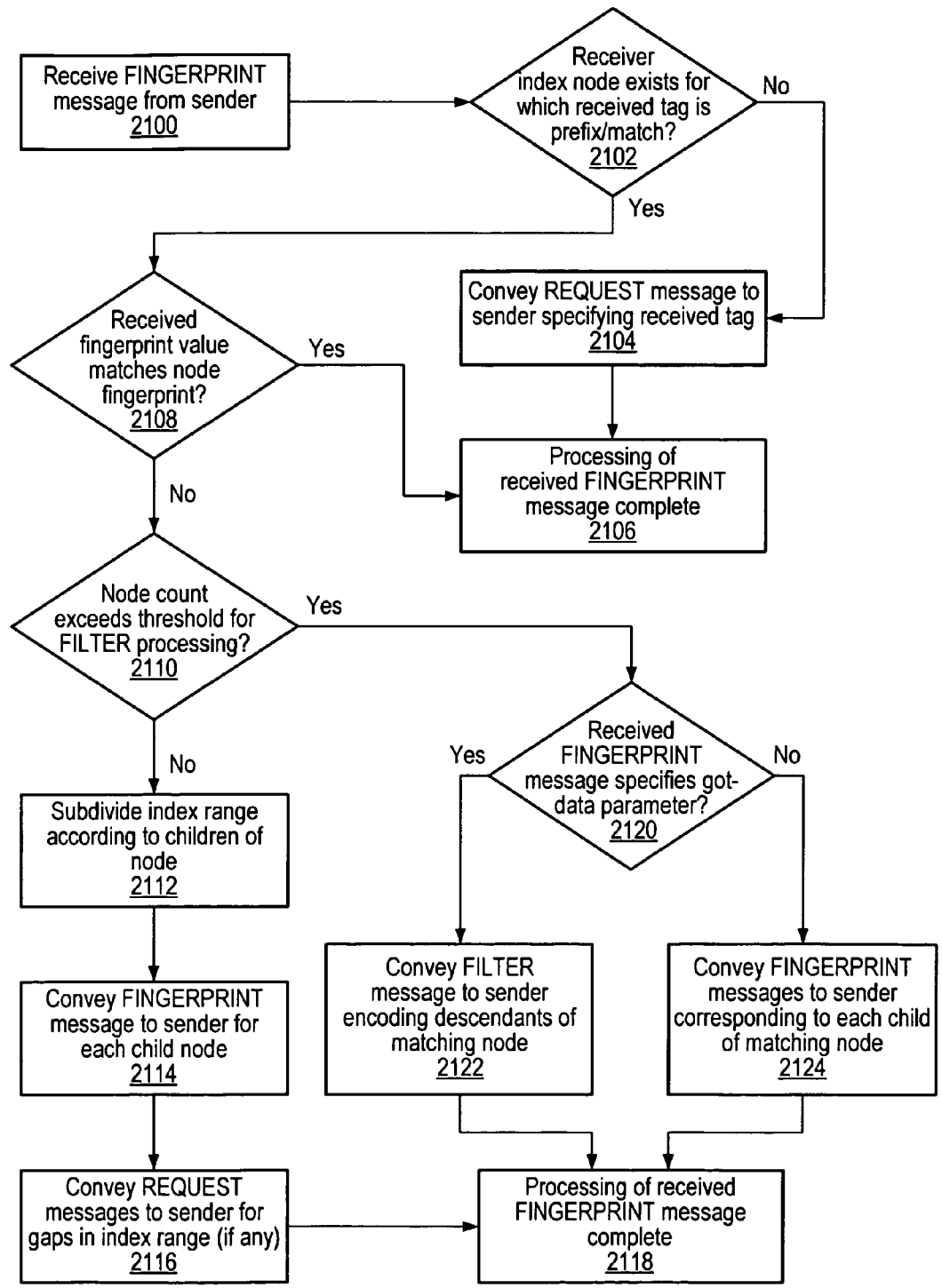
FIG. 21 is a flow diagram illustrating one embodiment of a method of processing a FINGERPRINT anti-entropy protocol message.

One embodiment of a method of processing a FINGERPRINT message is illustrated in FIG. 21. In the illustrated embodiment, operation begins in block 2100 where a FINGERPRINT message is received from a message sender. For example, a first keymap instance 140 may convey a FINGERPRINT message including a tag value, a fingerprint and one or more of the got-data or need-data parameters to a second keymap instance 140. After a FINGERPRINT message is received, then the index(es) of the message receiver are traversed to identify whether a node 210 exists for which the received tag value is a prefix of (or exactly matches) the corresponding tag field 212 (block 2102). For example, the indexes of a keymap instance 140 may be traversed starting from the root node 210 using the method of FIG. 20 or a suitable variant thereof.

If the received tag value is not a prefix or exact match of a tag field 212 of any node 210, then a node 210 corresponding to the node referenced by the FINGERPRINT message may not exist at the message receiver. Correspondingly, the receiver may respond by conveying a REQUEST message to the message sender specifying the tag value included in the originally received FINGERPRINT message (block 2104). In one embodiment, processing of the REQUEST message may proceed as described in greater detail below. In some embodiments, the REQUEST message may be conveyed only if the received FINGERPRINT message indicates the got-data parameter.

It is noted that in some embodiments, completion of individual messages exchanged during operation of the anti-entropy protocol may not depend on whether additional messages generated in response to a given message successfully complete. That is, in some embodiments, the processing of individual messages may occur in a stateless and asynchronous fashion with respect to other messages. In discussion of the exemplary embodiments described herein, this stateless, asynchronous model will be assumed. Thus, after the REQUEST message has been generated, processing of the FINGERPRINT message itself may be considered complete (block 2106). However, this model is not essential to the general operation of the anti-entropy protocol, and it is contemplated that in alternative embodiments, any given message may block, wait or otherwise maintain synchronization with messages generated subordinately or in response to the given message. For example, explicit handshaking, acknowledgement, retry or other types of protocols may be employed in some embodiments to convey the state of completion of one message to another dependent message.

If the received tag value does correspond as a prefix or match of a tag 212 of a particular node 210 at the message receiver, the received fingerprint value may be compared against the fingerprint field 216 of the particular node 210 to determine whether the two fingerprints match (block 2108). If so, then it may be highly probable (e.g., subject to the probability of the fingerprint algorithm in use producing two fingerprints that collide, or have the same value, despite being generated from different data) that the message sender and the message receiver are synchronized with respect to the received tag value. For example, it may be highly probable that any nodes 210 having the received tag value as a prefix are in the same state within the keymap instance 140 from which the FINGERPRINT message was sent and the keymap instance 140 at which the message was received. Thus, no additional messages may be generated in response to the FINGERPRINT message, and the message may be considered complete (block 2106).

If the fingerprints do not match, then the message sender and message receiver are not synchronized with respect to the received tag value, and additional work may be needed to bring the sender and receiver closer together in state. As described above, the FILTER message may be useful in allowing a sender to communicate specific information about certain nodes 210 to a receiver. However, in some embodiments, the number of nodes 210 that may be encoded into the FILTER message while preserving a reasonable false-positive rate may be limited to a certain threshold value. If the number of descendant nodes 210 exceeds this threshold at the message receiver node 210 that matches the received tag value, it may be more efficient to perform additional FINGERPRINT message processing before sending FILTER messages.

Thus, in the illustrated embodiment, if the fingerprints do not match, the count field of the particular node 210 at the message receiver may be examined to determine if it exceeds the threshold value for FILTER message processing (block 2110). If so, the message receiver may be configured to subdivide its portion of the index range corresponding to the received tag value according to the children of the particular node 210 for which the received tag value is a prefix (block 2112). For each child node 210, the message receiver may be configured to send a corresponding FINGERPRINT message back to the original message sender, specifying the tag 212 and fingerprint field 216 of the respective child node 210 (block 2114). Additionally, if there are gaps in the portion of the index range corresponding to the received tag value, for example as indicated by the children of the particular node 210, the message receiver may be configured to send one or more REQUEST messages for the tag values that correspond to the gaps (block 2116). Processing of the received FINGERPRINT message may then be considered complete (block 2118). In one embodiment, in addition to the above actions, if the received tag prefix value is an exact match of the particular node 210, a HASH message corresponding to the particular node 210 may be returned to the message sender.

For example, as shown in FIG. 17, a particular node 210a of an index 200 of a message receiver might have the tag "al" and children having corresponding tags "alan", "alex", "alfred", "ali" and "alz". This suggests that the message receiver has some information about nodes 210 that begin with "alan" and "alex", but not about nodes 210 that might begin with "alb", "alc" or "ald". Correspondingly, the message receiver may convey a FINGERPRINT message for each of the children of node 210a, as well as REQUEST messages for gaps among the tags of these children. In embodiments where negative REQUEST syntax is supported, the message receiver may convey REQUEST messages for tags other than those corresponding to the children of the particular node. For example, the message receiver may send REQUEST messages for tags other than those prefixed with "alan", "alex", "alfred", "ali" and "alz".

If the count value of the particular node 210 does not exceed the threshold value for FILTER message processing, then if the received FINGERPRINT message includes the got-data parameter, the message sender may have specific information about nodes 210 not present at the message receiver. Correspondingly, the message receiver may be configured to send a FILTER message that encodes into a filter (e.g., a Bloom filter as described above) each node 210 that is a descendant of the particular node 210 (blocks 2120-2122). For example, referring to FIG. 17, if the particular node corresponds to node 210l, then a Bloom filter encoding each of nodes 210m-q may be generated and returned via a FILTER message. In the illustrated embodiment, if the got-data parameter was not included in the original. FINGERPRINT message, respective FINGERPRINT messages may be generated and returned to the message sender for each of the children of the particular node 210, instead of the FILTER message (block 2124). These FINGERPRINT messages may include the got-data parameter. Following either generation of FILTER or FINGERPRINT messages in this case, processing of the received FINGERPRINT message may be complete (block 2118).

Figure 22:
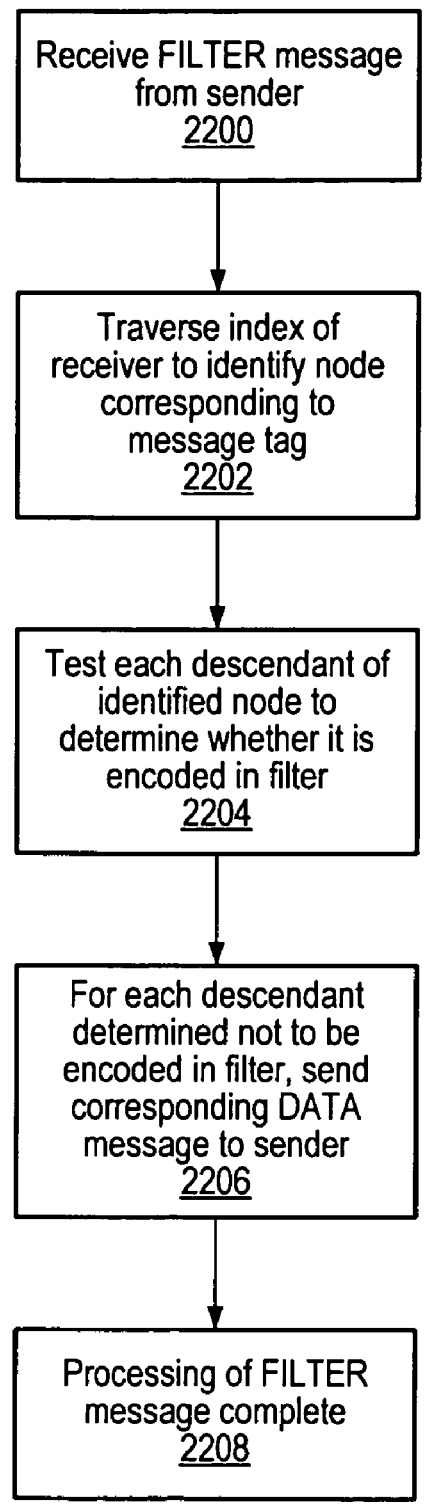
FIG. 22 is a flow diagram illustrating one embodiment of a method of processing a FILTER anti-entropy protocol message.
Figure 23:
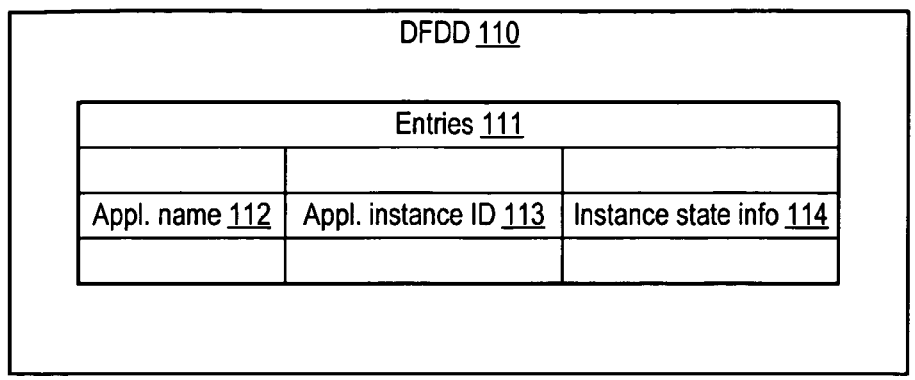
FIG. 23 illustrates one embodiment of a discovery and failure detection daemon (DFDD).

One embodiment of a method of processing a FILTER message is illustrated in FIG. 22. In the illustrated embodiment, operation begins in block 2200 where a FILTER message including a tag value and a filter value is received from a message sender, for example in response to a FINGERPRINT message as described above. Once the FILTER message is received, the index(es) of the message receiver are traversed to identify the particular node 210 that corresponds to the received tag value (e.g., for which the received tag value is a prefix or match), in a manner similar to the described above with respect to FIG. 21 (block 2202). In some embodiments, if a FILTER message is generated in response to another message, a node 210 corresponding to the received tag value will generally exist.

The message receiver may then test each descendant of the particular node 210 against the filter value provided in the FILTER message to identify those nodes 210 that are not encoded in the filter value, if any (block 2204). For each node 210 at the message receiver that is not encoded in the filter value, a corresponding DATA message may be returned to the message sender (block 2206). Processing of the FILTER message may then be considered complete (block 2208). As noted above, depending on the type and configuration of the filter algorithm employed for the FILTER message, false positives may occur. That is, the message receiver may falsely conclude that certain ones of its nodes 210 are encoded in the filter value, and thus are present in the same state at the message sender, when in fact they are not. Thus, it is possible that a single round of the anti-entropy protocol may not result in two keymap instances 140 becoming synchronized with respect to every node 210. However, it may be expected that in many embodiments, a single round of the anti-entropy protocol may not cause the instances to become more divergent, and repeated applications of the protocol may be expected to converge within a certain number of rounds with a certain degree of probability, depending on the degree to which the instances differ and the characteristics of the filter algorithm used (e.g., the probability of false positives given the threshold value for filter encoding).

In some embodiments, processing of the HASH, REQUEST and DATA messages may be considerably simpler than the FILTER and FINGERPRINT messages. In one embodiment, a HASH message receiver may attempt to identify a node 210 corresponding to the tag value included in the message, and may then compute a corresponding hash value of the identified node 210. If the received hash value matches the computed hash value, the identified node 210 may already be synchronized with a corresponding node 210 at the message sender. Otherwise, a REQUEST message including the received tag value is returned to the message sender to obtain a more current data version.

Processing of a REQUEST message, in one embodiment, may simply include the message receiver identifying each node 210 for which the received tag value included in the message matches or is a prefix of the corresponding tag field 212, for example using the unbalanced index navigation techniques described above. For each identified node 210, a corresponding DATA message, configured as described above, is returned to the message sender. In one embodiment, processing of a received DATA message may include identifying whether a node 210 corresponding to the tag value indicated in the message exists at the message receiver. If not, a corresponding node 210 may be created and populated with data extracted from the message. If so, the data associated with the existing node 210 and/or its corresponding data value may be replaced with data extracted from the message. In some embodiments, data of an existing node 210 may only be replaced if the received data is more current. For example, a DATA message may include the contents of an entry 144 corresponding to a node 210 at the message sender, and entry 144 may include timestamp information that may be compared with corresponding timestamp information at the message receiver to ascertain whether the received entry 144 is more current than the existing entry 144. If so, the received entry 144 may replace the existing entry 144.

Variations of the general synchronization protocol of FIG. 21 are possible and contemplated. For example, in embodiments in which communication between keymap instances is performed using packets having a fixed length, bandwidth utilization may be improved by conveying multiple FINGERPRINT messages for multiple nodes 210 within a single packet, rather than a single FINGERPRINT message corresponding to a particular node 210. An instance receiving such a packet may then be able to rapidly discern which particular ones of its index(es) 200 mismatch with the sender without necessarily exchanging further messages with the sender. For example, if the first FINGERPRINT message does not match, the receiver may consider other FINGERPRINT messages within the packet prior to issuing a REQUEST, FILTER or other message to the packet sender. In so doing, the receiver may be able to narrow the discrepancy to a particular portion of the data structure, which may reduce unnecessary network traffic to exchange messages regarding other portions of the data structure that are already synchronized.

In general, it is contemplated that any of the methods or techniques described above for performing keymap instance reconciliation using an anti-entropy protocol and/or an update propagation protocol may be implemented by a keymap coordinator process configured to operate at the level of keymap instances 140 or individual hosts 400 within instances. It is noted that numerous variations of the aforementioned methods and techniques for implementing anti-entropy protocols for unbalanced data structures are possible and contemplated, and the above discussion is intended to be illustrative rather than limiting. For example, the general class of protocols via which some entities frequently communicate with other, randomly selected entities in order to distribute information throughout a network may be referred to as gossip-based protocols, and other techniques or aspects of gossip-based protocols may be employed for use in an anti-entropy protocol among keymap instances 140. In various embodiments, the example synchronization messages described above (or other suitable messages) may be combined in different ways to yield synchronization protocols having different characteristics.

Additionally, while the stratified indexed data structure and synchronization techniques described above with respect to FIGS. 17-22 have been discussed in the context of implementing efficient data structures for use within keymap instances 140, it is contemplated that such data structures and synchronization techniques may be employed in any application in which large quantities of data may be indexed for rapid access. Such applications need not necessarily include object storage systems such as the system of FIG. 2, but may include database systems, search systems, or any other applications where data indexing may be applicable.

It is noted that in various embodiments, implementation of any type of random generation or selection of events described herein may employ any suitable algorithm or technique for random number or event generation. In many cases, computational techniques for implementing random methods may not produce purely random results, but rather pseudorandom results. For example, pseudorandom algorithms may specify deterministic processes configured to generate statistically random results. As used herein, the generation of "random" or "substantially random" data is intended to include any suitable pseudorandom computational techniques as well as purely random data sources.

Storage Service Component Detection and Management

In a large-scale, highly distributed implementation of a storage service system, there may be large numbers of the various system components shown in FIG. 2 distributed throughout the system. For example, there could be hundreds or thousands of instances of bitstore nodes 160, coordinators 120 and keymap instances 140. Managing the state of a distributed system of such scale presents practical challenges. For example, different instances of particular system components may be out of service at any given time owing to planned maintenance, failure of computing resources relied upon by components, communication failures that isolate otherwise-functional components, or for other reasons. Additionally, new or previously out-of-service instances of components may return to service, in some cases at arbitrary or unpredictable times.

In one embodiment, instances of discovery, failure and detection daemon (DFDD) 110 may be configured to respectively monitor the state of various associated components of the storage service system, to communicate with one another regarding such state, and to provide DFDD client applications with an interface through which such clients may identify available system components that may be used to perform system operations, such as keymap or bitstore operations. Generally, DFDD 110 may be configured to provide a uniformly accessible view of the current state of storage service system components on behalf of other components. That is, rather than configuring various components of the storage service system with multiple different interfaces configured for direct communication of state information with other, dissimilar components, each component that provides or depends on such information may be configured to communicate with an instance of DFDD 110 via a standard DFDD interface. In some embodiments, DFDD 110 may be implemented as a daemon process configured to operate within an environment managed by an operating system. However, in other embodiments DFDD 110 may be implemented as an independent or autonomous hardware or software agent configured to implement the functionality described herein, without any necessary dependence on or subservience to an operating system or other components.

Generally speaking, each instance of a storage service system component that is configured to be discovered and monitored by an instance of DFDD 110 may be referred to as an application instance. For example, the operational state or health of a given bitstore node 160 may be indicated by an instance of SNM controller 161 that is configured for execution by the given bitstore node 160. Thus, SNM controller 161 may correspond to a bitstore application instance. Similarly, the operational state of a keymap instance 140 may be indicated by instances of a keymap manager configured for execution on one or more hosts 400 within the keymap instance. Each keymap manager instance may correspond to a keymap application instance. Other types of application instances are possible and contemplated. For example, in one embodiment, each computer system via which one or more storage service system components are deployed may include a host monitor application instance configured to detect and report system-specific operational state details, such as utilization of processor, memory, disk, input/output (I/O) or other system resources. In some embodiments, each instance of DFDD 110 may itself be configured as an application instance. That is, DFDD instances may be configured to monitor their own operational state in addition to the state of other application instances.

Within a storage service system, application instances may be generically identified by application names and uniquely identified by respective application instance identifiers (IDs). For example, a particular application name may include a string that identifies a generic type of application instance, such as "keymap-manager", "bitstore-manager", "host-manager" or another suitable name, while an application instance ID) may include a string that uniquely identifies a particular instance within the application name space. In some embodiments, the application instance ID may explicitly include the application name, such as "keymap-manager-4AB8D945". Other suitable formats for application instance IDs may also be employed. In one embodiment, a given instance of DFDD 110 may be configured to associate a number of application instances (e.g., via names and instance IDs) with respective state information. For example, in the embodiment shown in FIG. 23, DFDD 110 includes a number of entries 111, each of which may associate an application name 112 and instance ID 113 with instance state information 114. In some embodiments, DFDD 110 may employ one or more tables to reflect the association of different types of state information 114 with a given application name 112 and instance ID 113, while in other embodiments, DFDD 110 may employ trees, unbalanced indexes such as described above, or any other suitable types of data structures indicative of the association between a given application instance and its corresponding state information.

It is noted that in some embodiments, application instance IDs may include their own name spaces of arbitrary levels of granularity. For example, in one embodiment, a given keymap application instance ID may be of the form <mapname>/<instance>/<endpoint>. The term <mapname> may identify a specific keymap dictionary of key-entry associations, which may generally correspond to a given keymap deployment. (It is possible for keymap application instances for different keymap deployments to be managed within the same instance of DFDD 110.) The term <instance> may identify a specific host 400 within a keymap instance 140, for example by a unique string. The term <endpoint> may identify one of a number of independent, functionally identical keymap application instances operating on the identified host 400 (e.g., as distinct processes). Other complex name spaces within application instance IDs are possible and contemplated.

The state information 114 associated with an application instance by DFDD 110 may include a variety of different types of information. In one embodiment, DFDD 110 may be configured to store within state information 114 global operational state information that may be common to all types of application instances managed by DFDD 110. For example, as described in greater detail below, in some embodiments DFDD 110 may implement a global operational state machine that defines a set of global operational states (or simply, global states) of application instances as well as possible transitions among the set of states. In such embodiments, each application instance managed by DFDD 110 may be associated with a specific one of the set of global states at any given time, and the global state for a given application instance may change over time according to the state machine and the behavior of the application instance.

In addition to global state information, which may be common to widely different types of application instances, in some embodiments state information 114 may reflect operating state information that may be specific to or customized for a particular application instance or type of instance. For example, if an application instance corresponds to a bitstore manager of a particular bitstore node 160, its state information 114 may include information about the quantity of available storage resources on that particular node, the type of those resources (e.g., high performance, low performance, etc.) or any other relevant state information that may be specific to the context of a bitstore node. Similarly, for an application instance corresponding to a keymap manager of a particular keymap instance 140, its state information may include information about the number of entries 144 managed by the particular keymap instance, keymap storage resources used or available, or other relevant keymap state information. In some embodiments, the selection of what application instance-specific state information to include within a corresponding DFDD entry 111 may be determined according to the requirements of DFDD clients. For example, state information that may be useful in assisting a coordinator 120 or nodepicker 130 in selecting a particular bitstore or keymap application instance from among several choices may be included within the DFDD entries 111 of those application instances.

In some embodiments, the state information 114 of an application instance may also include information about how a DFDD client may access the instance. For example, state information 114 may include an Internet Protocol (IP) address and port number through which a DFDD client may establish a connection with the application instance. Some application instances may support other types of interfaces such as web services interfaces, publish/subscribe interfaces, or other suitable interfaces. In such embodiments, state information 114 may include a URL or other information necessary for a DFDD client to perform a web services call, to subscribe to a publish/subscribe channel, or to perform another type of action necessary to establish communication with the application instance. In some embodiments, in addition to or instead of application instance access information, state information 114 may include information about where the instance is physically located within a storage service system. For example, state information 114 may include an identifier of a data center 300 or area 310 to which a particular application instance corresponds.

As mentioned above, in some embodiments DFDD 110 may maintain global state information for individual application instances that may indicate in general terms whether a given application instance is operating normally, and thus available for use, or is in an abnormal state. In one embodiment, each application instance configured for monitoring by an instance of DFDD 110 may be configured to report its status to DFDD 110, often (but not necessarily) at regular intervals such as some number of seconds or minutes. Such a report may be referred to as a "heartbeat." Heartbeat reports may be communicated according to any suitable protocol (e.g., as TCP/IP messages, as web services calls, or according to other standard or proprietary messaging protocols) and may vary in information content. As a minimal example, a given application instance may submit a heartbeat to DFDD 110 that simply includes the application name and application instance ID corresponding to the given instance. In other cases, the given application instance may include additional status information in the heartbeat, such as the specific state of local resource utilization. In some embodiments, application instances may be configured to perform some level of self-diagnosis or self-verification to ascertain their own functional state before sending a heartbeat, while in other embodiments an application instance may send a heartbeat without dependence on any self-assessment.

Figure 24:
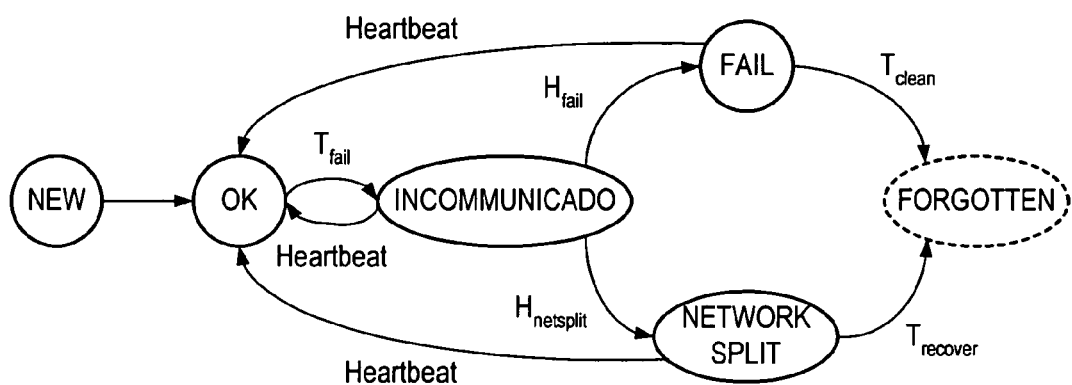
FIG. 24 illustrates one embodiment of a global operational state machine that may be maintained by a DFDD instance.

Generally speaking, if an application instance is sending heartbeats to DFDD 110 as expected, there is a reasonable expectation that it is operating normally. If heartbeats should be interrupted for some length of time, there is a reasonable expectation that something is wrong with the application instance. FIG. 24 illustrates one embodiment of a global state machine that may be maintained by DFDD 110 for each application instance as a function of heartbeat activity and/or other parameters. In the illustrated embodiment, a new application instance comes online in the NEW state, for example shortly after it begins operation and notifies an instance of DFDD 110 of its existence and provides an application name, application instance ID, and any other information necessary for DFDD 110 to initialize a corresponding entry 111. Once the new application instance is stable and ready to begin normal operation, it enters the OK state. In various embodiments, transition from the NEW to the OK state may be a function of time (e.g., a default settling time based on the type of the application instance), application instance self-reporting, administrator intervention, or a combination of these or other factors.

In the illustrated embodiment, an application instance may remain in the OK state as long as the time elapsed since the instance's last heartbeat to DFDD 110 is less than a failure threshold $T_{fail}$. For example, DFDD 110 may maintain a counter for each application instance that is incremented upon each heartbeat received from the corresponding instance, and may monitor each counter (e.g., with countdown timers) to ascertain whether its value changes before $T_{fail}$ elapses. In some embodiments, global states other than OK (and possibly NEW) may be generically referred to as abnormal operating states or failure states, though there may be distinctions among such states as described below.

If time $T_{fail}$ has elapsed since the last heartbeat for an application instance, its global state may transition to INCOMMUNICADO. In the illustrated embodiment, INCOMMUNICADO may function as a transient state indicative that something may be wrong with the application instance, but it has not been definitively determined to have permanently failed. For example, the application instance may have temporarily stalled or hung, the heartbeat message to DFDD 110 may have gotten delayed or lost, or as described in greater detail below, one instance of DFDD 110 may be out of synchronization with another instance of DFDD 110 with respect to the current state of the application instance. If a heartbeat is received from an application instance in the INCOMMUNICADO state, the instance may transition back to the OK state. In some embodiments, DFDD clients may elect at their own risk to use an application instance that is in the INCOMMUNICADO state.

If an application instance does not spontaneously recover from the INCOMMUNICADO state, there may be a more serious problem affecting the instance. In the illustrated embodiment, two possible failure scenarios may occur. As shown by the FAIL state, an individual application instance may fail in isolation, for example due to failure of underlying compute resources hosting the individual instance. Alternatively, an application instance may fail owing to a loss of network communication between the instance and DFDD 110, as shown by the NETWORK SPLIT state. For example, an application instance may be operational and accessible to some instances of DFDD 110 but not others, due to a communication failure that isolates portions of the storage service system from one another.

It may be difficult to determine with certainty whether a given application instance failure is isolated or owing to a network split. In some embodiments, DFDD 110 may employ respective heuristic criteria $H_{fail}$ and $H_{netsplit}$ that take into account various types of available information to make a determination as to whether an application instance should transition from the INCOMMUNICADO state to the FAIL state or the NETWORK SPLIT state. For example, the criteria may require that a given application instance be in the INCOMMUNICADO state for at least a threshold amount of time $T_{heuristic}$ before transitioning to another failure state. Additionally, the criteria may take into account whether other application instances that share resources with or belong to the same area 310 or datacenter 300 as the given application instance are also in an INCOMMUNICADO, FAIL or NETWORK SPLIT state. For example, if other application instances located at the same IP address as the given application instance or at other addresses within the same area 310 or data center 300 are OK, it may be likely that the failure of the given application instance is isolated. By contrast, if multiple application instances are not OK, a network split scenario may be more likely, particularly if application instance status is clustered according to geography or network topology. In some embodiments, DFDD 110 may be configured to interrogate application instances suspected of failure, in addition to using passively received status information in order to determine the nature of the failure. In some embodiments, the heuristic criteria may be configured to determine whether an application instance is probabilistically likely to have failed according to some threshold of probability (e.g., greater than 50% probability, greater than 90% probability, etc.).

Depending on the heuristic criteria, a failed application instance may transition to either the FAIL state or the NETWORK SPLIT state. In one embodiment, the instance may transition back to the OK state from either of these states if a heartbeat is received, while in other embodiments either or both of these states may be irrecoverable. While an application instance that is in the INCOMMUNICADO state may be presumed to be functional or recoverable with a possibility of failure, application instances in the FAIL or NETWORK SPLIT states may be presumed to have failed (with a possibility of recovery in some embodiments). Generally, DFDD clients may avoid selecting those application instances in either of these failure states. In some embodiments DFDD 110 may be configured to conceal from clients information about application instances in either of these failure states.

In the illustrated embodiment, an application instance may remain in either the FAIL or NETWORK SPLIT states for respective periods of time $T_{clean}$ and $T_{recover}$ before passing to the FORGOTTEN state. For example, in some cases of the FAIL state, the resources associated with the failed application instance may be preserved for some time for recovery or analysis purposes. If possible, such resources (e.g., the storage resources of a bitstore node 160) may then be initialized for redeployment as a new application instance. In some cases of the NETWORK SPLIT state, a decision may need to be made regarding whether to proceed with system operation without the failed application instances, and if so, what sort of recovery actions should be taken (e.g., regenerating object replicas among remaining application instances, etc.). In some embodiments, failed application instances may not pass to the FORGOTTEN state until such recovery actions are complete.

The FORGOTTEN state of an application instance may not be explicitly represented within DFDD 110. Rather, in some embodiments it may be marked by a deletion of existing state information of the application instance, such as its DFDD entry 111, from DFDD 110. In general, an application instance may not recover from the FORGOTTEN state, although in some instances a new instance of the application may be initialized using the same resources allocated to the forgotten instance via the NEW state. In some embodiments, if an application instance should spontaneously resume sending heartbeats while in the FORGOTTEN state, DFDD 110 may recognize that the instance has been forgotten (e.g., no longer corresponds to a valid entry 111) and may instruct the instance to cease operating or to reset or reinitialize itself.

It is noted that in some embodiments, the heuristics and transition time parameters that factor into global state transitions may be different for different types of application instances, and some or all of these parameters may be adjustable by DFDD clients. Also, while a DFDD client may generally query an instance of DFDD 110 to ascertain the current global state of a given application instance, in some embodiments DFDD 110 may support a publish/subscribe state change notification model. For example, a DFDD client may inform DFDD 110 via a subscription process that the client wishes to be notified of all or certain types of global state changes of a particular application instance or set of instances. Upon detecting such a state change, DFDD 110 may then convey a message indicative of the change to subscribing DFDD clients.

Frequently, an application instance may be configured to send heartbeat information to an instance of DFDD 110 that is closest to the application instance. For example, in some embodiments an instance of DFDD 110 may be provisioned on each computer system that is configured to host one or more other application instances, so that application instances may readily access a local instance of DFDD 110 simply by referring to the local IP address of their host and using a well-known IP port reserved for application instance-DFDD communication. However, if application instances report their status to some instances of DFDD 110 and not others, then in the absence of some effort to synchronize their state, deployed instances of DFDD 110 may become divergent.

Figure 25:
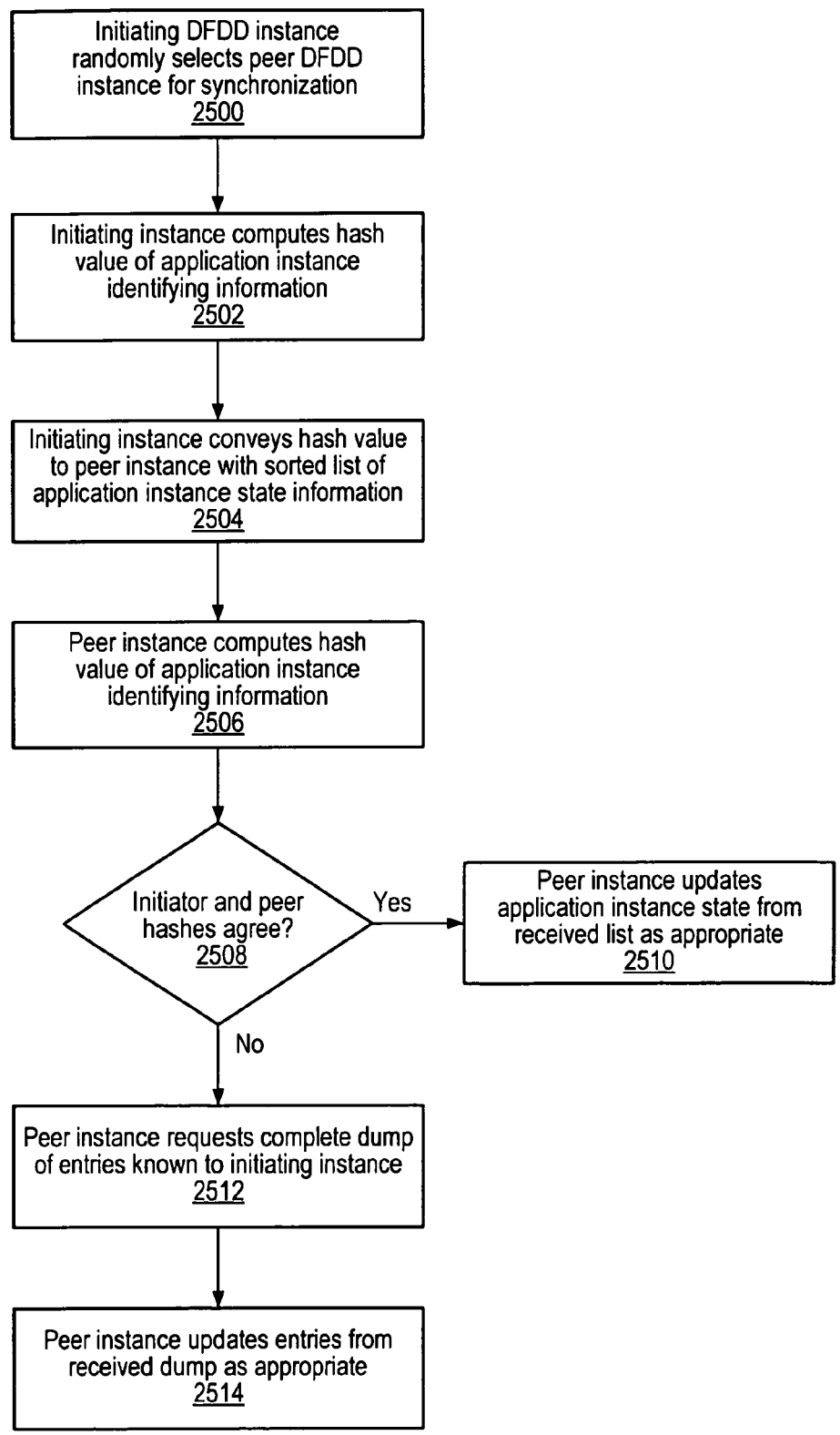
FIG. 25 is a flow diagram illustrating one embodiment of a method of synchronizing DFDD instances according to a gossip-based protocol.

In some embodiments, divergence among instances of DFDD 110 may be addressed using synchronization protocols similar to those described above with respect to keymap instances 140, such as gossip-based protocols. However, in many cases, the number of DFDD entries 111 collectively managed by instances of DFDD 110 may be substantially smaller than the number of keymap entries 144 managed by keymap instance 140. When this is the case, simpler reconciliation protocols may be used to synchronize instances of DFDD 110. A method of operation of one embodiment of such a gossip-based protocol is shown in FIG. 25. In the illustrated embodiment, operation begins in block 2500 where one instance of DFDD 110, referred to as the initiating instance, randomly selects another, peer instance of DFDD 110 for synchronization. In some embodiments, the initiating DFDD instance may occasionally deliberately select a peer DFDD instance from among those DFDD instances currently in a failed state (e.g., NETWORK SPLIT) according to the initiating DFDD instance's state information. If the initiating DFDD instance succeeds in contacting and synchronizing with an apparently-failed peer instance, recovery from the apparent failure may be facilitated.

The initiating instance may then compute a hash value of the identifying information of the application instances reflected in its entries 111 (e.g., by hashing application instance names and IDs, and possibly endpoints or other identifying information) (block 2502). The hash value may be determined according to any suitable hash algorithm, such as the MD5 algorithm, for example. The initiating instance then conveys the computed hash value to the peer instance along with a sorted list of current application instance state information (e.g., heartbeat counts, global state information and/or any other information included in state information 114) (block 2504). The list of state information may be sorted according to any criterion that produces a consistent list at both the initiating and peer instances. For example, the list may be sorted according to application instance name and/or ID.

It is noted that as described above, in some embodiments state information associated with an application instance may be derived from heartbeat count information included within a heartbeat message. Correspondingly, in some embodiments, DFDD instances may exchange heartbeat count information for application instances and may derive application instance state information from received heartbeat count information, rather than receive state information directly from other DFDD instances. Thus, in one embodiment a given DFDD instance may be configured to update the state of a particular application instance (e.g., according to the state machine of FIG. 24) on the basis of received heartbeat count information regardless of whether that information was received directly from the particular application instance, or indirectly from another DFDD instance via a synchronization protocol. In such an embodiment, synchronization of application instance operating state information among DFDD instances may involve synchronization of heartbeat information without directly exchanging the particular global operating state (e.g., OK, INCOMMUNICADO, etc.) of an application instance, which may simplify the operation of the synchronization protocol.

In response to receiving the hash value and list of state information, the peer instance computes a hash value of the identifying information of its own application instances, in a manner consistent with that performed by the initiating instance (block 2506), and compares the resulting hash value with the hash value received from the initiating instance (block 2508). If the two values agree, there is a high probability that both the initiating and peer instances have entries 111 that correspond to the same set of application instances. The peer instance may then scan the received list of state information and update its entries 111 from the received list as appropriate (block 2510). For example, if a heartbeat count or timestamp in the received list is greater or more recent than that stored in one of the peer's entries 111, the peer may update the entry 111 from the state information in the received list. In some embodiments, the peer instance may send its own list of state information back to the initiating instance for similar processing, either concurrently with or subsequent to receiving the list from the initiating instance.

If the hash values disagree, it is likely that the set of application instances known to the peer and initiating instances differ in at least one entry 111. Correspondingly, the peer instance may request a complete dump of the entries 111 known to the initiating instance (as opposed to just the state information 114 of those entries 111) (block 2512). The peer instance may then add any entries 111 it was lacking and synchronize the state of the remaining entries 111 (block 2514). As above, in some embodiments the peer instance may send a complete dump of its entries 111 back to the initiating instance, either concurrently with or subsequent to receiving the dump from the initiating instance.

It is contemplated that in some embodiments, every instance of DFDD 110 present within a system may be configured to repeatedly execute the synchronization protocol just described, or a suitable variant thereof, at intervals of time. For example, the protocol may be executed by instances of DFDD 110 roughly periodically with a period of one second, or any other suitable period. It is further contemplated that in some embodiments, instances of DFDD 110 may execute the synchronization protocol with roughly the same periods but different phase offsets relative to one another, such that at any given time, only a portion of instances of DFDD 110 may commence the protocol.

It is noted that in some embodiments, instances of DFDD 110 may be used to coordinate and communicate state information for any type of application instances within any distributed system, not simply those application instances defined within a storage service system. Also, in some embodiments, different groups of DFDD instances may manage different application instance state information. In some such embodiments, groups may be distinguished from one another by assigning a common identifier to instances of DFDD 110 that are members of the same group and requiring identifiers to match as a condition of DFDD synchronization. For example, DFDD instances that manage storage service system application instances may have an identifier that is distinct from DFDD instances configured to manage the state of other application instances unrelated to the storage service system, and only those DFDD instances having the same identifier may exchange information with one another according to the synchronization protocol of FIG. 25.

In some embodiments, DFDD group identifiers may be used to distinguish different configurations of application instances present in the same system. For example, one set of instances of DFDD 110 corresponding to a "production" identifier may be deployed to manage a production version of a storage service system or another distributed system, and may reflect one set of application instances corresponding to the production system, while another set of instances of DFDD 110 corresponding to a "test" identifier may be deployed to manage a test version of the system that corresponds to a different set of application instances and state. It is noted that in some cases, application instances and/or DFDD instances corresponding to either system version may execute on the same underlying system resources (e.g., on the same computer system), but may be rendered transparent to one another by virtue of their distinct DFDD group identifiers. For example, when executing a synchronization protocol such as the protocol illustrated in FIG. 25, DFDD instances may first determine whether they are members of the same group (e.g., by exchanging group identifiers) and performing the subsequent synchronization steps contingent upon this determination, thereby facilitating the segregation of application instance state information between groups.

It is noted that the previously described gossip-based protocol for synchronizing instances of DFDD 110 may not only aid in distributing the operational states of existing application instances throughout a storage service system, but may facilitate the discovery of new application instances by other system components as well. For example, once a new application instance is initialized and makes contact with an instance of DFDD 110 (e.g., an instance operating locally on the system on which the new application instance was initialized), a new entry 111 may be created corresponding to the new instance. As the instance of DFDD 110 on which the new entry 111 was created synchronizes its state with various other instances of DFDD 110, the new entry 111 may be propagated throughout the system. DFDD clients that query DFDD 110 to identify application instances for various purposes (e.g., to store a new object 30 or to update a keymap entry 140) may then be presented with state information about the new application instance as well as any existing ones.

It is also noted that in the embodiments described above, application instance state changes relating to failure detection and discovery may propagate throughout a system without intervention on the part of the application instances or the DFDD clients that reference those instances. That is, a given application instance need only know how to convey heartbeat information to one instance of DFDD 110. It does not need to have knowledge of all instances of DFDD 110 within the system, of other application instances, or of the various clients that may invoke the given application instance. Similarly, DFDD clients do not need to have independent knowledge of other clients or of all the application or DFDD instances within the system; clients may rely on the instance of DFDD 110 with which they communicate to obtain reasonably current information on the state of resources available within the system. By permitting the state of application instances to change without requiring other application instances or clients to be immediately notified of such changes, DFDD 110 may facilitate the scalability of the storage service system.

Storage Classes

In some storage service system embodiments, objects 30 may be treated uniformly with respect to their degree of replication, the distribution of replicas among areas 310, the type of storage resources to which replicas are stored, and/or other system features or policies. For example, the system may attempt to replicate every object 30 the same number of times to the same number of distinct areas 310. However, different clients 50 may have different storage requirements for different objects 30. For example, one client 50 may wish to store a particular object 30 with a higher degree of reliability (e.g., in terms of numbers and distribution of replicas) than the default storage policies may provide, while another client 50 may not require even the default level of reliability. Alternatively, a client 50 may wish to increase object write performance by limiting the number of areas 310 to which object replicas are distributed, at the possible expense of reliability.

Correspondingly, in one embodiment a storage service system such as that of FIG. 2 may be configured to support storage classes of objects 30. Generally speaking, a storage class of a given object 30 may specify any set of storage service system features or characteristics that affect the service level agreement (SLA) with respect to the given object 30. A service level agreement may generally reflect the set of assurances or expectations under which a service provider offers services to a client, in exchange for some consideration received from the client (e.g., fees or any other suitable type of consideration). For example, an SLA for objects 30 managed by a storage service system may specify various levels of object reliability, availability, access performance (e.g., latency, bandwidth), fees or rates for services, or any other measurable aspects of a client's interaction with an object 30. In some embodiments, a storage class may specify only a particular subset of SLA characteristics (e.g., number and distribution of object replicas as discussed below), while in other embodiments, a storage class may correspond directly to a comprehensive SLA that encompasses all defined aspects of the SLA agreement with respect to a given object 30.

In one embodiment, a storage service system may define a fixed set of storage classes each having specific defined SLA characteristics, and clients 50 may choose to associate specific objects 30 with particular storage classes. For example, a default storage class may specify that an object 30 will be replicated at least three times to at least two different areas 310. A high-reliability storage class may specify that an object 30 will be replicated at least five times to at least three different areas 310. A budget storage class may specify that a single replica of an object 30 will be stored in a single area 310. A local storage class may specify that an object 30 will be replicated at least three times to a single area 310. In other embodiments, a storage service system may define storage classes having other characteristics, or may allow a client 50 to customize a storage class for a given object 30 by specifying a combination of storage policies (e.g., as described above with respect to nodepicker 130) to be applied to the given object 30.

As mentioned above, SLA characteristics may extend beyond numbers of replicas and numbers of areas to which replicas should be distributed. In one embodiment, an SLA characteristic of a particular storage class may include an indication of an expected processing latency corresponding to objects 30 associated with the particular storage class. For example, one storage class may specify a low expected processing latency for a given cost while another may specify a higher expected processing latency for a lower cost. Different levels of expected processing latency may be implemented in a variety of ways. For example, from the perspective of a given coordinator 120, some nodes 160 may exhibit lower access latency than others, due to factors such as the proximity of nodes 160 to given coordinator 120, the level and type of resources available at nodes 160, the processing load of nodes 160, or other relevant factors. Thus, subject to the constraints implemented by other SLA characteristics specified by a given storage class, in some embodiments coordinator 120 and/or nodepicker 130 may be configured to choose nodes 160 that exhibit lower access latency for objects 30 in a storage class that specifies a lower expected processing latency. In other embodiments, coordinator 120 may be configured to prioritize processing of client access requests to objects 30 according to the expected processing latencies of the storage classes associated with the objects 30. For example, coordinator 120 may implement distinct queues or other processing control or data structures configured to bias processing in favor of storage classes having lower expected processing latency, while ensuring that requests to storage classes having higher expected processing latency eventually complete.

A storage class may be specified by a client 50 at the time an object 30 is initially stored within the storage service system. Alternatively, in some embodiments a client 50 may change the storage class associated with an object 30 at any time while the object 30 exists within the storage service system. If no storage class is specified by a client 50 when an object 30 is initially stored, a default storage class such as the one described above may be used. As described above, in some embodiments the storage class of an object 30 may be stored within a keymap record 148 associated with the key of the object 30. In such embodiments, coordinator(s) 120 and/or replicator 180 may be configured to take the storage class of an object 30 into account when storing, replicating and maintaining existing replicas of the object 30. It is contemplated that clients 50 may be charged different usage costs for objects 30 associated with different storage classes. For example, a high-reliability storage class may generally use more system resources, while a budget storage class may use fewer resources. Correspondingly, for an object 30 of a given size, a client 50 may be charged more for storing the object 30 using the former storage class, and less for the latter.

Figure 26:
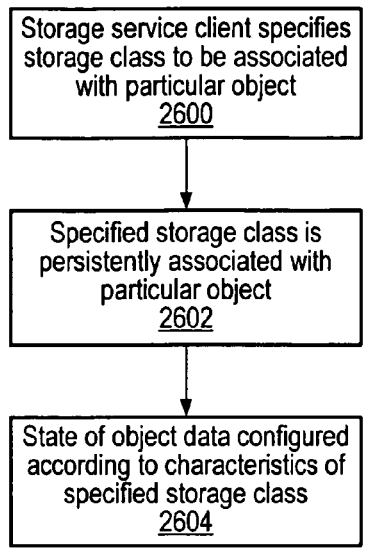
FIG. 26 is a flow diagram illustrating one embodiment of a method of operation of storage classes within a storage service system.

One embodiment of a method of operation of storage classes within a storage service system is illustrated in FIG. 26. In the illustrated embodiment, operation begins in block 2600 where a client 50 specifies a storage class to be associated with a particular object 30. Subsequently, the storage class is persistently associated with the particular object 30 within the storage service system (block 2602). For example, an indication of the storage class may be stored in a data structure associated with the particular object 30, such as keymap record 148, by a coordinator 120 on behalf of the client 50. The state of the object data associated with the object 30 is then configured according to the characteristics of the specified storage class (block 2604). For example, if the storage class specifies certain requirements for numbers and/or distribution of object replicas among areas 310, coordinator 120 and/or replicator 180 may operate to generate and distribute the necessary replicas such that the resulting state of the storage system with respect to the particular object 30 satisfies the requirements of the storage class. In some embodiments, replicator 180 may be configured to ensure that storage class requirements for an object 30 are maintained over time. For example, if replicas fail, replicator 180 may be configured to detect the failure and generate additional replicas.

It is contemplated that in some embodiments, the storage characteristics specified by a given storage class may include distinguishing among different types of storage resources available via bitstore nodes 160. For example, in some embodiments, some bitstore nodes 160 may include higher-performance storage devices than others, or an individual bitstore node 160 may include a combination of higher- and lower-performance devices. In such an embodiment, a storage class may specify that one or the other type of device should be used for objects 30 associated with that class.

Dynamic Replication

As discussed above, in some embodiments nodepicker 130 may be configured to generate a write plan identifying specific bitstore nodes 160 to which replicas of a particular object 30 should be written. Such a write plan may be generated in such a way that various write policies are satisfied with respect to the particular object 30 once the write plan has been implemented, e.g., by a coordinator 120. For example, the number of nodes 160 specified by a write plan may be determined according to a minimum required number of replicas for a particular object 30, a minimum number of distinct areas 310 over which replicas should be distributed, or any other storage policy consideration.

In some embodiments, nodepicker 130 may be configured to generate write plans in a static fashion in which nodes 160 are consistently chosen according to a predictable procedure without taking into account the current state of the nodes 160. For example, nodepicker 130 may consistently choose the same set of nodes 160 for storing replicas, or may rotate through a number of nodes 160 in a round-robin fashion. However, in a large-scale implementation, a storage service system may include many nodes 160 that may be operating in considerably dissimilar states at various times. For example, some nodes 160 may be inoperative, others may be operative but saturated with request activity or have few free resources, and still others may be relatively idle or have substantial free resources.

Additionally, different nodes 160 may present different levels of communication cost from the perspective of a given coordinator 120 or nodepicker 130. For example, nodes 160 located within the same area 310 or datacenter 300 as a coordinator 120 may be accessible via local, low-latency network connectivity. By contrast, nodes 160 located in a different area 310 or data center 300 from a coordinator 120 may present substantially higher access latency than local nodes 160. Moreover, in some embodiments, communication between areas 310 or data centers 300 may take place over communication networks having different economic cost models than local communication. For example, communication within an area 310 may take place over a private local area network (LAN) having plentiful bandwidth for which there is no usage-based charge for data transmission. By contrast, communication between data centers 300 may take place over facilities such as leased telecommunication facilities, the public Internet, private wide area network (WAN) facilities or other long-haul communication networks. These facilities may typically be more bandwidth-constrained than LAN facilities, and in some instances may present utilization costs (e.g., based on peak or aggregate bandwidth utilization) charged by third parties that may not be applicable to LAN communication.

Both the operating state of various nodes 160 as well as the costs of communication to those nodes may vary over time. For example, a node 160 that is operative or idle at one time may become inoperative or busy at a later time, or vice versa. Similarly, communication costs such as latency and/or economic costs may be higher during some periods and lower in others (e.g., during periods of peak vs. off-peak utilization). Because of this variability, a write plan that is efficient and low in cost at one time may be considerably less efficient, higher in cost, or even infeasible at another time (e.g., if nodes 160 specified in the write plan become busy, slow to communicate or inoperative).

Thus, in some embodiments, nodepicker 130 may be configured to dynamically determine a given write plan for writing replicas of a given object 30 according to current state information associated with nodes 160. Generally speaking, a dynamically determined write plan may take into account observable dynamic state information regarding nodes 160. That is, a dynamically determined write plan may be generated as a function of node state information that may change over time. Thus, a dynamically determined write plan for a given object 30 may itself change over time depending on the underlying state information of nodes 160, in contrast to a statically generated write plan that may be determined independent of the state of nodes 160.

As mentioned above, many different types of state information may be taken into account in the dynamic generation of write plans. In general, state information of nodes 160 may include state information regarding a given node 160 as well as state information regarding communication resources (e.g., network resources) via which the given node 160 may be accessible. In various embodiments, state information regarding a given node 160 may include the operational state of the given node 160, such as whether the given node 160 (or an application instance associated with the node) is in an OK, INCOMMUNICADO or other operational state as indicated by DFDD 110 as described above. State information regarding a given node 160 may also include load status information that may indicate the behavior of given node 160 in greater detail than the operational state information. For example, in various embodiments load status information may indicate a level of processor utilization, memory utilization, storage device capacity utilization, storage device input/output bandwidth utilization, or network interface bandwidth utilization corresponding to a given node 160, or any other measurable aspect of node behavior. As described above, in some embodiments load status information may be available via DFDD 110 in addition to operational state information.

Communication resource state information, which may also be referred to as network cost information, may include any suitable information relative to the state of one or more communication paths to a given node 160. In various embodiments, network cost information may indicate the network communication latency associated with conveying a message to and/or from given node 160, which may be expressed in terms of time (e.g., seconds, milliseconds, etc.), number of network hops (e.g., number of routing steps to convey a message), or another suitable metric. In one embodiment, network cost information may include an indication of available bandwidth (e.g., rate of data transfer) available for communication with given node 160. In another embodiment, network cost information may include an indication of an economic cost associated with network communication with given node 160. For example, such a cost may be expressed as a rate charged for transmitting or receiving a certain quantity of data, or any other suitable cost or rate model for network communication.

Nodepicker 130 may generally use any suitable function of state information of nodes 160 in dynamically determining a write plan for an object 30. In some embodiments, storage policies implemented by nodepicker 130 (which may be in addition to or instead of those storage policies previously described) may specify guidelines or requirements for state information that constrain the nodes 160 that may be eligible to be included in a write plan for a particular object 30. In various embodiments, these policies may apply globally (e.g., to all objects 30), to a particular set of objects 30 (e.g., objects included in a particular storage class or bucket, having a common key prefix, or otherwise denoted as members of a set), or to individual objects 30 (e.g., in response to a client specifying a particular policy to be associated with an object 30), or any suitable combination of these. As an example, a particular storage class may specify a storage policy requiring that some minimum number of replicas exhibit no more than some maximum communication latency. Correspondingly, in developing a write plan for an object 30 in this storage class, nodepicker 130 may be configured to select at least some nodes 160 according to whether they satisfy the specified maximum communication latency.

In some embodiments, nodepicker 130 may also be configured to generate a write plan according to various types of optimization on node state information. For example, as an alternative to specifying a particular maximum network cost or other cost associated with a write plan, a storage policy may specify that the cost should be minimized among the resources that are available at a particular time. Correspondingly, nodepicker 130 may be configured to minimize one or more costs associated with a write plan, for example by selecting nodes 160 having lower network communication or other associated costs. In some embodiments, such minimization may occur in the presence of other constraints, such as other storage policies specifying other node state information requirements.

Additionally, it is noted that in some embodiments, some node state information may vary over time in a predictable fashion. For example, bandwidth costs associated with network communication between data centers 300 may vary according to well-defined rate schedules. In some such embodiments, minimizing a cost associated with a write plan may include identifying a time period during which all or some portion of the write plan should be executed, dependent upon the cost associated with a particular time period. For example, nodepicker 130 may determine that bandwidth for communicating with a remote data center 300 will be less expensive at some future time than at the current time, and may further determine that the cost of a write plan including nodes 160 at the remote data center 300 may be minimized by performing at least those storage operations directed to the remote data center at the identified future time. One possible outcome of this process is that the write plan generated by nodepicker 130 may indicate that generation of some (or possibly all) replicas of a given object 30 should be deferred until the identified future time.

It is possible that many different storage policies may apply to a particular object 30. Further, in some instances, it may not be possible to generate a single write plan that satisfies each storage policy associated with particular object 30. For example, storage policies associated with particular object 30 may specify that a minimum number of replicas should be stored and distributed among a minimum number of distinct areas 310. However, at a time when a write plan is generated for particular object 30, the area 310 in which nodepicker 130 is executing may be temporarily isolated from other areas 310 due to a transient communication failure. Consequently, it may be at least temporarily impossible to successfully distribute replicas to other areas 310 in satisfaction of the corresponding storage policy.

In one embodiment, nodepicker 130 may be configured to dynamically determine write plans for objects 30 on the basis of maximizing the number of storage policies that can be satisfied by the write plan. In the presence of suboptimal conditions, this may result in a write plan that represents a "best effort" to satisfy storage policies. For example, in the particular scenario just described, the area diversity policy may not be satisfiable owing to the communication failure, but the minimum replication policy may be satisfiable by storing the required minimum number of replicas of particular object 310 within the local area 310. In some embodiments, the maximization of storage policies may take place under various constraints. For example, some storage policies may be identified as mandatory, such that if they are not satisfiable, a write plan cannot be determined and a corresponding client request to store an object may fail. Other storage policies may have a preference ranking or weighting, such that higher-preference storage policies may be chosen over lower-preference policies during the maximization process. In another embodiment, selection of storage policies may be performed by maximizing the total weight of a resulting storage plan (determined on the basis of weights of the satisfied storage policies) instead of or in addition to the number of storage policies satisfied by the resulting storage plan.

It is noted that the various techniques for dynamically determining write plans for objects 30 need not occur solely when objects 30 are originally stored. As described above, in some embodiments replicator 180 may be configured to examine keymap entries 144 corresponding to objects 30 to determine whether replicas of objects 30 are accessible. If any replicas of a particular object 30 are inaccessible, replicator 180 may be configured to request a new write plan from nodepicker 130 that may be used to generate additional replicas. The new write plan may be dynamically determined by nodepicker 130 using any suitable combination of the techniques described above. Additionally, in some embodiments replicator 180 may be configured to more generally monitor the compliance of objects 30 with respect to various storage policies. For example, replicator 180 may be configured to determine whether an existing set of replicas of an object 30 satisfies an area diversity policy in addition to a minimum replication policy, or any other suitable set of policies. In one such embodiment, if replicator 180 determines that the number of policies satisfied by the existing replicas of a particular object 30 is less than some threshold value, replicator 180 may request a new storage plan from nodepicker 130 that may be dynamically determined to maximize the number of satisfied storage policies as described above. In alternative embodiments, replicator 180 may request a new storage plan upon determining that a particular mandatory storage policy is no longer satisfied, or upon determining that a total weight of satisfied storage policies falls below a threshold weight.

Figure 27:
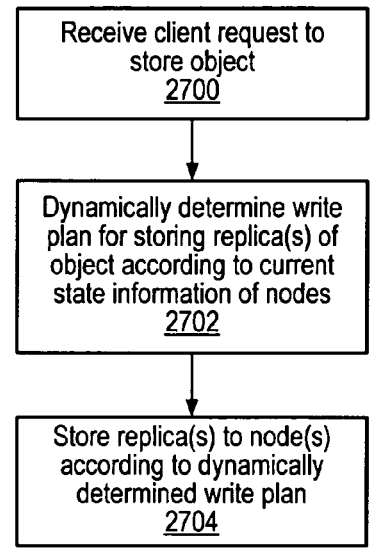
FIG. 27 is a flow diagram illustrating one embodiment of a method of dynamically determining a write plan for storing one or more replicas of a data object according to current state information of storage nodes.

FIG. 27 illustrates one embodiment of a method of dynamically determining a write plan for storing one or more replicas of a data object according to current state information of bitstore nodes 160. In the illustrated embodiment, operation begins in block 2700 where a client request to store a given object 30 is received. In one embodiment, such a request may be received according to a web services protocol via web services interface 100, as described in detail above.

Subsequently, a write plan for storing replicas of given object 30 is dynamically determined according to current state information of bitstore nodes 160 (block 2702). For example, nodepicker 130 may be configured to determine a write plan according to various storage policies that may apply to given object 30, where the policies take into account any suitable current state information such as node operational status, node load status information, network communication cost, or any other suitable state information such as described in detail above. Additionally, as described above, in some embodiments dynamically determining a write plan may include optimization with respect to state information or storage policies, such as by minimizing a cost associated with the write plan or maximizing a number or weight of storage policies satisfied by the write plan.

Replicas of given object 30 are then stored to one or more of bitstore nodes 160 according to the dynamically determined write plan (block 2704). For example, coordinator 120 may be configured to generate bitstore object put operations directed to individual bitstore nodes 160 specified in the write plan, as described above. In some embodiments, some storage operations of the write plan may be executed at different times than other operations, as described above.

Figure 28:
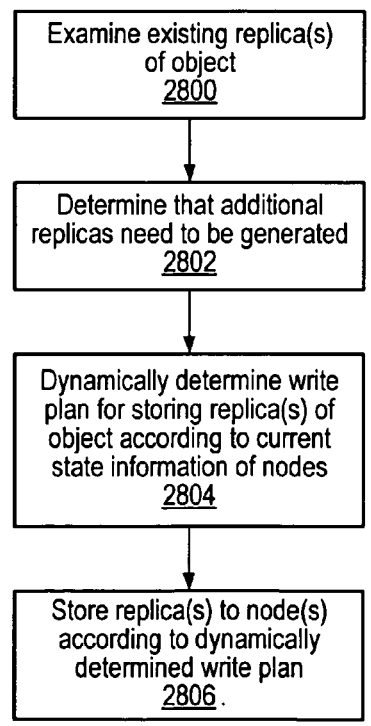
FIG. 28 is a flow diagram illustrating one embodiment of dynamically determining a write plan with respect to an object for which one or more replicas have already been stored among storage nodes.

As mentioned previously, in some embodiments a write plan may be dynamically determined with respect to an object 30 for which one or more replicas have already been stored among bitstore nodes 160. FIG. 28 illustrates one embodiment of such a method. In the illustrated embodiment, operation begins in block 2800 where one or more existing replicas of a given object 30 are examined. For example, as described above, one embodiment of replicator 180 may be configured to determine whether existing replicas of given object 30 are accessible, and/or the extent to which existing replicas of given object 30 satisfy storage policies associated with the object.

In response to examining replicas of given object 30, it may be determined that one or more additional replicas need to be generated (block 2802). For example, existing replicas may have failed or otherwise become inaccessible, resulting in there being fewer than a minimum number of replicas. Alternatively, the state of existing replicas may be deficient with respect to one or more storage policies. Subsequently, a write plan for storing additional replicas of given object 30 is dynamically determined according to current state information of bitstore nodes 160 (block 2804). Such a write plan may be determined in a manner similar to that previously described, or according to any suitable variations thereof. It is noted that in some embodiments, if it is determined that no additional replicas need to be generated for given object 30, a write plan may not be determined.

Replicas of given object 30 are then stored to one or more of bitstore nodes 160 according to the dynamically determined write plan (block 2806). For example, replicator 180 may be configured to generate bitstore object put operations directed to individual bitstore nodes 160 specified in the write plan, as described above, or may simply direct one or more nodes 160 storing existing replicas of given object 30 to copy their replicas to the one or more nodes 160 specified in the write plan.

Exemplary Computer System Embodiment

It is contemplated that in some embodiments, any of the methods or techniques described above may be implemented as program instructions and data capable of being stored or conveyed via a computer-accessible medium. Such methods or techniques may include, for example and without limitation, the functions of storage clients 50, web services platform 100, DFDD 110, coordinator(s) 120, nodepicker 130, keymap instance(s) 140, bitstore node(s) 160, replicator 180 and/or replicator keymap 190. Such methods or techniques may further include any of the methods illustrated in FIGS. 6-9, 13-15, 20-22 and 25-28 and any suitable variations thereof. Such program instructions may be executed to perform a particular computational function, such as a particular method or portion of a method described above, as well as to provide more general operating system functionality, application functionality, and/or any other suitable functions. It is noted that in some embodiments, components or methods described above as distinct may in other embodiments be integrated into fewer entities than those shown, or functionality may be partitioned differently across components or methods from the partitioning described above.

Figure 29:
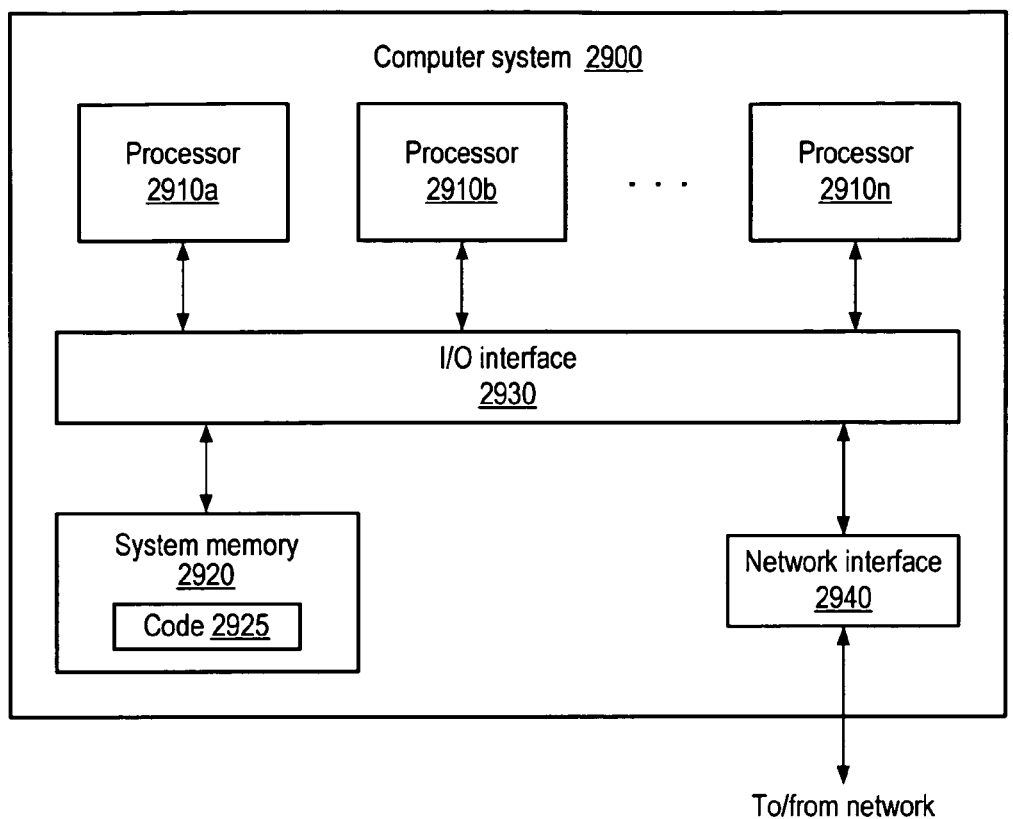
FIG. 29 is a flow diagram illustrating an exemplary embodiment of a computer system.

One exemplary embodiment of a computer system including computer-accessible media is illustrated in FIG. 29. Such a system may also be referred to as a node. As discussed previously, in one embodiment the functionality of any of the various storage system components described above may be distributed across a number of nodes, such that a given component may be implemented by one or more nodes or partitioned across several nodes. While in some embodiments, a node may exclusively implement the functions of a single storage service system component, in other embodiments a node may implement the functionality of all or portions of several different system components. In the illustrated embodiment, computer system 2900 includes one or more processors 2910 coupled to a system memory 2920 via an input/output (I/O) interface 2930. Computer system 2900 further includes a network interface 2940 coupled to I/O interface 2930.

In various embodiments computer system 2900 may be a uniprocessor system including one processor 2910, or a multiprocessor system including several processors 2910 (e.g., two, four, eight, or another suitable number). Processors 2910 may be any suitable processor capable of executing instructions. For example, in various embodiments processors 2910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 2910 may commonly, but not necessarily, implement the same ISA.

System memory 2920 may be configured to store instructions and data accessible by process 2910. In various embodiments, system memory 2920 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as any of those storage service system components and other functions described in detail above, are shown stored within system memory 2920 as code 2925.

In one embodiment, I/O interface 2930 may be configured to coordinate I/O traffic between processor 2910, system memory 2920, and any peripheral devices in the device, including network interface 2940 or other peripheral interfaces. In some embodiments, I/O interface 2930 may perform any necessary protocol, timing or other data transformations to convert data signals from one component (e.g., system memory 2920) into a format suitable for use by another component (e.g., processor 2910). In some embodiments, I/O interface 2930 may include support for devices attached through various types of peripheral buses, such as a variant of the Peripheral Component Interconnect (PCI) bus standard or the Universal Serial Bus (USB) standard, for example. In some embodiments, the function of I/O interface 2930 may be split into two or more separate components, such as a north bridge and a south bridge, for example. Also, in some embodiments some or all of the functionality of I/O interface 2930, such as an interface to system memory 2920, may be incorporated directly into processor 2910.

Network interface 2940 may be configured to allow data to be exchanged between computer system 2900 and other devices attached to a network, such as other computer systems, for example. In various embodiments, network interface 2940 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 2920 may be one embodiment of a computer-accessible medium configured to store program instructions and data as described above. However, other embodiments, program instructions and/or data may be received, sent or stored upon different types of computer-accessible media. Generally speaking, a computer-accessible storage medium may include storage media or memory media such as magnetic or optical storage media, e.g., disk or CD/DVD-ROM coupled to computer system 2900 via I/O interface 2930. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 2900 as system memory 2920 or another type of memory. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 2940.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
   a plurality of computing nodes configured to implement:
   a plurality of storage nodes configured to store one or more replicas of each of a plurality of data objects, wherein each of said one or more replicas is accessible via a unique respective locator value, each node of the computing nodes comprising a processor and a memory; and
   a plurality of keymap instances each configured to store keymap entries corresponding respectively to said data objects, wherein a given one of said keymap entries corresponding to a given one of said plurality of data objects indicates a mapping from a given key value corresponding to said given data object to each said respective locator value of said one or more replicas of said given data object;
   wherein for said given data object, each of said plurality of keymap instances is configured to store a replica of said given keymap entry, such that said given keymap entry is replicated across said plurality of keymap instances;
   wherein each of said keymap instances is further configured to index its respective stored keymap entries within a respective index data structure;
   wherein each of said index data structures includes a respective plurality of index nodes arranged hierarchically and each index node having an associated tag value, wherein for each of said stored keymap entries, there exists a respective, uniquely corresponding one of said index nodes such that at most one keymap entry corresponds to any given one of said index nodes, and wherein at least some of the index data structures are unbalanced;
   wherein for each given one of the index nodes, each tag value associated with each ancestor of said given index node is a prefix of the key value that is associated with the given index node; and
   wherein a given one of said plurality of keymap instances selects a different one of said plurality of keymap instances at regular or irregular intervals and to at least partially synchronize said respective index data structures of said given keymap instance and said different keymap instance.

2. The system as recited in claim 1, wherein said plurality of computing nodes is further configured to implement a web services interface configured to present a data storage web service to clients, wherein said data storage web service includes one or more web services endpoints;
   wherein each web services endpoint is configured to implement a corresponding web services application programming interface (API) defining data storage web service operations that are available to ones of said clients via web services calls, and is addressable to receive said web services calls, formatted according to said web services API to specify one or more of said data storage web service operations, from ones of said clients according to an Internet-based application layer data transport protocol;
   wherein in response to receiving web services calls formatted according to said web services API to store data objects, each said web services endpoint is further configured to store data objects supplied by said clients within ones of said plurality of storage nodes;
   wherein each said web services endpoint is further configured to receive web services calls formatted according to said web services API that are indicative of client requests for access to ones of said data objects, wherein a given one of said client requests for access to a given one of said data objects includes a key value corresponding to said given data object.

3. The system as recited in claim 1, wherein each of said plurality of keymap instances includes a respective plurality of host systems, and wherein for said given data object, each of said plurality of keymap instances is further configured to store a plurality of replicas of said given keymap entry distributed among said respective plurality of host systems.

4. The system as recited in claim 3, wherein a given one of said plurality of keymap instances is configured to receive a keymap entry put operation including said given key value and one or more keymap entry parameters, and wherein in response to receiving said keymap entry put operation, said given keymap instance is further configured to generate update operations to update each of said plurality of replicas of said given keymap entry according to said one or more keymap entry parameters.

5. The system as recited in claim 4, wherein said given keymap instance is further configured to indicate that said keymap entry put operation is complete in response to determining that at least a quorum number of said update operations have completed with respect to said plurality of replicas of said given keymap entry.

6. The system as recited in claim 3, wherein a given one of said plurality of keymap instances is configured to receive a keymap entry get operation including said given key value, and wherein in response to receiving said keymap entry get operation, said given keymap instance is further configured to generate retrieval operations to retrieve each of said plurality of replicas of said given keymap entry.

7. The system as recited in claim 6, wherein said given keymap instance is further configured to:
    determine whether at least a quorum number of said retrieval operations have completed with respect to said plurality of replicas of said given keymap entry;
    if at least said quorum number of said retrieval operations have completed, determine whether said retrieved replicas differ; and
    if said retrieved replicas do not differ, return one of said retrieved replicas and indicate that said keymap entry get operation is complete.

8. The system as recited in claim 7, wherein in response to determining that said retrieved replicas differ, said given keymap instance is further configured to:
    select a particular one of said retrieved replicas according to a selection criterion;
    initiate a keymap entry put operation specifying said given key value and said particular retrieved replica; and
    return said particular retrieved replica and indicate that said keymap entry get operation is complete.

9. The system as recited in claim 3, wherein a given one of said keymap instances is configured to, in response to detecting an update operation directed to said given keymap instance, forward said update operation to one or more other ones of said keymap instances according to a forwarding protocol.

10. The system as recited in claim 9, wherein said forwarding protocol does not guarantee that said update operation will be received by each of said one or more corresponding host systems associated with said given host system.

11. The system as recited in claim 1, wherein said given one of said plurality of keymap instances is further configured to select said different keymap instance at random and to at least partially synchronize said respective index data structures of said given keymap instance and said different keymap instance according to an anti-entropy synchronization protocol.

12. The system as recited in claim 1, wherein for a given one of said index data structures, each of said plurality of index nodes included within said given index data structure is associated with a respective count value, wherein for a given one of said index nodes, said respective count value is indicative of a number of ones of said plurality of index nodes that are hierarchical descendants of said given index node.

13. The system as recited in claim 1, wherein for a given one of said index data structures, each of said plurality of index nodes included within said given index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node.

14. The system as recited in claim 1, wherein a given one of said index data structures is stratified among a plurality of index tree data structures, wherein a root node of said given index data structure corresponds to a root node of a first one of said plurality of index tree data structures, and wherein each of a plurality of leaf nodes of said first index tree data structure corresponds to a root node of a respective one of said index tree data structures.

15. The system as recited in claim 14, wherein at least two of said plurality of index tree data structures are stored on different ones of said plurality of computing nodes.

16. The system as recited in claim 1, wherein for a given one of said index nodes having a first and a second child node, a number of descendants of said first child node does not equal a number of descendants of said second child node.

17. A method, comprising:
    one or more computer systems performing:
        storing one or more replicas of each of a plurality of data objects, wherein each of said one or more replicas is accessible via a unique respective locator value;
        storing respective replicas, within each of a plurality of keymap instances, of keymap entries corresponding respectively to said data objects, such that each of said keymap entries is replicated across said plurality of keymap instances, wherein a given one of said keymap entries corresponding to a given one of said plurality of data objects indicates a mapping from a given key value corresponding to said given data object to each said respective locator value of said one or more replicas of said given data object;
        indexing stored keymap entries of each of said keymap instances within a respective index data structure, wherein at least some of index data structures are unbalanced; and
        a given one of said plurality of keymap instances selecting a different one of said plurality of keymap instances at regular or irregular intervals and at least partially synchronizing said respective index data structures of said given keymap instance and said different keymap instance;
    wherein each of said index data structures includes a respective plurality of index nodes arranged hierarchically and each index node having an associated tag value, wherein for each of said stored keymap entries, there exists a respective, uniquely corresponding one of said index nodes such that at most one keymap entry corresponds to any given one of said index nodes; and
    wherein for each given one of the index nodes, each tag value associated with each ancestor of said given index node is a prefix of the key value that is associated with the given index node.

18. The method as recited in claim 17, further comprising:
    presenting a data storage web service to clients, wherein said data storage web service includes one or more web services endpoints;
        wherein each web services endpoint implements a corresponding web services application programming interface (API) defining data storage web service operations that are available to ones of said clients via web services calls, and is addressable to receive said web services calls, formatted according to said web services API to specify one or more of said data storage web service operations, according to an Internet-based application layer data transport protocol; and
        wherein in response to receiving web services calls formatted according to said web services API to store data objects, each said web services endpoint is configured to store data objects supplied by said clients within said data storage web service;
    receiving web services calls formatted according to said web services API that are indicative of client requests for access to ones of said data objects via said one or more web services endpoints according to said Internet-based application layer data transport protocol, wherein a given one of said client requests for access to a given one of said data objects includes a key value corresponding to said given data object.

19. The method as recited in claim 17, wherein each of said plurality of keymap instances includes a respective plurality of host systems, and wherein for said given data object, the method further comprises each of said plurality of keymap instances storing a plurality of replicas of said given keymap entry distributed among said respective plurality of host systems.

20. The method as recited in claim 19, further comprising:
a given one of said plurality of keymap instances receiving a keymap entry put operation including said given key value and one or more keymap entry parameters; and
in response to receiving said keymap entry put operation, said given keymap instance generating update operations to update each of said plurality of replicas of said given keymap entry according to said one or more keymap entry parameters.

21. The method as recited in claim 20, further comprising said given keymap instance indicating that said keymap entry put operation is complete in response to determining that at least a quorum number of said update operations have completed with respect to said plurality of replicas of said given keymap entry.

22. The method as recited in claim 19, further comprising:
a given one of said plurality of keymap instances receiving a keymap entry get operation including said given key value; and
in response to receiving said keymap entry get operation, said given keymap instance generating retrieval operations to retrieve each of said plurality of replicas of said given keymap entry.

23. The method as recited in claim 22, further comprising said given keymap instance:
determining whether at least a quorum number of said retrieval operations have completed with respect to said plurality of replicas of said given keymap entry;
if at least said quorum number of said retrieval operations have completed, determining whether said retrieved replicas differ; and
if said retrieved replicas do not differ, returning one of said retrieved replicas and indicating that said keymap entry get operation is complete.

24. The method as recited in claim 23, further comprising:
in response to determining that said retrieved replicas differ, said given keymap instance selecting a particular one of said retrieved replicas according to a selection criterion;
said given keymap instance initiating a keymap entry put operation specifying said given key value and said particular retrieved replica; and
said given keymap instance returning said particular retrieved replica and indicating that said keymap entry get operation is complete.

25. The method as recited in claim 19, further comprising a given one of said keymap instances, in response to detecting an update operation directed to said given keymap instance, forwarding said update operation to one or more other ones of said keymap instances according to a forwarding protocol.

26. The method as recited in claim 25, wherein said forwarding protocol does not guarantee that said update operation will be received by each of said one or more corresponding host systems associated with said given host system.

27. The method as recited in claim 17, wherein said given one of said plurality of keymap instances selecting said different keymap instance occurs at random and wherein said at least partially synchronizing said respective index data structures of said given keymap instance and said different keymap instance is performed according to an anti-entropy synchronization protocol.

28. The method as recited in claim 17, wherein for a given one of said index data structures, each of said plurality of index nodes included within said given index data structure is associated with a respective count value, wherein for a given one of said index nodes, said respective count value is indicative of a number of ones of said plurality of index nodes that are hierarchical descendants of said given index node.

29. The method as recited in claim 17, wherein for a given one of said index data structures, each of said plurality of index nodes included within said given index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node.

30. The method as recited in claim 17, wherein a given one of said index data structures is stratified among a plurality of index tree data structures, wherein a root node of said given index data structure corresponds to a root node of a first one of said plurality of index tree data structures, and wherein each of a plurality of leaf nodes of said first index tree data structure corresponds to a root node of a respective one of said index tree data structures.

31. The method as recited in claim 30, further comprising storing at least two of said plurality of index tree data structures on different ones of a plurality of computing nodes.

32. The method as recited in claim 17, wherein for a given one of said index nodes having a first and a second child node, a number of descendants of said first child node does not equal a number of descendants of said second child node.

33. A computer-accessible storage medium storing instructions, wherein the instructions are executable to:
store, within a given one of a plurality of keymap instances, keymap entries corresponding respectively to a plurality of data objects, wherein each of said plurality of data objects corresponds to one or more replicas, wherein each of said one or more replicas is accessible via a unique respective locator value, and wherein a given one of said keymap entries corresponding to a given one of said plurality of data objects indicates a mapping from a given key value corresponding to said given data object to each said respective locator value of said one or more replicas of said given data object;
replicate said keymap entries across said plurality of keymap instances;
index stored keymap entries of said given keymap instance within an unbalanced index data structure; and
select a different one of said plurality of keymap instances at regular or irregular intervals and at least partially synchronize said index data structure of said given keymap instance with an index data structure of said different keymap instance;
wherein said index data structure includes a plurality of index nodes arranged hierarchically and each index node having an associated tag value, wherein for each of said stored keymap entries, there exists a respective, uniquely corresponding one of said index nodes such that at most one keymap entry corresponds to any given one of said index nodes; and wherein for each given one of the index nodes, each tag value associated with each ancestor of said given index node is a prefix of the key value that is associated with the given index node.

34. The computer-accessible storage medium as recited in claim 33, wherein the instructions are further executable to implement a web services interface configured to present a data storage web service to clients, wherein said data storage web service includes one or more web services endpoints;

wherein each web services endpoint is configured to implement a corresponding web services application programming interface (API) defining data storage web service operations that are available to ones of said clients via web services calls, and is addressable to receive said web services calls, formatted according to said web services API to specify one or more of said data storage web service operations, from ones of said clients according to an Internet-based application layer data transport protocol;

wherein in response to receiving web services calls formatted according to said web services API to store data objects, each said web services endpoint is further configured to store data objects supplied by said clients within the data storage web service;

wherein each said web services endpoint is further configured to receive web services calls formatted according to said web services API that are indicative of client requests for access to ones of said data objects, wherein a given one of said client requests for access to a given one of said data objects includes a key value corresponding to said given data object.

35. The computer-accessible storage medium as recited in claim 33, wherein for said given data object, the instructions are further executable to instruct that a plurality of replicas of said given keymap entry be stored in a distributed fashion among a plurality of host systems included within said given keymap instance.

36. The computer-accessible storage medium as recited in claim 35, wherein the instructions are further executable to:
receive a keymap entry put operation including said given key value and one or more keymap entry parameters; and
in response to receiving said keymap entry put operation, generate update operations to update each of said plurality of replicas of said given keymap entry according to said one or more keymap entry parameters.

37. The computer-accessible storage medium as recited in claim 36, wherein the instructions are further executable to indicate that said keymap entry put operation is complete in response to determining that at least a quorum number of said update operations have completed with respect to said plurality of replicas of said given keymap entry.

38. The computer-accessible storage medium as recited in claim 35, wherein the instructions are further executable to:
receive a keymap entry get operation including said given key value; and
in response to receiving said keymap entry get operation, generate retrieval operations to retrieve each of said plurality of replicas of said given keymap entry.

39. The computer-accessible storage medium as recited in claim 38, wherein the instructions are further executable to:
determine whether at least a quorum number of said retrieval operations have completed with respect to said plurality of replicas of said given keymap entry;
if at least said quorum number of said retrieval operations have completed, determine whether said retrieved replicas differ; and
if said retrieved replicas do not differ, return one of said retrieved replicas and indicate that said keymap entry get operation is complete.

40. The computer-accessible storage medium as recited in claim 39, wherein the instructions are further executable to:
in response to determining that said retrieved replicas differ, select a particular one of said retrieved replicas according to a selection criterion;
initiate a keymap entry put operation specifying said given key value and said particular retrieved replica; and
return said particular retrieved replica and indicate that said keymap entry get operation is complete.

41. The computer-accessible storage medium as recited in claim 35, wherein said instructions are further executable to instruct said given one of said keymap instances to, in response to detecting an update operation directed to said given keymap instance, forward said update operation to one or more other ones of said plurality of keymap instances according to a forwarding protocol.

42. The computer-accessible storage medium as recited in claim 41, wherein said forwarding protocol does not guarantee that said update operation will be received by each of said one or more corresponding host systems associated with said given host system.

43. The computer-accessible storage medium as recited in claim 33, wherein the instructions are further executable to select said different keymap instance at random and at least partially synchronize said index data structure of said given keymap instance with an index data structure of said different keymap instance according to an anti-entropy synchronization protocol.

44. The computer-accessible storage medium as recited in claim 33, wherein each of said plurality of index nodes included within said index data structure is associated with a respective count value, wherein for a given one of said index nodes, said respective count value is indicative of a number of ones of said plurality of index nodes that are hierarchical descendants of said given index node.

45. The computer-accessible storage medium as recited in claim 33, wherein each of said plurality of index nodes included within said index data structure is associated with a respective fingerprint value, wherein for a given one of said index nodes, said respective fingerprint value is indicative of a hash value computed according to a hash algorithm, wherein said hash value is computed as a function of ones of said plurality of index nodes that are hierarchical descendants of said given index node.

46. The computer-accessible storage medium as recited in claim 33, wherein said index data structure is stratified among a plurality of index tree data structures, wherein a root node of said index data structure corresponds to a root node of a first one of said plurality of index tree data structures, and wherein each of a plurality of leaf nodes of said first index tree data structure corresponds to a root node of a respective one of said index tree data structures.

47. The computer-accessible storage medium as recited in claim 46, wherein said instructions are further executable to instruct that at least two of said plurality of index tree data structures be stored on different ones of a plurality of computing nodes.

48. The computer-accessible storage medium as recited in claim 33, wherein for a given one of said index nodes having a first and a second child node, a number of descendants of said first child node does not equal a number of descendants of said second child node.

49. A computer-implemented keymap instance, comprising:
a plurality of host computers configured to store keymap entries corresponding respectively to a plurality of data objects, wherein each of said plurality of data objects corresponds to one or more replicas, wherein each of said one or more replicas is accessible via a unique respective locator value, wherein a given one of said keymap entries corresponding to a given one of said plurality of data objects indicates a mapping from a given key value corresponding to said given data object to each said respective locator value of said one or more replicas of said given data object, and wherein said host computers are further configured to store a plurality of replicas of said given keymap entry in a distributed fashion among said host computers, each host computer of the host computers comprising a processor and a memory;

a computer-implemented keymap coordinator configured to index stored keymap entries of said host computers within an unbalanced index data structure;

wherein said keymap coordinator is configured to select a different keymap instance at regular or irregular intervals and to at least partially synchronize said unbalanced index data structure with an index data structure of said different keymap instance;

wherein said index data structure includes a plurality of index nodes arranged hierarchically and each index node having an associated tag value, wherein for each of said stored keymap entries, there exists a respective, uniquely corresponding single one of said index nodes such that at most one keymap entry corresponds to any given one of said index nodes; and wherein for each given one of the index nodes, each tag value associated with each ancestor of said given index node is a prefix of the key value that is associated with the given index node.

* * * * *